(12) United States Patent
Pol et al.

(10) Patent No.: US 12,676,341 B2
(45) Date of Patent: Jul. 7, 2026

(54) COMPOSITE SOLID POLYMER ELECTROLYTES AND ORGANIC CATHODE MATERIALS SUITABLE FOR SOLID-STATE LITHIUM BATTERIES

(71) Applicant: Purdue Research Foundation, West Lafayette, IN (US)

(72) Inventors: Vilas G. Pol, West Lafayette, IN (US); Zheng Li, West Lafayette, IN (US); Sensen Zhang, Shenzhen (CN)

(73) Assignee: Purdue Research Foundation, West Lafayette, IN (US)

( * ) Notice: Subject to any disclaimer, the term of this patent is extended or adjusted under 35 U.S.C. 154(b) by 465 days.

(21) Appl. No.: 17/542,704

(22) Filed: Dec. 6, 2021

(65) Prior Publication Data

US 2022/0181686 A1 Jun. 9, 2022

Related U.S. Application Data

(60) Provisional application No. 63/122,090, filed on Dec. 7, 2020.

(51) Int. Cl.
*H01M 10/0565* (2010.01)
*H01M 4/38* (2006.01)
(Continued)

(52) U.S. Cl.
CPC ....... *H01M 10/0565* (2013.01); *H01M 4/382* (2013.01); *H01M 4/602* (2013.01); *H01M 10/0525* (2013.01); *H01M 2300/0091* (2013.01)

(58) Field of Classification Search
CPC .......... H01M 10/0565; H01M 10/382; H01M 4/602; H01M 10/0525; H01M 2300/0091
See application file for complete search history.

(56) References Cited

U.S. PATENT DOCUMENTS 9,825,286 B2 * 11/2017 Leconte ............... H01M 4/366
2019/0393545 A1 * 12/2019 Azagarsamy ......... H01M 4/136
(Continued)

FOREIGN PATENT DOCUMENTS

CN 109244540 A * 1/2019 ........ H01M 10/0525
CN 111377736 A * 7/2020

OTHER PUBLICATIONS

Lu et al., Hybridizing poly(vinylidene fluoride-co-hexafluoropropylene) with Li6.5La3Zr1.5Ta0.5O12 as a lithium-ion electrolyte for solid state lithium metal batteries, 2019, Chemical Engineering Journal, vol. 367, pp. 230-238 (Year: 2019).*
(Continued)

*Primary Examiner* — Maria Laios
*Assistant Examiner* — Ziheng Lu
(74) *Attorney, Agent, or Firm* — Hartman Global IP Law; Gary M. Hartman; Domenica N. S. Hartman

(57) ABSTRACT

Composite solid polymer electrolytes (SPE), organic cathode electrodes, and solid-state lithium batteries (SLBs) that incorporate the SPE and/or the organic cathode electrodes. The composite solid polymer electrolytes include a hybrid polymer matrix, an LiTFSI salt dispersed in the matrix polymer matrix, and an LLZTO ceramic filler dispersed in the matrix polymer matrix. The organic cathode electrodes contain perylene-3,4,9,10-tetracarboxylic dianhydride (PTCDA).

19 Claims, 52 Drawing Sheets

(51) Int. Cl.
    *H01M 4/60*       (2006.01)
    *H01M 10/0525*   (2010.01)

(56)             References Cited

U.S. PATENT DOCUMENTS

2020/0365897 A1 *  11/2020  Badding ............. H01M 4/5815
2023/0060872 A1 *   3/2023  Delaporte ............. H01M 4/628

OTHER PUBLICATIONS

Zhao et al., A rational design of solid polymer electrolyte with high salt concentration for lithium battery, Journal of Power Sources, 2018, vol. 407, pp. 23-30 (Year: 2018).*

Li et al., Li7La3Zr2O12 ceramic nanofiber-incorporated composite polymer electrolytes for lithium metal batteries. 2019, J. Mater. Chem. A, vol. 7, pp. 3391-3398 (Year: 2019).*

Wan et al., Low Resistance-Integrated All-Solid-State Battery Achieved by Li7La3Zr2O12 Nanowire Upgrading Polyethylene Oxide (PEO)

Composite Electrolyte and PEO Cathode Binder, 2019, Adv. Funct. Mater., vol. 29 (Year: 2019).*

Belanger, R.L., Commarieu, B., Paolella, A. et al. Diffusion Control of Organic Cathode Materials in Lithium Metal Battery. Sci Rep 9, 1213 (2019). https://doi.org/10.1038/s41598-019-38728-y (Year: 2019).*

Bai, "Poly(ethylene oxide)/Poly(vinylidene fluoride)/ Li6.4La3Zr1. 4Ta0.6O12 composite electrolyte with a stable interface for high performance solid state lithium metal batteries", Oct. 1, 2020, Journal of Power Sources, vol. 472, https://doi.org/10.1016/j.jpowsour. 2020.228461 (Year: 2020).*

Zhang, "Synergistic Coupling between Li6.75La3Zr1.75Ta0.25O12 and Poly(vinylidene fluoride) Induces High Ionic Conductivity, Mechanical Strength, and Thermal Stability of Solid Composite Electrolytes", Journal of the American Chemical Society 2017 139 (39), 13779-13785 DOI: 10.1021/jacs.7b06364 (Year: 2017).*

Yang, "Composite Polymer Electrolytes with Li7La3Zr2O12 Garnet-Type Nanowires as Ceramic Fillers: Mechanism of Conductivity Enhancement and Role of Doping and Morphology", 2017, ACS Appl. Mater. Interfaces, 9, 26, 21773-21780 (Year: 2017).*

* cited by examiner

COMPOSITE SOLID POLYMER ELECTROLYTES AND ORGANIC CATHODE MATERIALS SUITABLE FOR SOLID-STATE LITHIUM BATTERIES

CROSS REFERENCE TO RELATED APPLICATIONS

This application claims the benefit of U.S. Provisional Application No. 63/122,090, filed Dec. 7, 2020, the contents of which are incorporated herein by reference.

BACKGROUND OF THE INVENTION

The present invention generally relates to solid-state lithium batteries (SLBs). The invention particularly relates to composite solid polymer electrolytes (SPE) and organic cathode electrodes suitable for use in SLBs.

Lithium-ion batteries (LIBs) have been widely used in portable electronic devices and electric vehicles due to their outstanding performance such as high energy density, no memory effect, and low self-discharge. However, thermal runaway accidents in portable electronics and electric vehicles occur, resulting in an urgent demand for safer lithium-ion batteries. Introducing solid-state electrolytes in lithium metal batteries to replace flammable liquid electrolytes is an effective way to address thermal safety issues and achieve high-energy densities. Solid electrolyte materials are considered to be an important factor in achieving high-performance solid-state lithium batteries (SLBs).

In general, solid electrolytes are divided into two categories: ceramic (sulfide and oxide) electrolytes and polymer electrolytes. Ceramic electrolytes exhibit high room-temperature ionic conductivity ($10^{-4}$ to $10^{-2}$ S·cm$^{-1}$) and wide electrochemical stability windows. However, ceramic electrolytes suffer from large interfacial impedance and poor lithium dendrite inhibition. Solid polymer electrolytes (SPEs) have attracted attention due to their interfacial compatibility, flexibility, and ease of processing. Various polymer matrices, such as polyethylene oxide (PEO), tri(propylene glycol) diacrylate (TPGDA), polyacrylonitrile (PAN) and poly(propylene carbonate) (PPC) have been investigated. Among these, PEO has been widely studied because of its low cost and high compatibility with various lithium salts. Unfortunately, low room-temperature ionic conductivity (about $10^{-6}$ S·cm$^{-1}$), poor mechanical properties, and a narrow electrochemical window (under 3.8 V vs. Li/Li+) have hindered application of PEO solid electrolyte matrices.

Poly(vinylidene fluoride) (PVDF) has been reported to be a suitable polymer matrix with high room-temperature ionic conductivity (about $10^{-4}$ S·cm$^{-1}$). It is well known that introducing ceramic filler can further enhance the ionic conductivity of solid polymer electrolyte due to the interaction between ceramic filler with both polymer matrix and salt anions. Previous work has demonstrated enhanced ionic conductivity of PVDF-based composite solid polymer electrolytes (CSPEs), where palygorskite nanowires and $Li_{1.3}Al_{0.3}Ti_{1.7}(PO_4)_3$ fillers were added into a PVDF matrix. However, simultaneous improvement in ionic conductivity, mechanical property and thermal stability of PVDF-based CSPEs has not been reported.

The soaring demand for LIBs also poses a significant challenge to inorganic metal oxide-based cathode materials (as nonlimiting examples, $LiCoO_2$, $LiNi_{1-x-y}Co_xMn_yO_2$, etc.), which are expensive, scarce in resources, and environmentally unfriendly. Organic cathode materials have been considered as promising alternatives due to their abundant raw materials, low cost, and eco-friendliness. Unfortunately, most organic cathode materials suffer from dissolution and shuttle issues in conventional liquid electrolytes, resulting in rapid capacity decline and poor cycling stability, which hinders their further applications.

Strategies have been reported for alleviating the dissolution issue, such as surface coatings, polymerization, salts formation, and introducing solid-state electrolytes. Among these, the introduction of solid-state electrolytes into Li-organic batteries not only offers the possibility to fully address the dissolution issue of organic cathodes, but also shows promising prospects in terms of energy density, mechanical robustness, and thermal safety. However, so far, few studies have been reported of all-solid-state Li-organic batteries. Moreover, the life spans of all-solid-state Li-organic batteries have been limited in the range of 10-300 cycles due to inferior electrode-electrolyte interfacial compatibility. For example, Li et al., "All-solid-state secondary lithium battery using solid polymer electrolyte and anthraquinone cathode," Solid State Ionics. 300 p 114-119 (2017), combined a polyethylene oxide (PEO)-based composite polymer electrolyte and an organic anthraquinone cathode, which showed a capacity retention of 60% after 100 cycles, while the capacity retention of the analogous battery using liquid electrolyte was only 28% after 20 cycles. The solid-state Li-organic battery using $Li_3PS_4$ solid electrolyte and azobenzene organic cathode delivered a capacity of 83 mAh g$^{-1}$ after 120 cycles, corresponding to a capacity retention of 69%, which was much higher than that of the battery using liquid electrolyte (16% after 20 cycles).

Despite these encouraging results, the cycling stability and life-span of solid-state Li-organic batteries need to be further improved for commercial applications. Therefore, it is of great significance to develop novel solid-state electrolytes with high ionic conductivity and excellent electrode-electrolyte interfacial compatibility to produce high energy density, long life span all-solid-state Li-organic batteries.

BRIEF DESCRIPTION OF THE INVENTION

The present invention provides composite solid polymer electrolytes (SPE) and organic cathode electrodes suitable for use in solid lithium batteries (SLBs).

According to a first aspect of the invention, a composite solid polymer electrolyte includes a hybrid polymer matrix, an LiTFSI salt dispersed in the matrix polymer matrix, and an LLZTO ceramic filler dispersed in the matrix polymer matrix.

According to another aspect of the invention, an organic cathode material contains perylene-3,4,9,10-tetracarboxylic dianhydride (PTCDA).

Other aspects of the invention include solid-state lithium batteries that incorporate a composite solid polymer electrolyte and/or an organic cathode material as described above.

Technical aspects of composite solid polymer electrolytes and organic cathode materials as described above preferably include the ability to yield solid lithium batteries that are capable of exhibiting enhanced thermal safety aspects compared to conventional lithium ion batteries with liquid electrolytes.

Other aspects and advantages of this invention will be appreciated from the following detailed description.

BRIEF DESCRIPTION OF THE DRAWINGS

FIG. 1A includes a schematic illustration of a preparation process of the composite solid polymer electrolyte, and schematic representation of a room-temperature solid lithium battery. FIG. 1B includes an image of a CSPE-0 electrolyte solution and membrane, FIG. 1C includes an image of a CSPE-5 electrolyte solution and membrane, and FIG. 1D includes images of a bent and folded (insert) CSPE-5 membrane. FIGS. 1E and 1F represent the surface morphologies of the CSPE-0 and the CSPE-5 membrane, respectively. FIG. 1G includes a scanning electron microscope (SEM) image of the CSPE-5 membrane and FIGS. 1H, 1I, and 1J represent corresponding energy dispersive X-ray (EDX) spectra maps of C, S and Zr therefrom.

FIG. 2A represents cyclic voltammetry and FIG. 2B represents linear sweep voltammetry curves of various CSPEs. FIG. 2C represents ionic conductivities of CSPE membranes with different ratios of LLZTO at 30° C. FIG. 2D represents Arrhenius plots of the CSPE-0, CSPE-5 and CSPE-10 membranes. FIG. 2E represents direct current polarization of a Li|CSPE-5|Li battery at a potential step of 10 mV and AC impedance spectra before and after polarization (Inset). FIG. 2F represents electrochemical impedance spectra of the Li|CSPE-5|Li cell measured after storage at different times.

FIG. 3A represents galvanostatic charge/discharge profiles of the Li|CSPE-5|Li cell with increasing current densities. FIG. 3B represents voltage profiles of Li|Li cells with CSPE-0 and CSPE-5 membranes. FIG. 3C represents long-term cycling performance of the Li|CSPE-5|Li cell at a current density of 0.05 mA cm$^{-2}$. FIGS. 3D and 3E represent detailed voltage profiles at different cycle times. FIG. 3F represents impedance curves of the Li|CSPE-5|Li cell before and after different cycles. FIGS. 3G and 3H include SEM images and digital photos (inset) of a cycled Li anode in Li|CSPE-5|Li and Li|liquid electrolyte|Li cells, respectively, after 1000 cycles.

FIG. 4A represents typical charge-discharge curves of the LFP|CSPE-5|Li cell at different current densities. FIG. 4B represents rate performance and FIG. 4C represents long-term cycling stability of the LFP|CSPE-5|Li cell. FIG. 4D represents voltage profiles and FIG. 4E represents cycling performance of the NCM|CSPE-5|Li cell.

FIG. 5A includes digital photos of a PP separator and a CSPE-5 membrane before and after heating at 300° C. FIG. 5B represents a schematic illustration of a multiple mode calorimetry instrument. FIGS. 5C and 5D represent heat flow profiles and the corresponding open-circuit voltage curves of the NCM|CSPE-5|Li cell and the NCM|liquid electrolyte|Li cell, respectively.

FIG. 6A represents Arrhenius plots of HL1.5Ln electrolytes with different LLZTO contents. FIG. 6B represents ionic conductivities of HL1.5Ln electrolytes at 30° C. FIG. 6C represents a constant potential coulometric test for an HL1.5L0.2 HLL-CSPE. FIGS. 6D and 6E represent flat, and curved states, respectively, of the HL1.5L0.2 HLL-CSPE membrane. FIG. 6F represents the surface morphology of the HL1.5L0.2 HLL-CSPE membrane and FIGS. 6G, 6H, 6I, 6J, and 6K represent corresponding EDX spectra maps of C, O, F, S, and La, respectively.

FIG. 7A represents the DC polarization curve of an Li|HLL-CSPE|Li cell and its corresponding EIS spectra before and after polarization (inset). FIG. 7B represents CV and LSV profiles of a SS|HLL-CSPE|Li battery. FIG. 7C represents the interfacial impedance of the Li|HLL-CSPE|Li cell after resting for different days and the corresponding EIS spectra (inset).

FIG. 8A represents voltage profiles of the Li|HLL-CSPE|Li battery at different current densities. FIG. 8B represents cycling performance of the Li|HLL-CSPE|Li battery. FIG. 8C represents EIS of the Li|HLLCSPE| Li battery before and after different cycles. FIG. 8D represents coulombic efficiency, and FIG. 8E represents voltage curves of a Li|HLL-CSPE|Cu battery at the current density of 0.1 mA cm$^{-2}$ for a total capacity of 0.2 mAh cm$^{-2}$.

FIG. 9A represents cycling performance of PTCDA|Li batteries having either a liquid electrolyte or an HLL-CSPE in accordance with a nonlimiting embodiment of this invention. FIGS. 9B and 9C represent the charge-discharge profiles of PTCDA|liquid electrolyte|Li and PTCDA|HLL|Li, respectively. FIGS. 9D and 9E represent rate and long-term cycling performance, respectively, of the PTCDA|HLL-CSPE|Li battery.

FIGS. 10A and 10B represent PTCDA|Liquid electrolyte|Li and the PTCDA|HLL-CSPE|Li cell, respectively, before and after different cycles. FIG. 10C represents schematic illustrations of the dissolution and shuttle effects in the PTCDA|Li batteries having either a liquid electrolyte or HLL-CSPE.

FIG. 11A includes images of a commercial separator and HLL-CSPE membrane before and after heating at 150° C. FIGS. 11B and 11C represent in-situ MMC profiles of the PTCDA|liquid electrolyte|Li and the PTCDA|HLL-CSPE|Li battery, respectively. FIG. 11D represents cycling performance of the PTCDA|HLL-CSPE|Li battery at 80° C. FIG. 11E includes images of the PTCDA|HLL-CSPE|Li pouch cell under harsh conditions.

DETAILED DESCRIPTION OF THE INVENTION

Figure 1A:
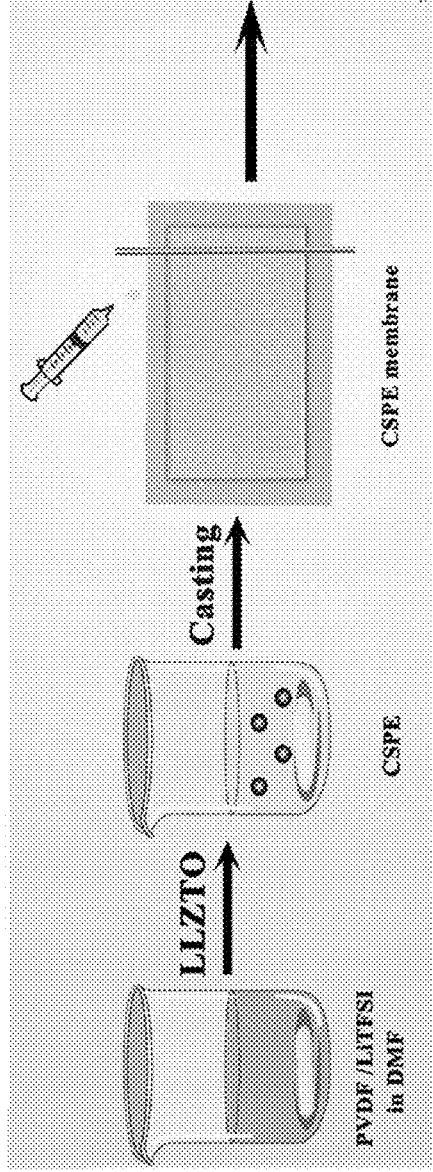
FIGS. 1A through 1J represent aspects of composite solid polymer electrolyte (CSPE) synthesis and SEM images thereof in accordance with a nonlimiting embodiment of this invention.
Figure 1A:
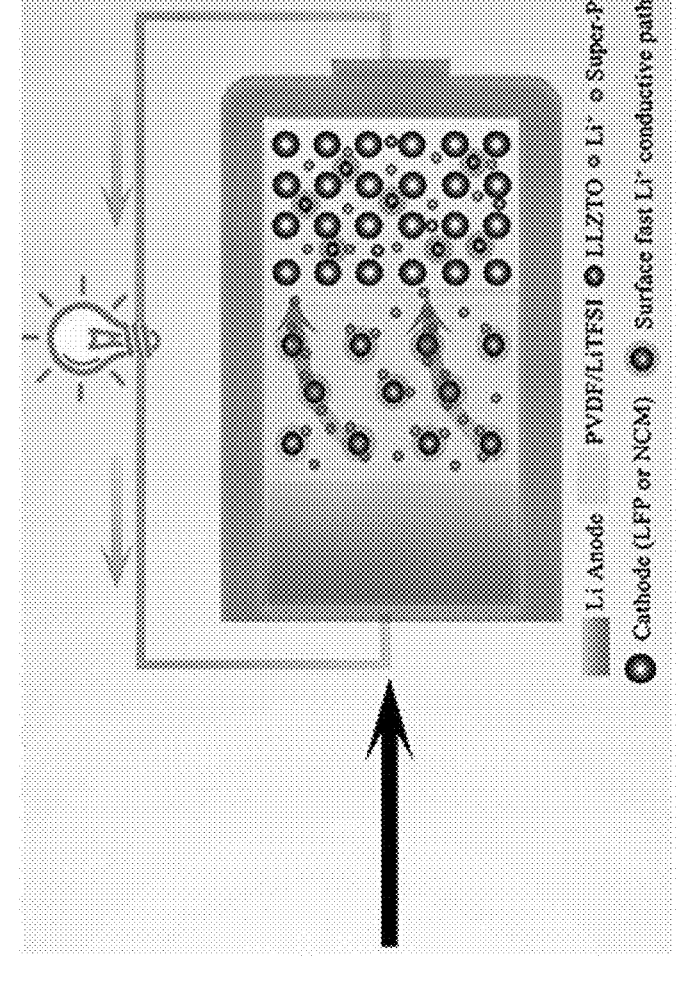

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings. The following detailed description also describes certain investigations relating to the embodiment(s) depicted in the drawings, and identifies certain but not all alternatives of the embodiment(s) depicted in the drawings. Therefore, the appended claims, and not the detailed description, are intended to particularly point out subject matter regarded as the invention, including certain but not necessarily all of the aspects and alternatives described in the detailed description.

Provided below is a disclosure of certain nonlimiting embodiments of composite solid polymer materials suitable for use as electrolytes, yielding composite solid polymer electrolytes (CSPEs) capable of exhibiting high room-temperature ionic conductivity, wide voltage window, excellent mechanical property, and thermal safety. The composite solid polymer electrolytes combined a garnet-type $Li_{6.4}La_3Zr_{1.4}Ta_{0.6}O_{12}$ (LLZTO) ceramic filler with a poly(vinylidene fluoride) (PVDF) electrolyte, and a lithium bis(trifluoromethane)sulfonimide (LiTFSI) salt, yielding what is sometimes referred to herein as a PVDF-LLZTO-LiTFSI CSPE or more simply a PLL-CSPE.

Investigations reported below evidenced that the interaction between LLZTO, LiTFSI salt, and the PVDF matrix facilitated the dissociation of the lithium salt and formed a rapid Li+ conductive path at the ceramic-polymer interface, thereby enhancing the ionic conductivity at room temperature. The interaction between stiff ceramic and the PVDF host led to higher crystallinity of the PVDF electrolyte, which improved mechanical properties and thermal stability of the obtained PLL-CSPE. In addition, an immobilized TFSI-anion on the surface of the ceramic filler inhibited space charge generation and promoted a uniform ion distribution, thus suppressing lithium dendrite growth. Therefore, the obtained PLL-CSPEs simultaneously achieved enhanced room-temperature ionic conductivity, enlarged voltage window, improved mechanical strength, outstanding dendrite suppression, and remarkable thermal stability.

Furthermore, a solid full cell comprising the PLL-CSPE, an $LiFePO_4$ (LFP) cathode, and a lithium metal (Li) anode (hereinafter, LFP|PLL-CSPE|Li) was assembled that delivered a specific discharge capacity of 142 mAh g$^{-1}$ at 0.1 C rate with cycling stability and outstanding rate performance at room temperature. Additionally, a solid full cell comprising the PLL-CSPE, an $LiNi_{1/3}Co_{1/3}Mn_{1/3}O_2$(NCM) cathode, and a lithium anode (hereinafter, NCM|PLL-CSPE|Li) was also fabricated and tested at a high cutoff voltage (4.4V), showing comparable capacity and cycling performance. Finally, the thermal stability of a solid NCM|PLL-CSPE|Li cell was in-situ investigated by multiple module calorimeter (MMC) and compared with an analogous cell with liquid electrolyte. In perhaps the first in-situ study on the thermal stability and thermal runaway process of an entire solid-state lithium battery, the cell with the PLL-CSPE exhibited enhanced thermal stability and generated less heat than a liquid electrolyte cell, indicating excellent thermally safe performance of the PLL-CSPE.

Also provided below is a disclosure of certain nonlimiting embodiments of organic materials suitable for use as solid cathodes, yielding all-solid-state Li-organic batteries. Investigations reported below evaluated a perylene-3,4,9,10-tetracarboxylic dianhydride (PTCDA) cathode in combination with a CSPE and a Li metal anode. The CSPE combined LLZTO ceramic filler with a poly(vinylidene fluoride-co-hexafluoropropylene) (PVDF-HFP) polymer electrolyte and a LiTFSI salt, yielding what is sometimes referred to herein as a hybrid polymer-LLZTO-LiTFSI CSPE or more simply an HLL-CSPE, which exhibited high ionic conductivity of $1.46\times10^{-4}$ S·cm$^{-1}$, wide voltage window (about 4.6 V), outstanding mechanical modulus (137.1 MPa), significant thermal stability (about 202° C.), and excellent electrode-electrolyte interfacial compatibility. Furthermore, a solid full cell comprising the HLL-CSPE, the PTCDA cathode, and a lithium metal (Li) anode (hereinafter, PTCDA|HL-LCSPE| Li) was assembled that delivered a high initial capacity of 122 mAh g$^{-1}$ and 79% capacity retention after 100 cycles at a current density of 50 mA g$^{-1}$. Furthermore, even at a high current density of 500 mA g$^{-1}$, a satisfactory reversible capacity of 60 mAh g$^{-1}$ was achieved after 1000 cycles, corresponding to a superior capacity retention of 91%. Notably, the solid-state battery displayed an elevated thermal stable window (178° C.) and less heat generation (430 J g$^{-1}$) compared with an analogous battery using liquid electrolyte (151° C. and 486 J g$^{-1}$). Moreover, the solid-state PTCDA|HLL-CSPE|Li battery not only cycled safely at elevated temperature, but also showed remarkable safety under abuse conditions such as bending, cutting, and punching, demonstrating its outstanding safety in practical environments.

Nonlimiting embodiments of the invention will now be described below in reference to experimental investigations leading up to the invention.

A procedure for fabricating a PLL-CSPE and a solid lithium battery (SLB) incorporating the PLL-CSPE are schematically represented in FIG. 1A. PVDF and LiTFSI salt were dissolved in N,N-Dimethylformamide (DMF) solvent to obtain a homogeneous transparent solution. CSPE membranes containing no and varying amounts of LLZTO were prepared by adding the LLZTO powder to homogeneous solutions of PVDF and LiTFSI (4:1 molar ratio) dissolved in a DMF solvent. The amounts of LLZTO added to obtain solutions in which the weight ratios of LLZTO were 0, 2.5, 5, 7.5 and 10% of the total amount of PVDF and LiTFSI. All CSPE membranes were obtained by drying in a vacuum oven at 80° C. for 24 hours to remove the DMF solvent. The CSPE membrane containing 0 weight percent LLZTO is referred to herein and in the drawings as "CSPE-0." The PLL-CSPE membranes containing LLZTO weight percentages of 2.5, 5, 7.5 and 10% are referred to herein and in the drawings as "CSPE-2.5," "CSPE-5," "CSPE-7.5," and "CSPE-10," respectively.

Figure 1D:
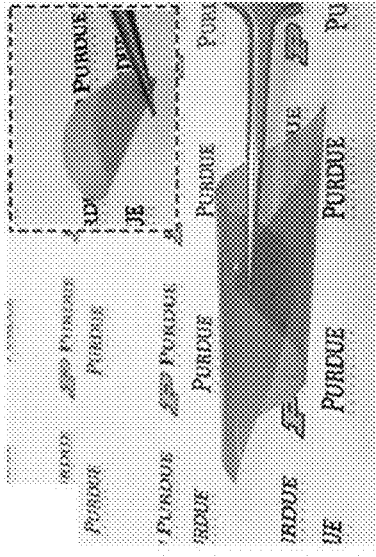
Figure 1C:
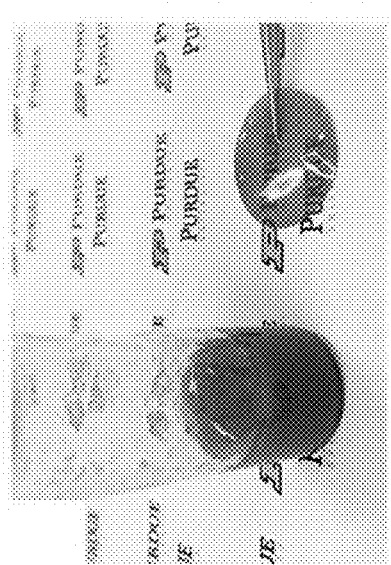
Figure 1B:
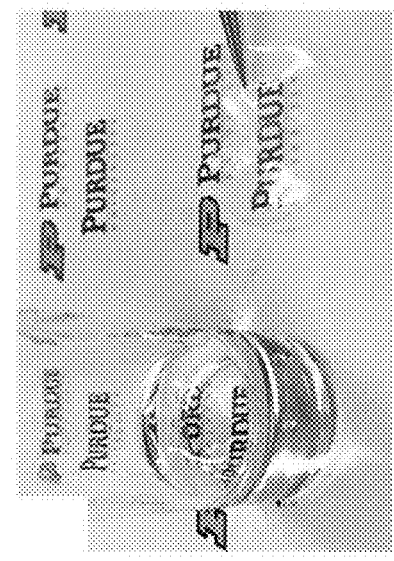

FIG. 1B is an image showing a CSPE containing only PVDF and LiTFSI (CSPE-0), and FIG. 1C shows the effect of incorporating about 5% LLZTO (CSPE-5). The color change after introducing LLZTO was due to the partial dehydrofluorination of PVDF, resulting from a complex interaction among PVDF, LLZTO, and the DMF solvent. It should be noted that due to the inertness of PVDF solid electrolytes, the PLL-CSPE can be prepared via a low-cost solution casting method, which is facile to produce large size, free-standing CSPE membranes (films). FIG. 1D is an image showing the CSPE-5 membrane, demonstrating its flexibility and durability. As revealed by the illustration of the solid lithium battery in FIG. 1A, the CSPE-0 membrane was used as binder for fabricating the cathode (LFP or NCM) of the battery to reduce the cathode-electrolyte interfacial resistance and increase the ionic conductivity of the cathode.

Figures 1E, 1F, 1G:
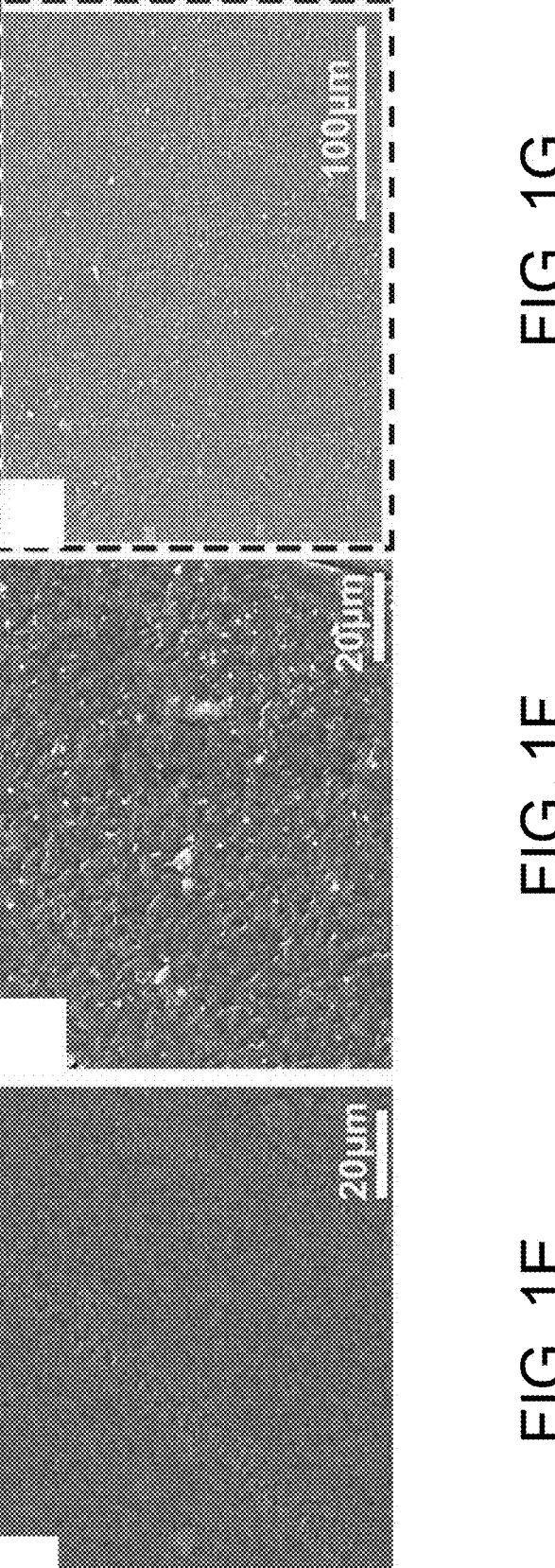
Figures 1H, 1I, 1J:
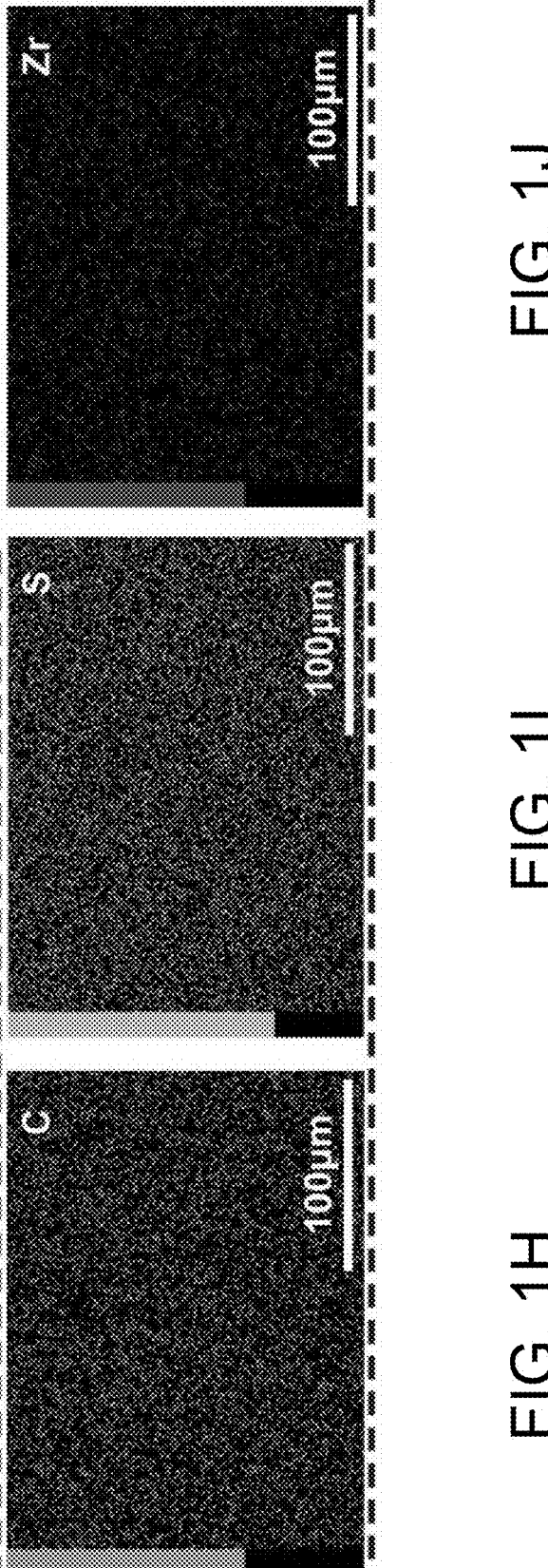

The surface morphologies of the CSPE-0 and CSPE-5 membranes are presented in FIGS. 1E and 1F. Compared to the smooth and dense surface of the CSPE-0 membrane, the introduction of 5% LLZTO filler in the CSPE-5 membrane resulted in a rougher but compact surface. From the low magnification image of FIG. 1G, no cracks can be observed on the surface of the CSPE-5 membrane, which is beneficial to the contact between electrodes and CSPEs. The corresponding EDX spectra mapping images in FIGS. 1H, 1I, and 1J demonstrated the uniform distribution of LiTFSI and LLZTO on the surface of the CSPE-5 membrane. Moreover, SEM images together with EDX mapping evidenced the uniform dispersion of LLZTO across the thickness (about 40 micrometers) of the CSPE-5 membrane and section.

X-ray diffraction (XRD) measurements of the LLZTO powder evidenced agreement with the cubic-phase garnet-type $Li_{6.5}La_3Zr_{1.45}Ta_{0.55}O_{12}$. The crystal structures of the PVDF powder, PVDF film, and as-prepared CSPEs were also determined by XRD. Interestingly, significant peaks appeared at 20.2° and 39.4° in the PVDF film diffraction pattern, indicating that the original α-phase structure had been converted to β-phase and γ-phase. No peak emerged from The CSPE-0 membrane after adding LiTFSI, suggesting that the LiTFSI was completely dissolved in the PVDF matrix. In addition, the peak intensity at 20.2° decreased and the peak at 39.4° disappeared, indicating the reduced crystallinity and improved amorphous region for lithium ions transfer. Compared with the CSPE-0 membrane, multiple characteristic peaks in CSPE-5 were consistent with the standard XRD pattern of $Li_{6.5}La_3Zr_{1.45}Ta_{0.55}O_{12}$ (ICSD #183686), which demonstrated that there is no structural change of LLZTO after compounding with the CSPE-0 membrane.

To clarify the molecular and structural changes in the PLL-CSPE system, Fourier transform infrared (FT-IR) spectral measurements of pure PVDF film and PLL-CSPEs were collected. The results demonstrated a mixture of β-phase and γ-phase in pure PVDF film, which is consistent with that observed by XRD. The FT-IR spectra of the CSPE-0 and CSPE-5 membranes both showed characteristic vibration peaks associated with β-phase and γ-phase PVDF along with LiTFSI.

Differential scanning calorimeter (DSC) curves of the CSPE-0 and CSPE-5 membranes indicated that the addition of the LLZTO ceramic powder increased the crystallinity of the CSPE, contrary to the common effect of LLZTO ceramic powder reducing the crystallinity of PEO polymer matrices. Instrumented nanoindentation was also conducted on the CSPE-0 and CSPE-5 membranes to characterize their mechanical properties and simulate the puncture process of a lithium dendrite through the membranes. The modulus and hardness of the CSPE-5 membrane were calculated to be 381.7±57.0 MPa and 9.2±2.8 MPa, respectively, whereas the CSPE-0 membrane had a lower modulus (263±13.8 MPa) and hardness (5.3±0.5 MPa). The improved mechanical strength of CSPE-5 were attributed to the interaction of rigid LLZTO filler with the PVDF matrix, and are believed to be capable of effectively inhibiting the free growth of Li dendrites.

Figure 2A:
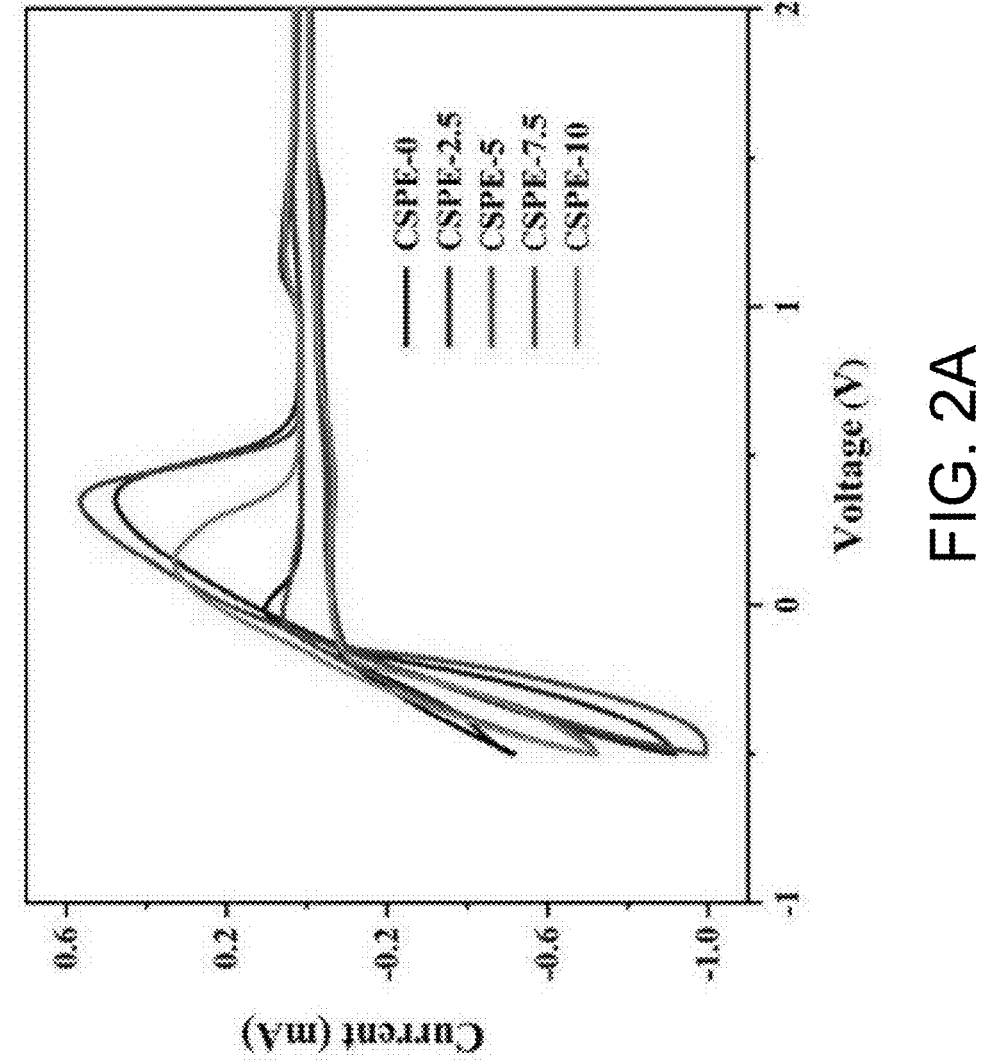
FIGS. 2A through 2F represent electrochemical characterization of CSPE membranes in accordance with nonlimiting embodiments of this invention.

Cyclic voltammetry (FIG. 2A) was conducted to investigate the electrochemical properties of the CSPE-0, CSPE-2.5, CSPE-5, CSPE-7.5, CSPE-10 membranes. The cathodic peaks at around −0.5 V (vs. Li/Li+) and the corresponding anodic peaks represent Li plating and stripping, respectively.

Figure 2B:
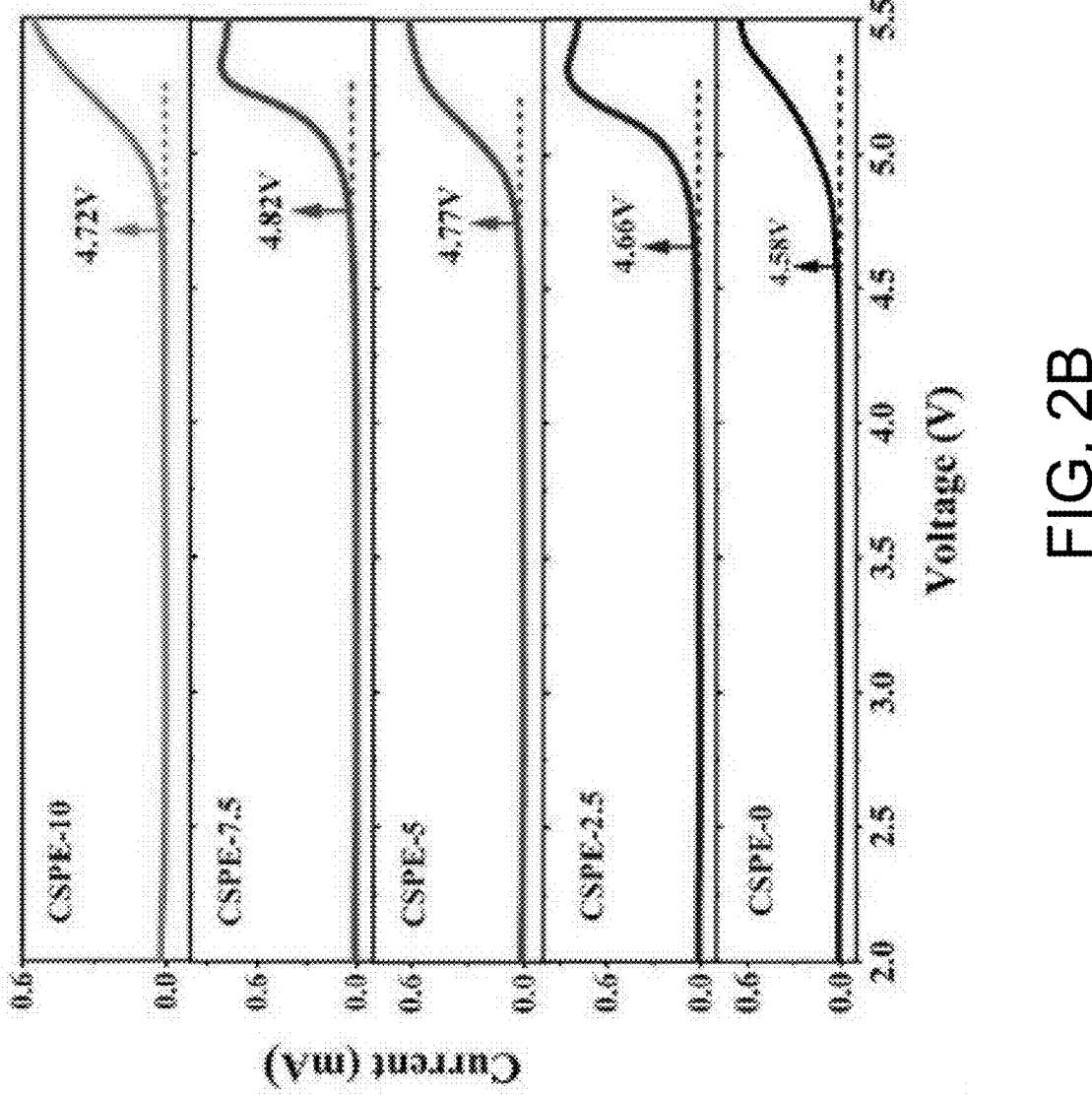

It can be clearly observed from the cathode scan that all CSPEs exhibited cathodic stability at voltages of up to 0 V (vs. Li/Li+), indicating their compatibility with lithium and stable electrochemical interface. Linear sweep voltammetry was performed to study the stability of the CSPE membranes at high voltage ranges (FIG. 2B). There was no obvious current increase up to 4.56 V for the CSPE-0 membrane, indicating that the electrochemical window of the CSPE-0 membrane was similar to that of liquid electrolyte (4.5 vs. Li/Li+). The voltage window was enlarged to about 4.8 V after adding the LLZTO filler, which indicated its potential compatibility with high-voltage cathodes.

Figure 2C:
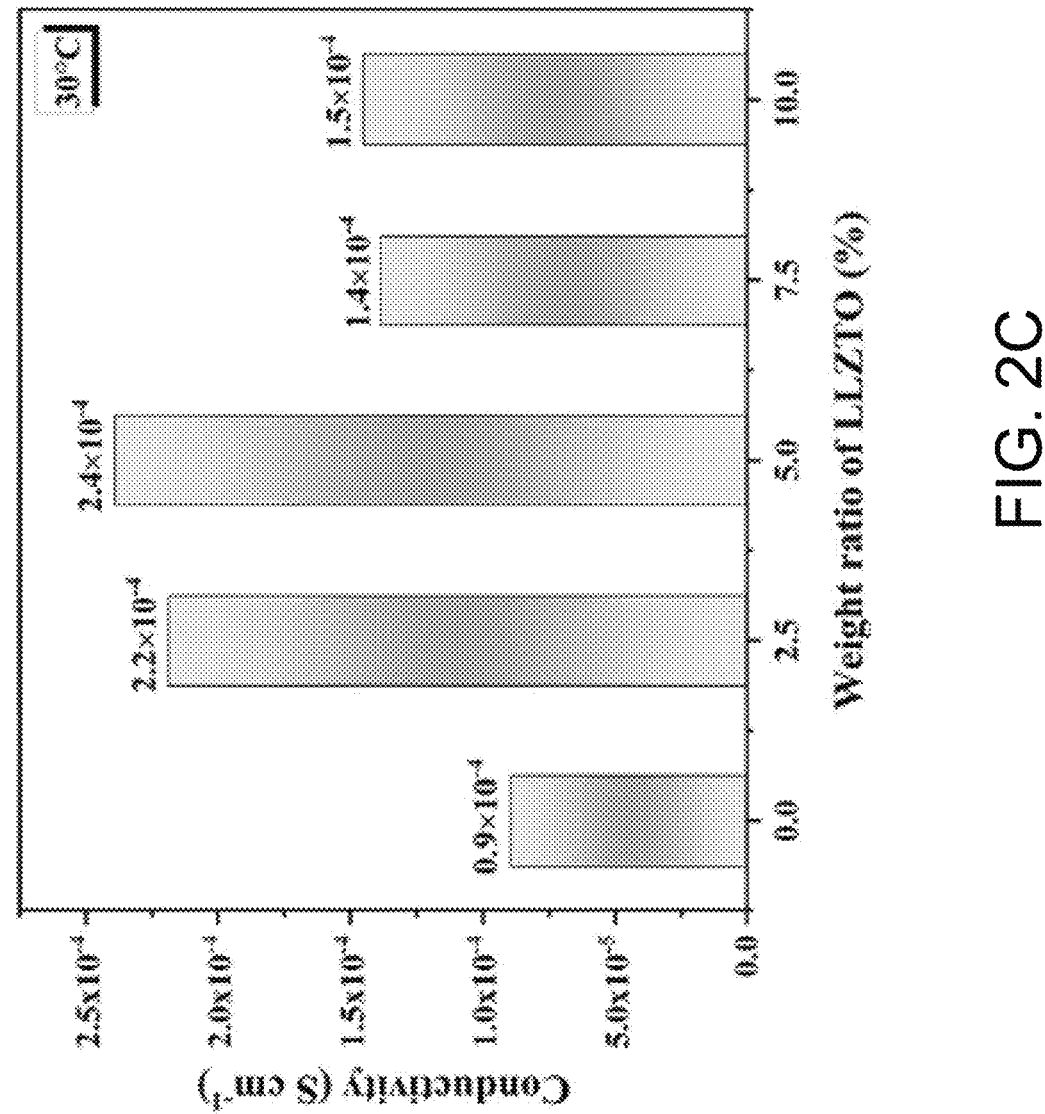

A sample of each prepared CSPE membrane was sandwiched between two stainless steel (SS) plates and assembled in a coin cell, yielding what is referred to herein as SS|CSPE|SS cells. Alternate current (AC) impedance of each of these SS|CSPE|SS cells was conducted to characterize the ionic conductivities of the CSPE membranes. FIG. 2C presents the ionic conductivity values of the CSPE membranes at 30° C. Compared with the CSPE-0 membrane, the ionic conductivity was significantly improved after adding LLZTO particles. Among them, CSPE-5 delivered the highest ionic conductivity value of $2.4 \times 10^{-4}$ S·cm$^{-1}$, which is about 2.7 times higher than that of the CSPE-0 membrane ($0.9 \times 10^{-4}$ S·cm$^{-1}$). In previous reported studies, one reason for the improvement in ionic conductivity was attributed to the reduced crystallinity of the polymer matrix and its enhanced segmental motion of chains after adding ceramic particles. However, introducing LLZTO ceramic filler could not reduce the crystallinity of the CSPE-0 membrane in the investigations discussed herein, as verified by the DSC results. This phenomenon has also been observed in the report of combining LLZTO nanowires with a polyacrylonitrile matrix. Therefore, the decrease in PVDF crystallinity was not the predominant factor for the observed conductivity enhancement. It believed that the improvement in ionic conductivity may be attributed to the following aspects.

Figure 2D:
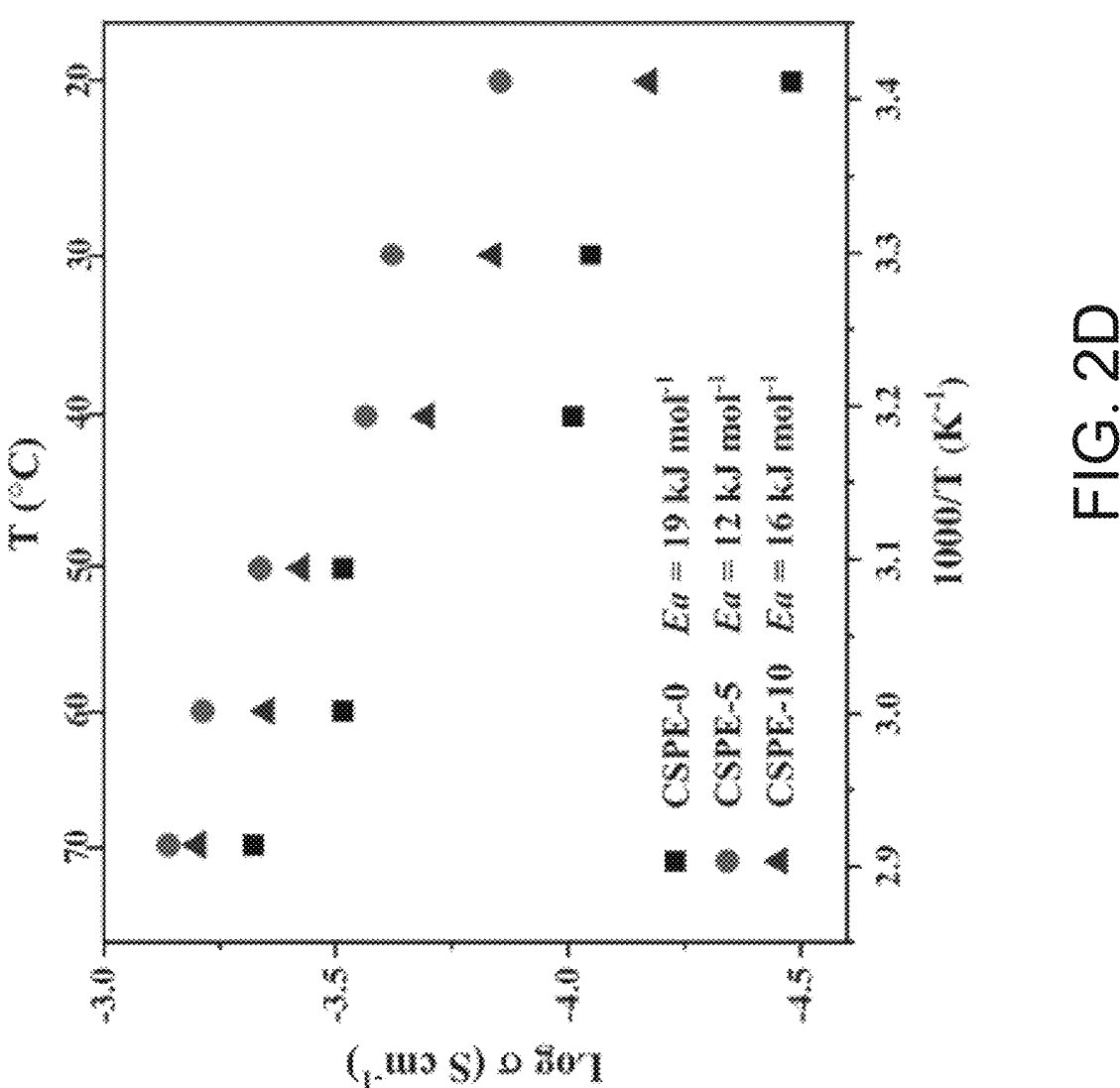

Firstly, the LLZTO ceramic filler may promote the dissociation of LiTFSI salt to release more free ions, which can be confirmed by the previously noted FT-IR spectra. The dissociation ratio of LiTFSI in the electrolytes was calculated to be 83.5% and 91.7% for the CSPE-0 and CSPE-5 membranes, respectively. Secondly, based on the Lewis acid-base theory, the TFSI-anions (Lewis base) may be immobilized on the surface of the LLZTO ceramic particles (Lewis acid), resulting in higher free Li+ concentrations and rapid Li+ conductance paths at the ceramic-polymer interface. Furthermore, fixed TFSI-anions may suppress the formation of space charge, thereby facilitating Li+ diffusion from bulk electrolyte to the electrode surface. However, the ionic conductivity decreased with the further addition of LLZTO, exhibiting a percolation behavior. This suggested that excess LLZTO filler may cause particle agglomeration, poor surface contact with PVDF matrix, and/or inhibited ion migration. The high ionic conductivity of the CSPE-5 membrane at 30° C. demonstrated its potential application in room-temperature SLBs. Arrhenius plots (FIG. 2D) of the ionic conductivities for the CSPE-0, CSPE-5 and CSPE-10 membranes were measured over a temperature range of 20 to 70° C. The CSPE-5 membrane exhibited the highest ionic conductivity in all the temperature ranges, and exhibited the lowest activation energy (12 kJ mol$^{-1}$), indicating a lower energy barrier for Li+ migration.

Figure 2E:
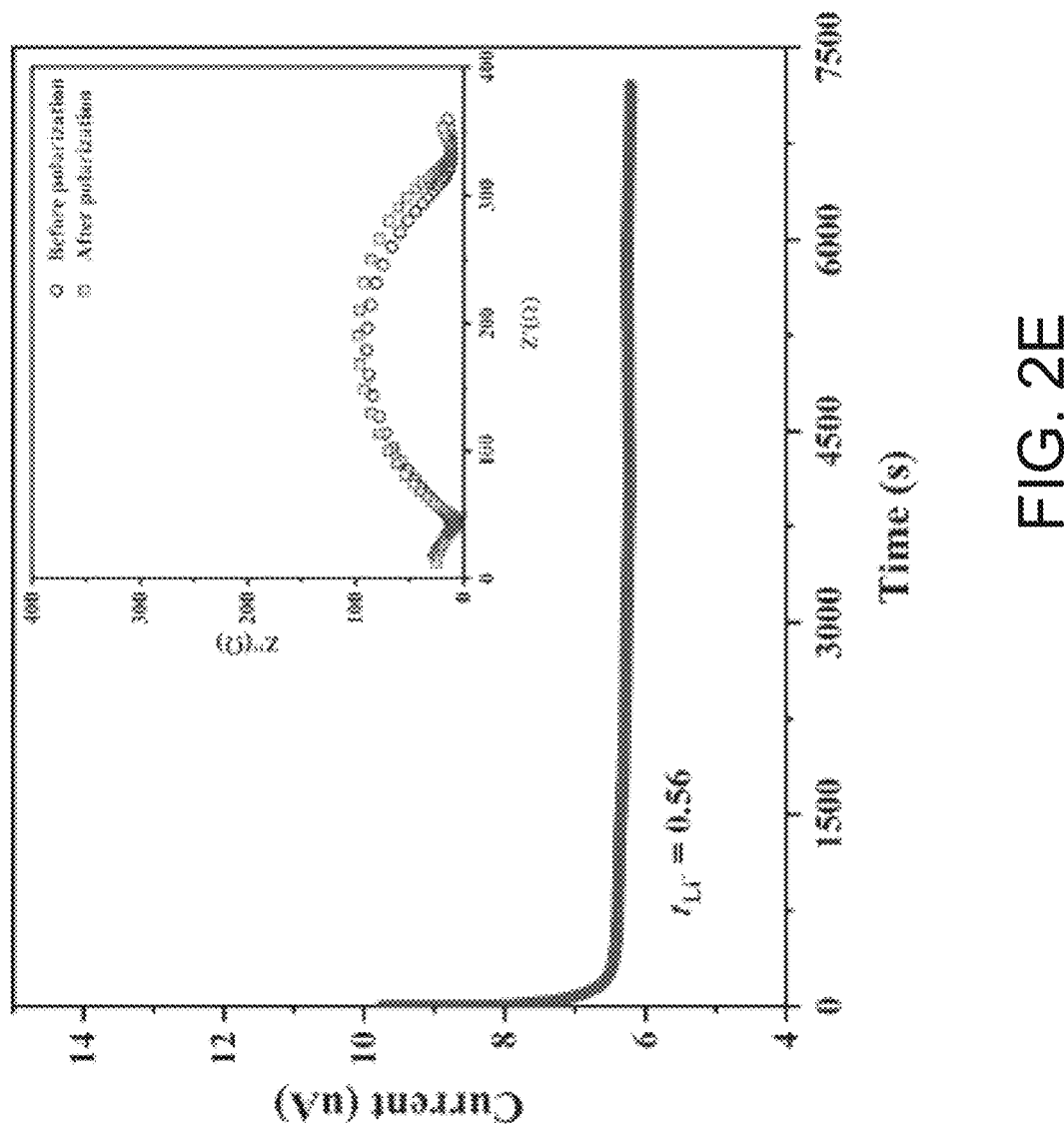
Figure 2F:
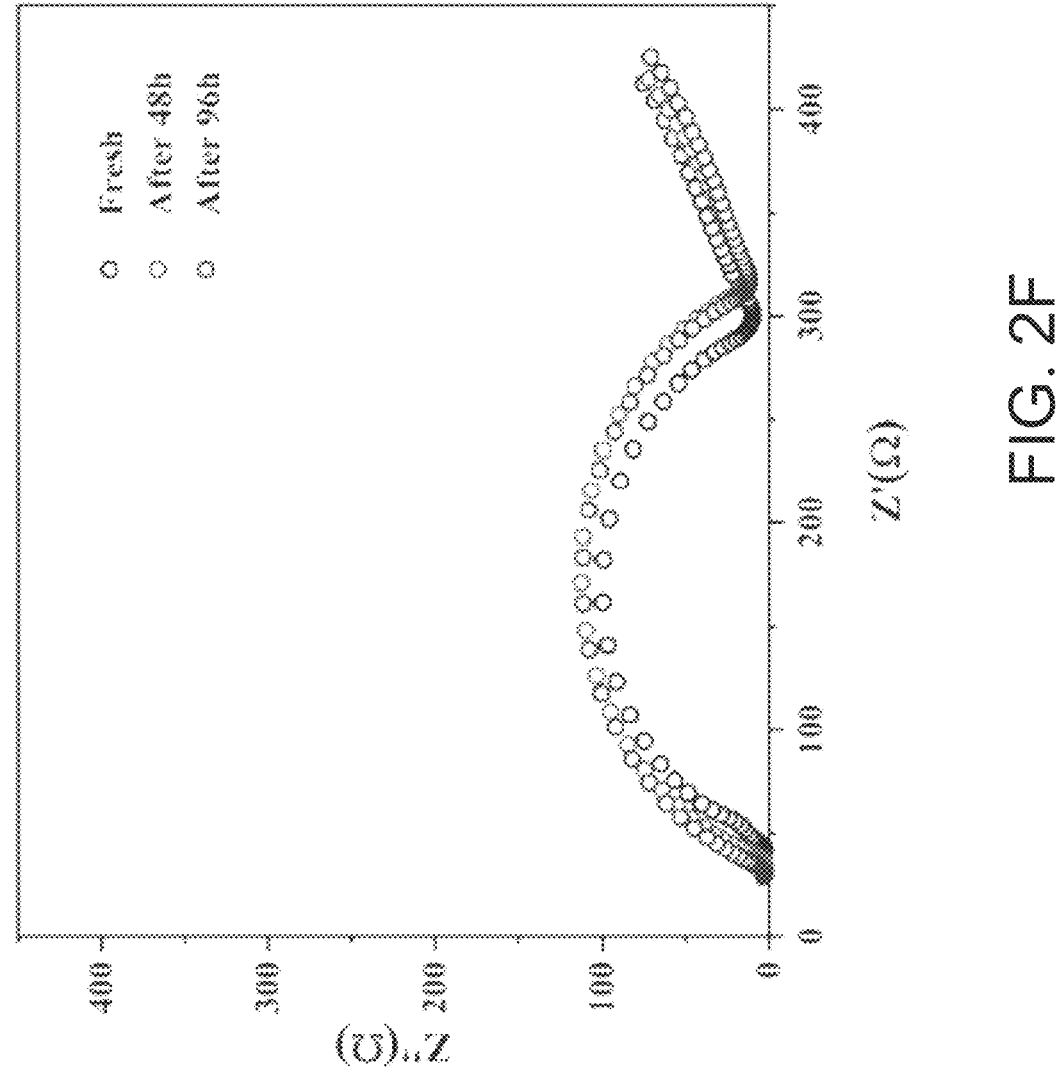

A sample was prepared of a CSPE-5 membrane sandwiched between two lithium (Li) plates and assembled in a symmetric coin cell, yielding what is referred to herein as an LilCSPElLi cell. FIG. 2E shows the direct current polarization of the LilCSPE-5lLi cell at a potential step of 10 mV and the inset presents the corresponding AC impedance spectra before and after polarization. The slightly increased impedances after polarization indicated that a stable passivation layer was generated on the surface of the lithium metal, demonstrating outstanding interfacial stability. The calculated Li+ transference number (t+) of the CSPE-5 membrane (0.56) was much higher than that of the CSPE-0 membrane (0.33). The high t+ value of the CSPE-5 membrane reflected the effective transportation of Li ions, which facilitated the uniform distribution of space charge near the anode, thereby preventing the deposition of dendritic Li. The interfacial resistance of the LilCSPE-5lLi cell after storage for different times is shown in FIG. 2F. The interfacial resistance increased from 258 ohms (fresh) to 283 ohms (after 48 hours), then remained nearly unchanged (285 ohms after % hours). This phenomenon indicated that a stable and thin passivation layer was produced on the surface of lithium metal and further suppressed the enhancement of the interfacial resistance.

Figure 3A:
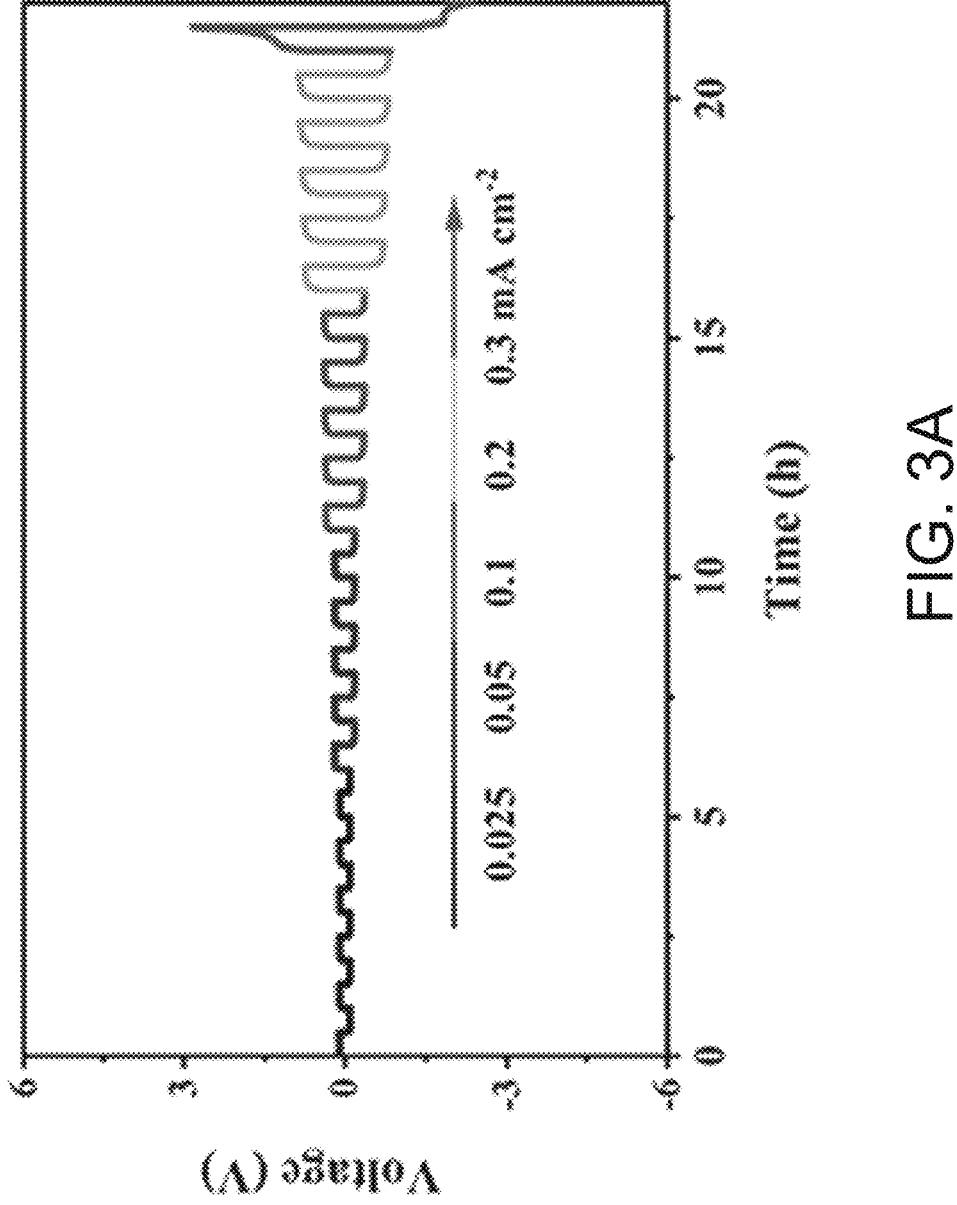
FIGS. 3A through 3H represent electrochemical stability and dendrite suppression of the CSPE-5 membrane in a Li|Li symmetric cell in accordance with nonlimiting embodiments of this invention.
Figure 3B:
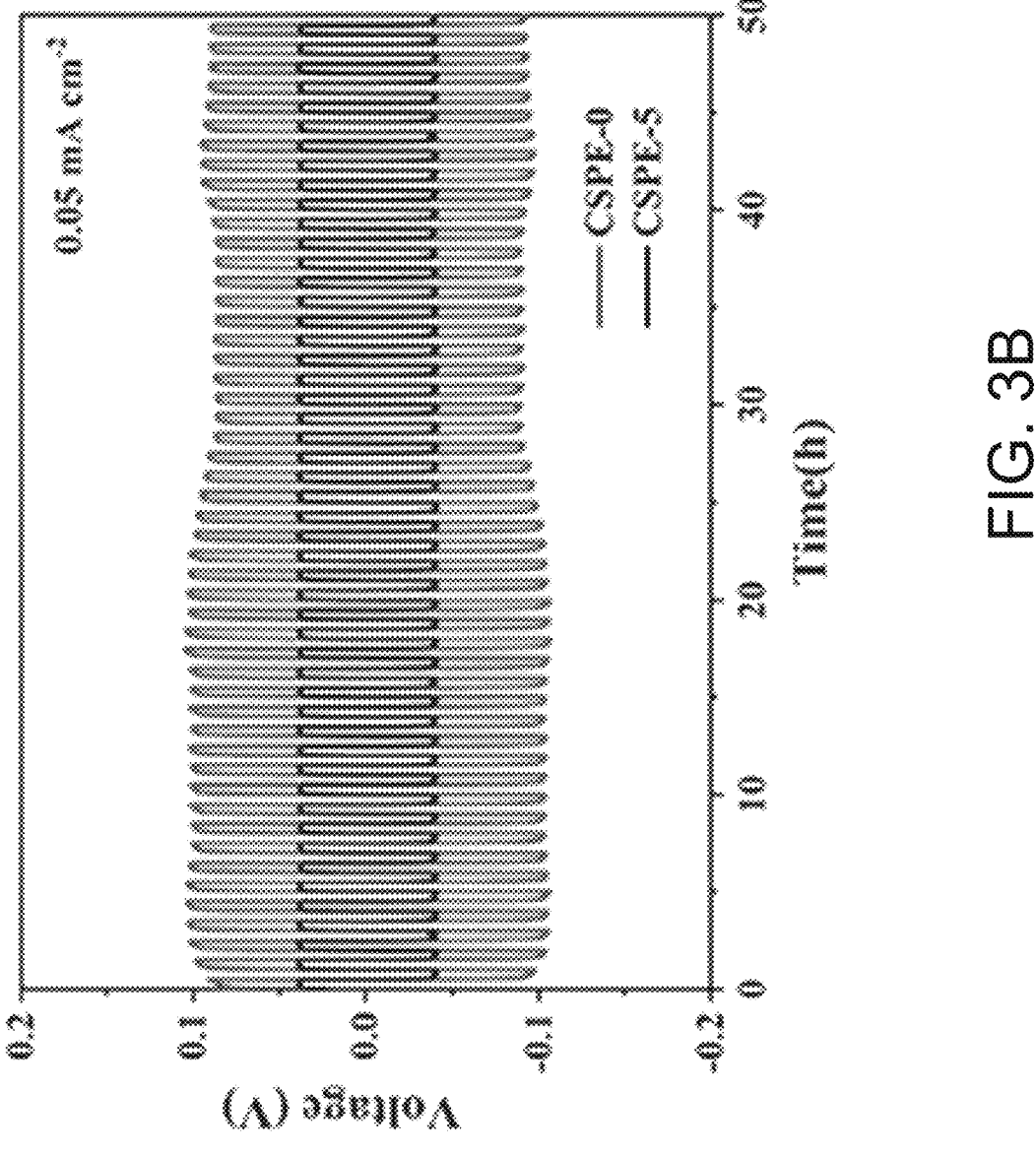

As shown in FIG. 3A, the LilCSPE-5lLi cell was cycled under increasing current densities from 0.025 to 0.3 mA cm$^2$. The voltage profile shows flat platforms that increased with current density. However, the battery failed due to a dramatic over potential increase under a relatively high current (0.3 mA cm$^{-2}$). This phenomenon may be owing to the formation of an unstable solid electrolyte interface (SEI) layer at high current density, and thus resulting in a large polarization. In order to evaluate the compatibility of the CSPE membranes with lithium metal electrode, galvanostatic charging/discharging measurements of symmetric LilCSPE-0lLi and LilCSPE-5lLi cells were performed at a current density of 0.05 mA cm$^{-2}$. As shown in FIG. 3B, the LilCSPE-0lLi cell displayed a fluctuant voltage profile with an overpotential of approximately 105 mV. In contrast, the LilCSPE-5lLi exhibited a much smaller overpotential (around 40 mV), which arises from the increased ionic conductivity by the addition of LLZTO ceramic filler. Moreover, a stable voltage curve was obtained from the LilCSPE-5lLi cell, indicating that a stable interface was formed between Li and CSPE-5 at the tested current density of 0.05 mA cm$^{-2}$.

Figure 3C:
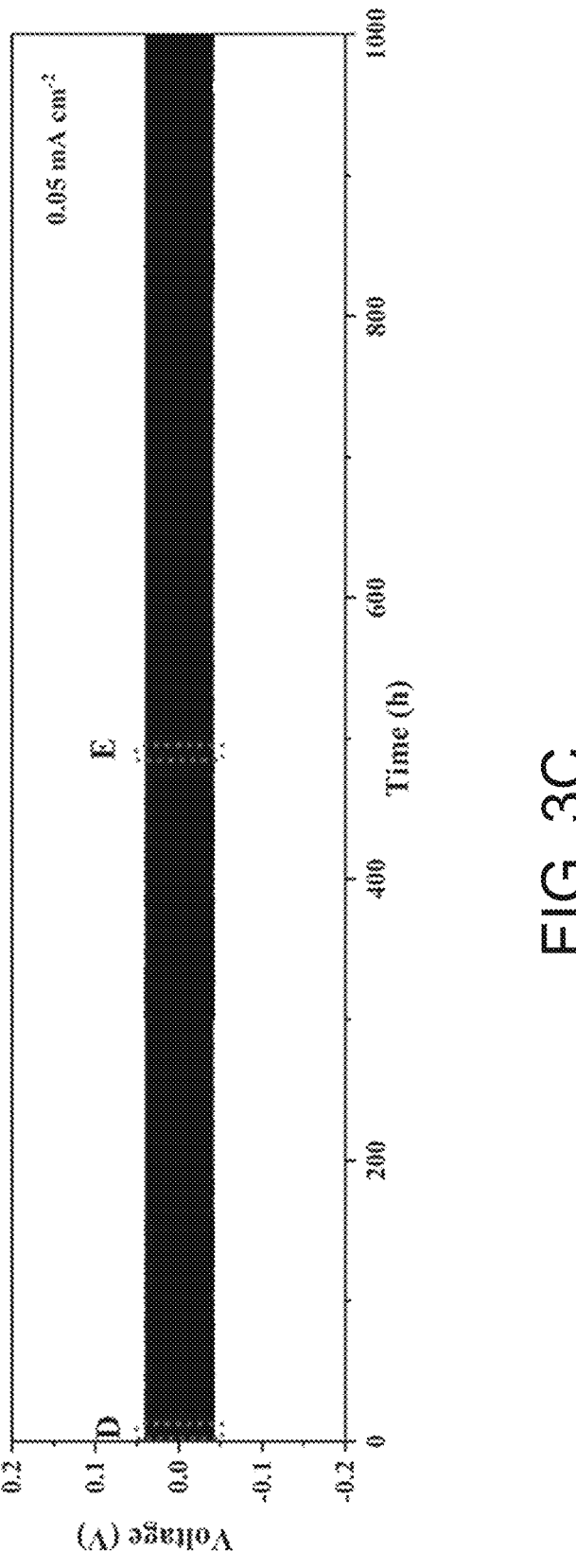
Figure 3D:
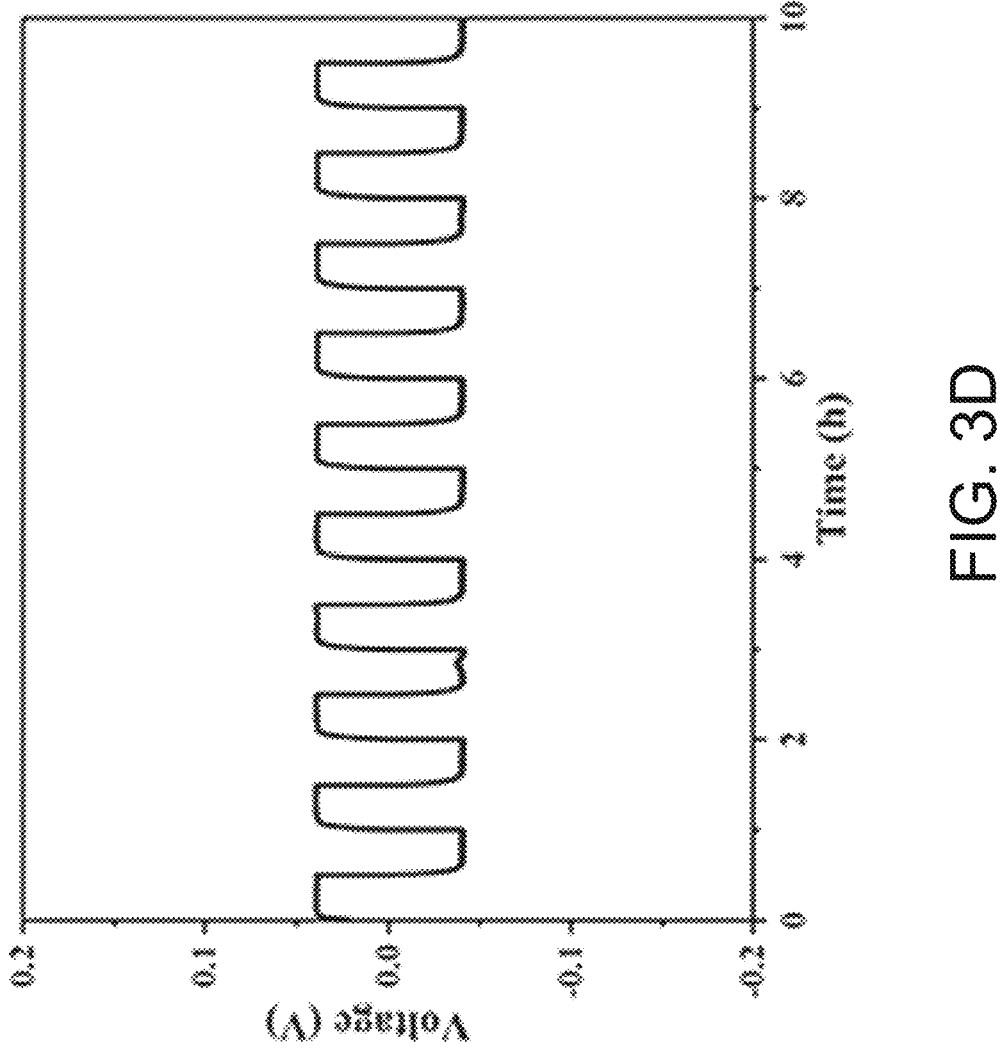
Figure 3E:
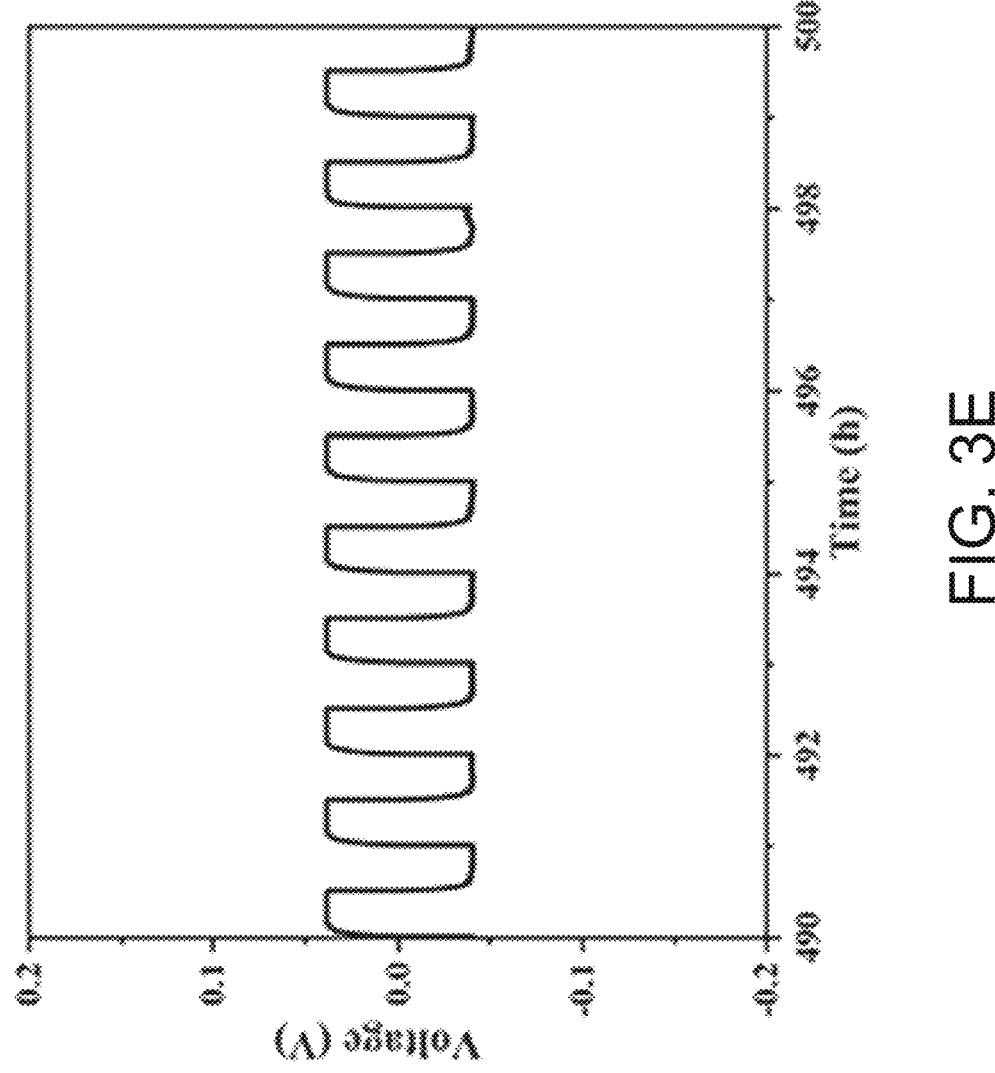
Figure 3F:
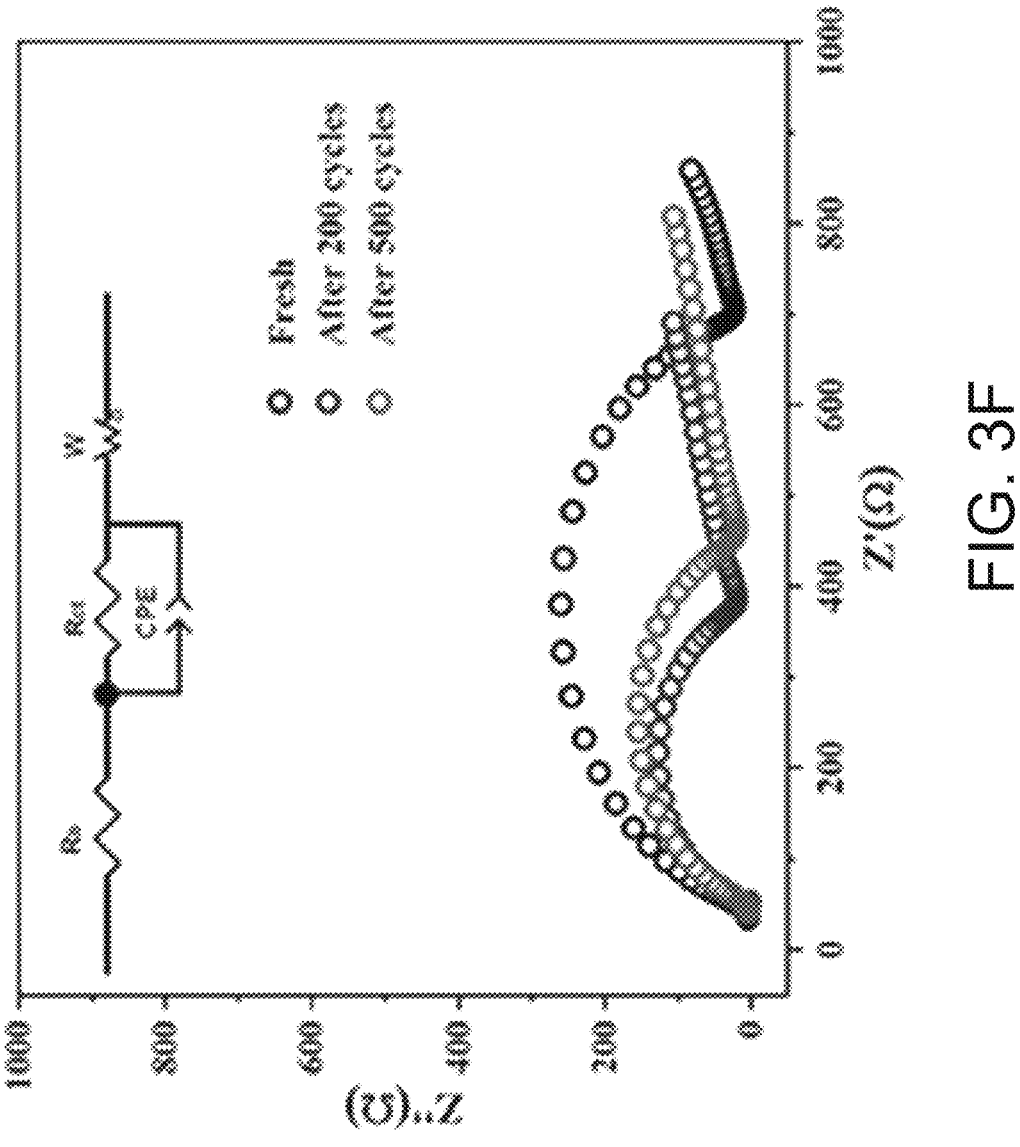

FIG. 3C displays the long-term cycling performance of LilCSPE-5lLi cell, which exhibited a low overpotential and stable voltage profile with no sign of a short circuit even after 1000 hours. The detailed voltage curves are presented in FIGS. 3D and 3E, showing flat platforms with low overpotential of 40 mV. In order to explore the origin of the outstanding electrochemical cycling performance, electrochemical impedance spectroscopy (EIS) was carried out to understand the interfacial compatibility between the CSPE-5 membrane and an Li electrode. As illustrated in FIG. 3F, the EIS spectra of the pristine ("fresh") and tested LilCSPE-5lLi cell showed two arcs, arising from the bulk resistance ($R_b$) (high-frequency range) and charge-transfer resistance ($R_{ct}$) (intermediate-frequency range) between the electrode and electrolyte interface, respectively. The value of $R_{et}$ decreased from 672 ohms (fresh) to 348 ohms after 200 cycles, relating to the electrochemical activation process between the CSPE and Li metal. A minor increase in $R_{et}$ can be observed after 500 cycles, indicating that a stable interface was produced between the CSPE-5 membrane and Li electrode.

Figure 3H:
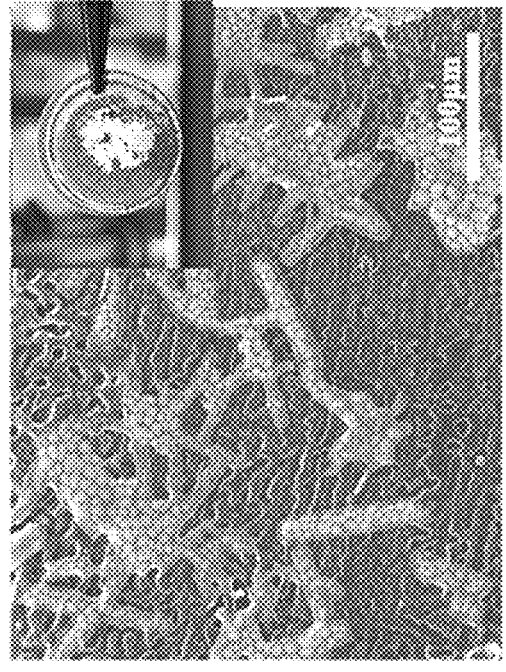
Figure 3G:
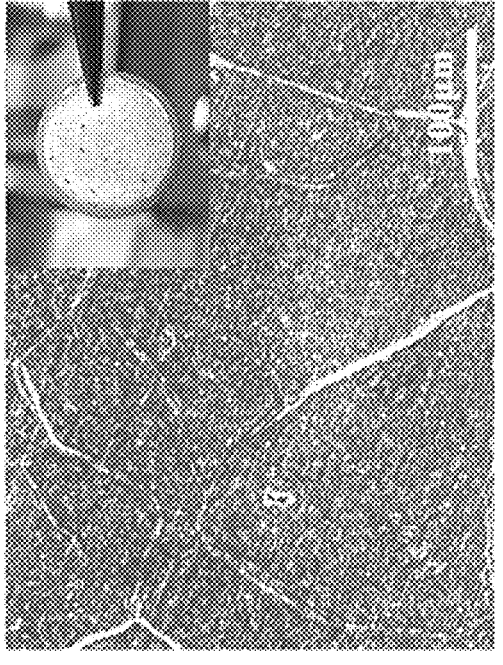

To investigate the stability of the CSPE-5 membrane and its inhibition to Li dendrite growth, the LilCSPE-5lLi cell was disassembled after 1000 cycles. An SEM image and its corresponding EDX mapping of the cycled CSPE-5 membrane demonstrated that the uniform and compact surface morphology was maintained even after long-term cycling. There was no significant difference in the FT-IR spectra of the pristine and cycled CSPE-5 membrane, indicating its stability during the Li plating/stripping process. Moreover, the SEM image in FIG. 3G displays the surface morphology of the cycled Li electrode of the LilCSPE-5lLi cell, showing a compact dendrite-free surface feature, which was in sharp contrast to the rough and dendritic surface observed for the Li electrode from a control tested Lilliquid electrolytelLi cell (FIG. 3H). The inset image in FIG. 3G shows that the Li anode retained its metallic luster after cycling, while the Li metal turned to black (inset of FIG. 3H) in liquid electrolyte cell. The differences in color and surface morphology of the cycled Li anode indicated that the CSPE-5 membrane exhibited a remarkable inhibitory effect on the free growth of lithium dendrites. The excellent dendrite suppression of the CSPE-5 membrane was attributed to the enhanced mechanical strength and uniform Li deposition. In summary, the excellent long-term cycling stability was attributed to the synergistic effect of good interface compatibility between CSPE-5 membrane and the Li electrode, stability of the CSPE-5 membrane, and its outstanding Li dendrite inhibition.

In order to evaluate the compatibility of the CSPE-5 membrane in a full cell, solid-state solid-state CR2032-type coin cells were assembled using Li metal as the anode electrode and LFP or NCM as the cathode electrode (respectively, LFPlCSPE-5lLi and NCMlCSPE-5lLi cells). The LFP and NCM cathode electrodes were prepared by mixing either 70 wt % LFP or NCM), 10 wt % conductive carbon black (Super-P), and 20 wt % CSPE (as a binder) in N-Methyl-2-pyrrolidone solvent to form a homogeneous slurry. The slurry was cast and dried in a vacuum oven at 80° C. The mass loading of LFP and NCM was around 1.8 and 1.0 mg cm$^{-2}$, respectively.

Figure 4A:
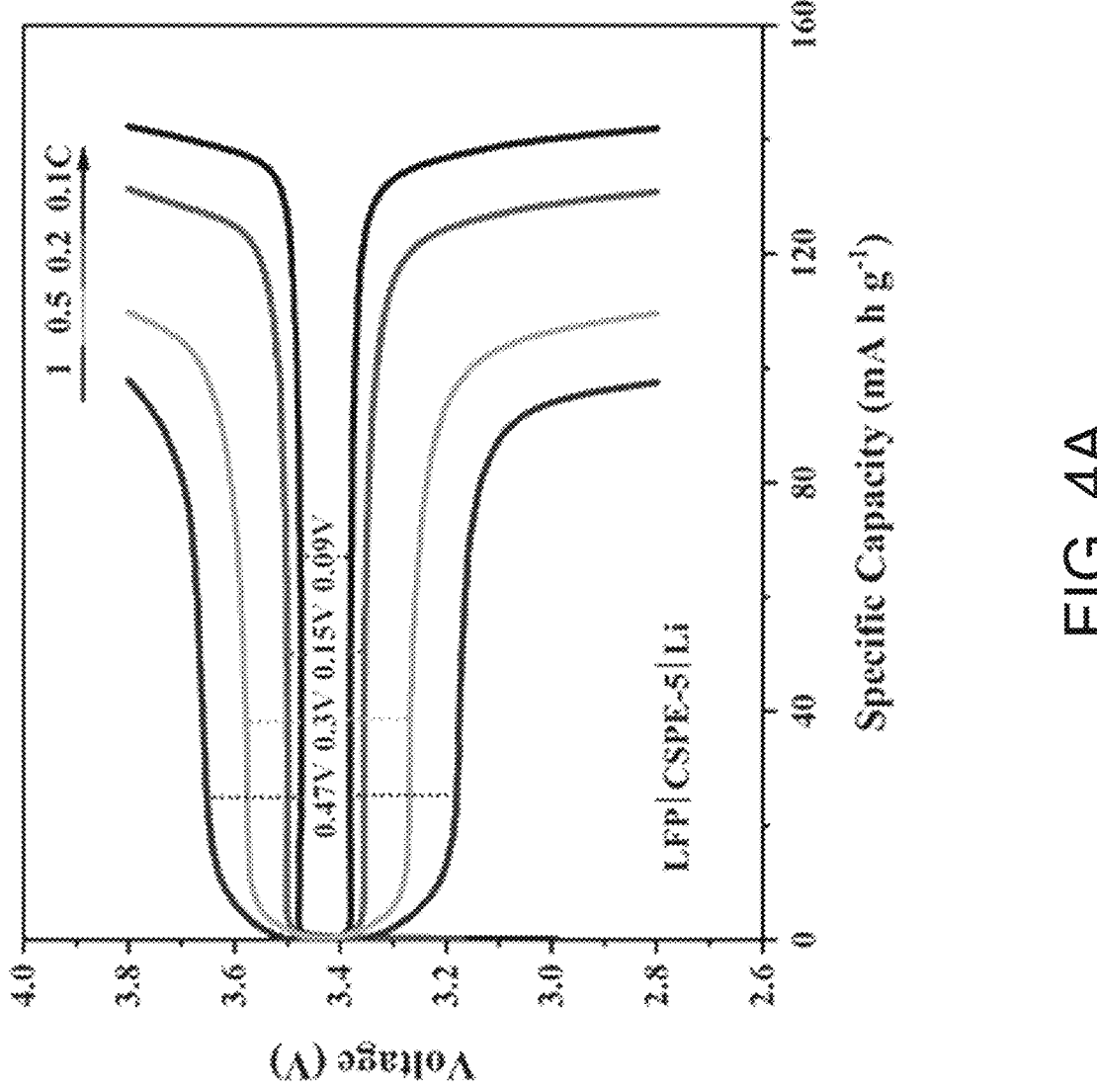
FIGS. 4A through 4E represent electrochemical performances of solid LFP|CSPE-5|Li and NCM|CSPE-5|Li cells in accordance with nonlimiting embodiments of this invention.
Figure 4B:
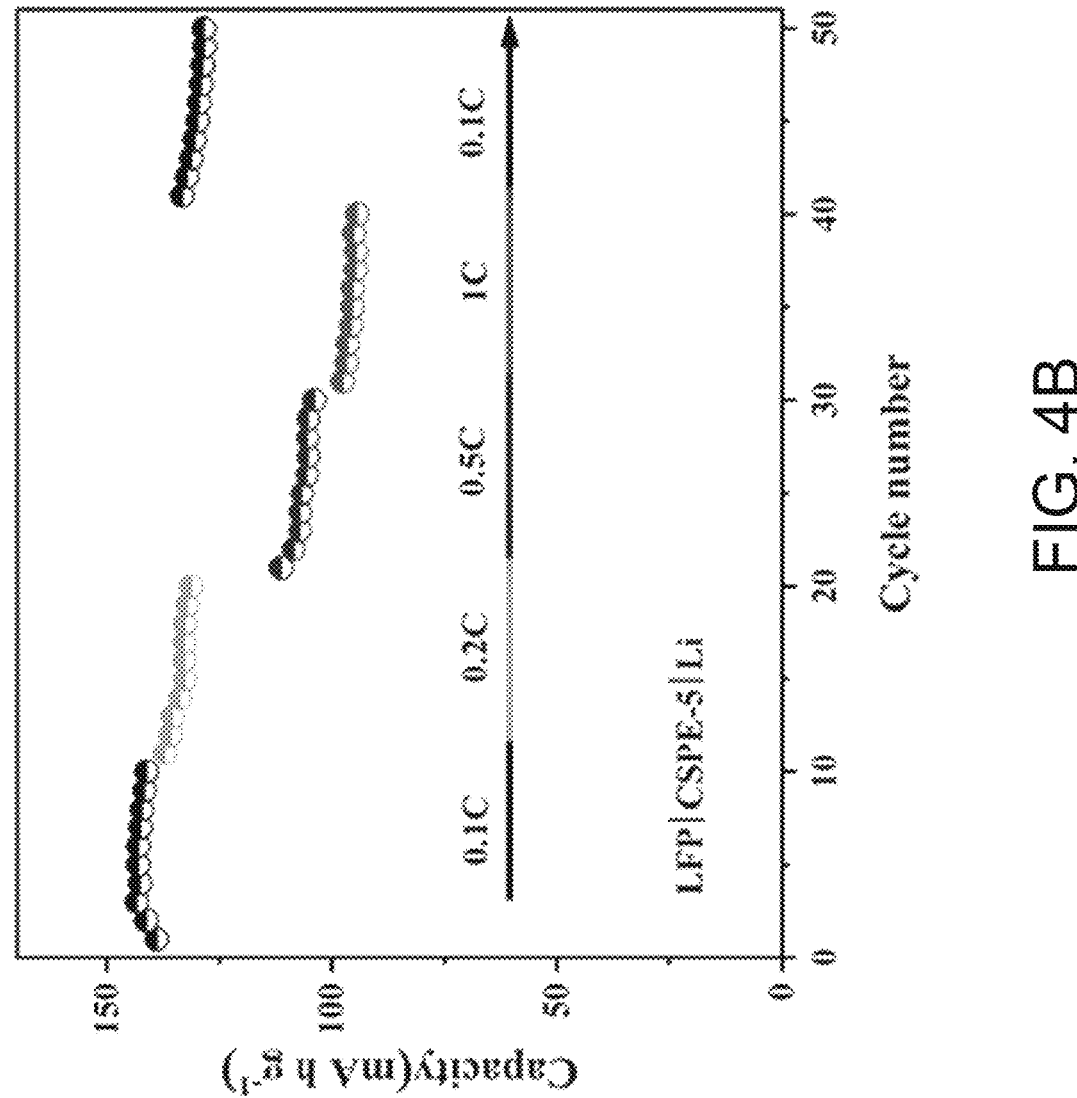
Figure 4C:
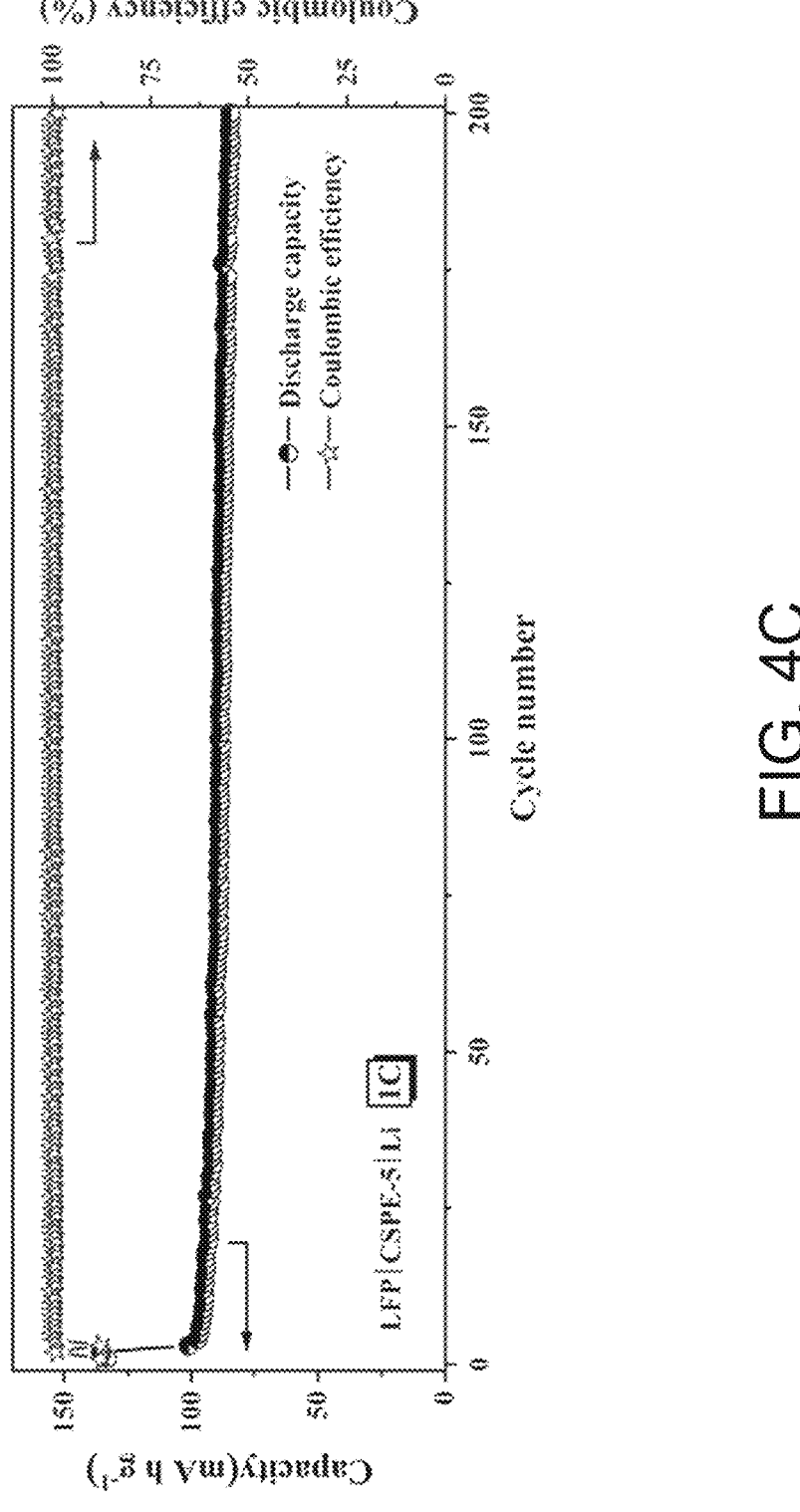

FIG. 4A presents the typical charge-discharge curves of the LFPlCSPE-5lLi cell at various current densities. Flat potential platforms can be clearly observed on both charge and discharge curves at all current densities. The voltage gap between charge and discharge plateaus was limited to 0.09 V at 0.1 C, which enlarged to 0.15, 0.3, and 0.47 V at 0.2, 0.5, and 1 C, respectively. This suggested that polarization increases as a function of current density. As shown in FIG. 4B, the specific discharge capacities of the cells at current rates of 0.1, 0.2, 0.5, and 1 C were 142, 131, 110, and 98 mA h g$^{-1}$, respectively. When the current rate returned to 0.1 C, the discharge capacity was restored to 133 mA h g$^{-1}$, showing good rate performance. FIG. 4C displays the long-term cycling performance of the LFPlCSPE-5lLi cell at the 1 C rate. After the first activation cycle at 0.1 C, the coulombic efficiency was stable and close to 100%. A discharge capacity of 86 mA h g$^{-1}$ was maintained after 200 cycles (0.06% capacity loss per cycle), indicating its excellent cycling stability. The outstanding electrochemical performance is attributed to the high ionic conductivity and excellent electrochemical stability of the CSPE-5 membrane, as well as good compatibility between the CSPE-5 membrane with both the LFP cathode and the Li metal anode.

Figure 4D:
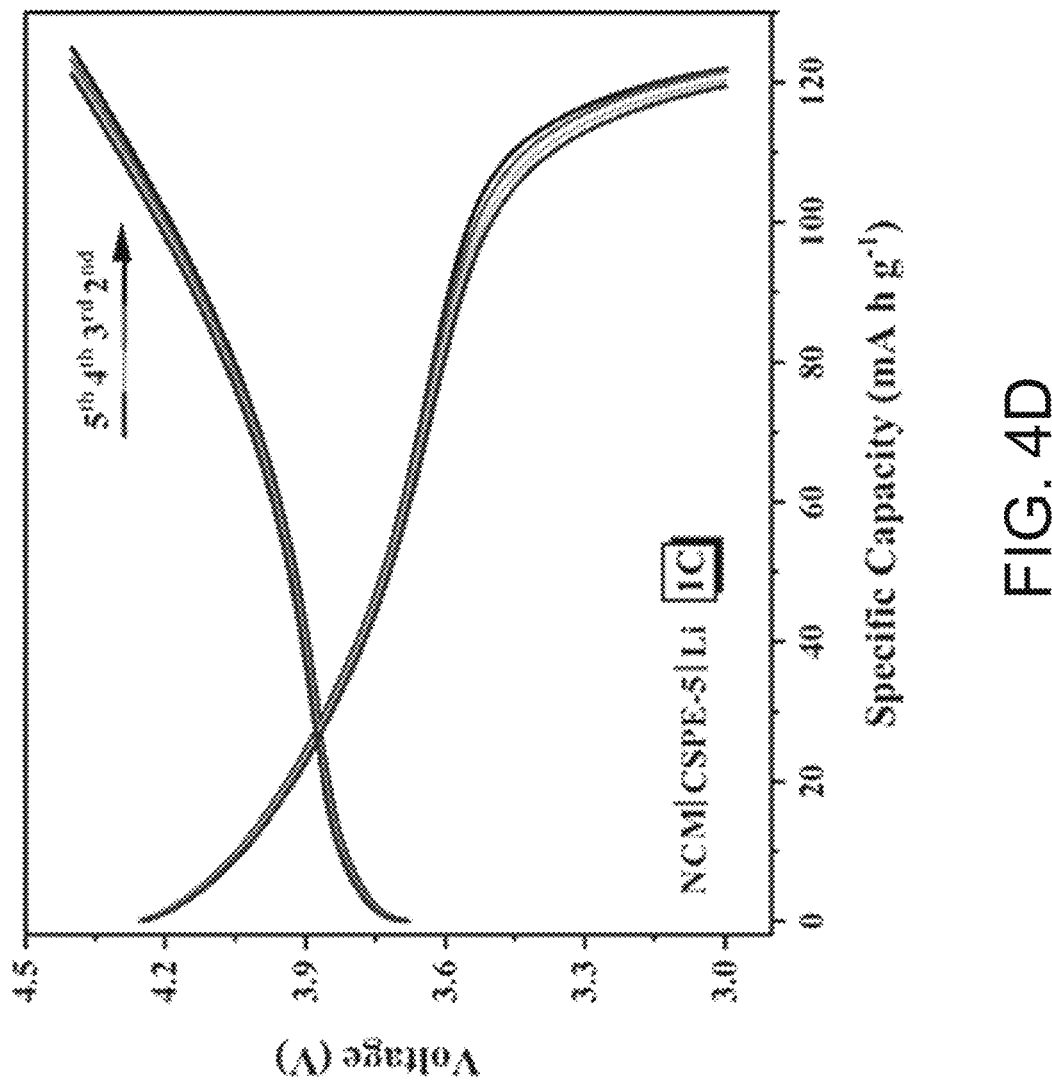
Figure 4E:
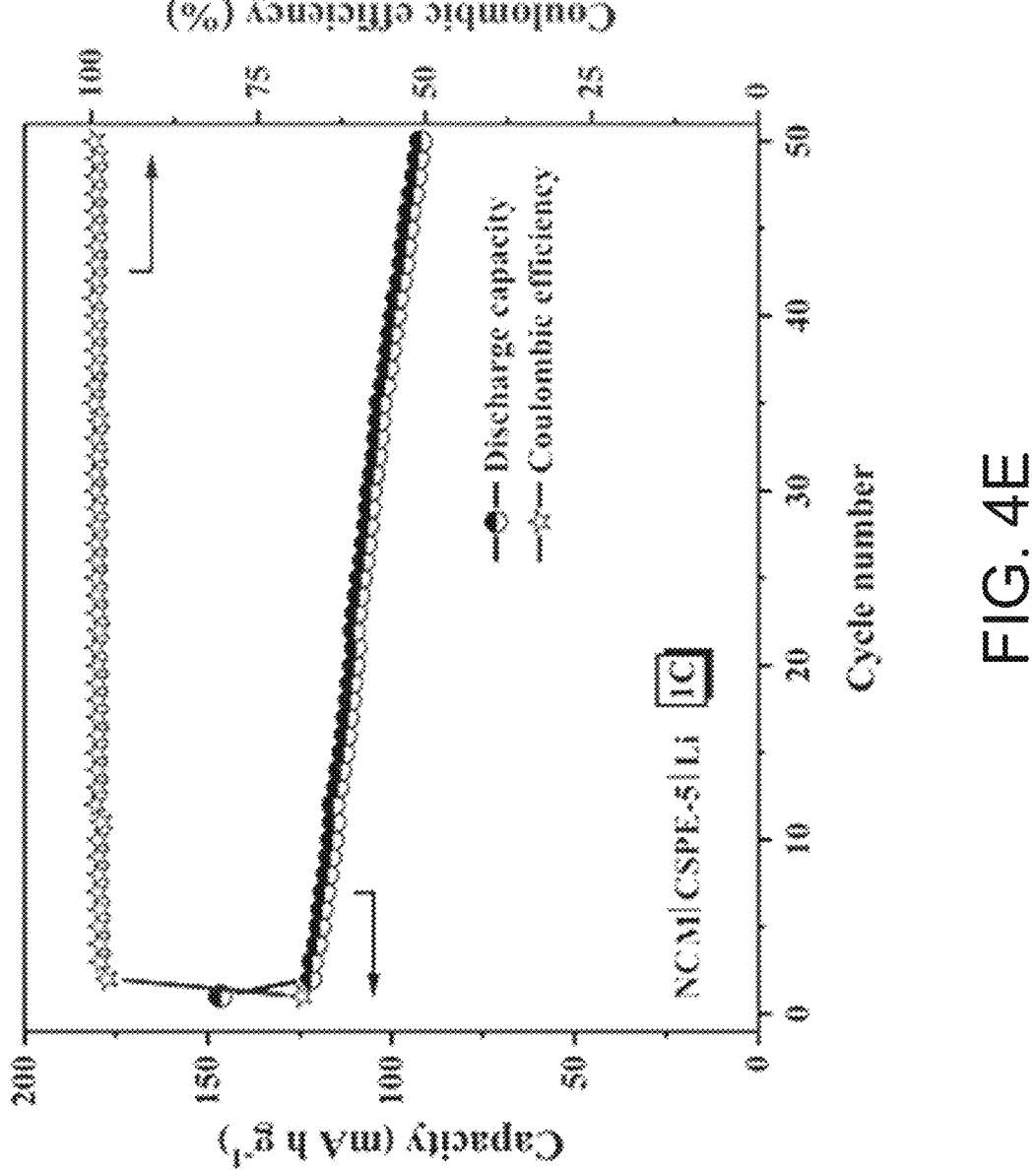

FIG. 4D presents the overlapping charge/discharge curves of the NCMlCSPE-5lLi cell, indicating that CSPE-5 exhibited good compatibility with the high-voltage NCM cathode. As shown in FIG. 4E, the NCMlCSPE-5lLi cell displayed slowly degraded discharge capacity while maintaining stable coulombic efficiency close to 100%. The decrease in capacity was attributed to kinetic or non-kinetic factors, which have also been observed in liquid electrolyte NCM batteries. However, a comparable discharge capacity of 92 mA h g$^{-1}$ was maintained after 50 cycles at a 1 C rate. The results demonstrated that the CSPE-5 material is a promising solid electrolyte candidate for room-temperature high-voltage solid-state Li battery.

Figure 5A:
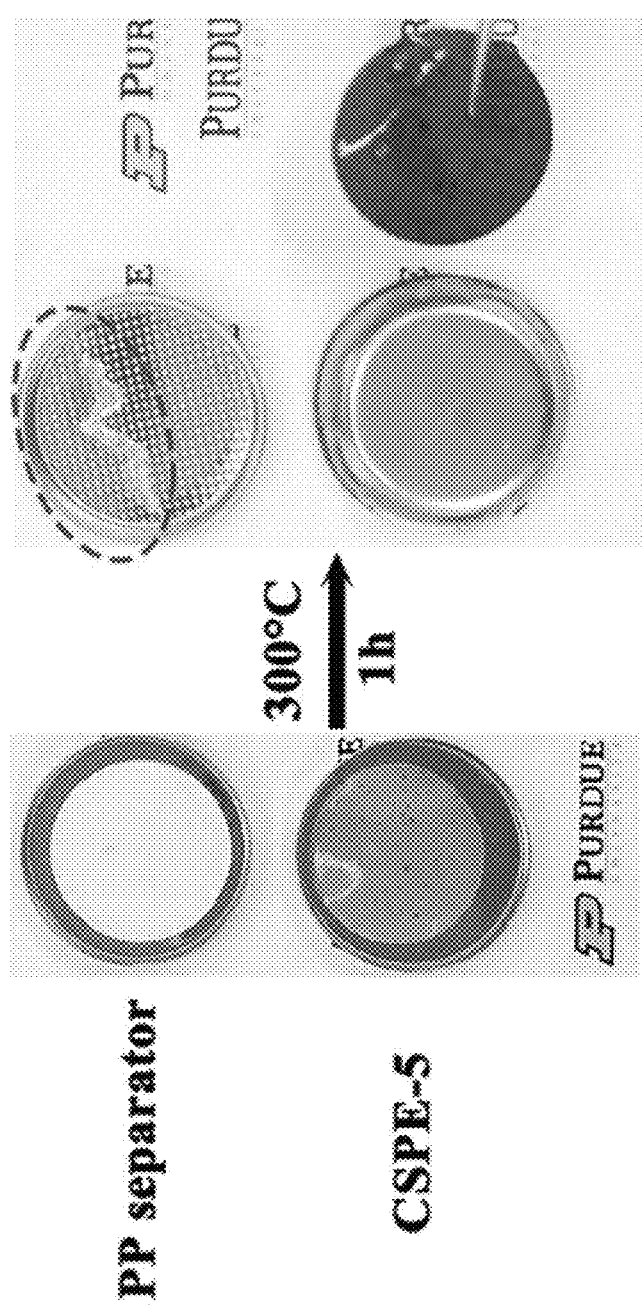
FIGS. 5A through 5D represent thermal stability and thermal runaway behavior of an NCM|CSPE-5|Li cell in accordance with a nonlimiting embodiment of this invention.

To compare the thermal stability between the CSPE-5 membrane and a conventional polypropylene (PP) separator, two empty coin cells were assembled only using the CSPE-5 membrane and a PP separator, respectively. FIG. 5A contains images showing the PP separator and CSPE-5 membrane before and after heating at 300° C. for 1 hour. After the high-temperature treatment, the PP separator melted and shrank into a small piece. In contrast, the CSPE-5 membrane maintained its original structure, which can prevent direct contact between the cathode and anode under abused condition or elevated temperatures. This high thermal stability of the CSPE-5 membrane could reduce the possibility of a short circuit caused by the melting of the separator, thus significantly improving the thermal safety of the cell.

Figure 5B:
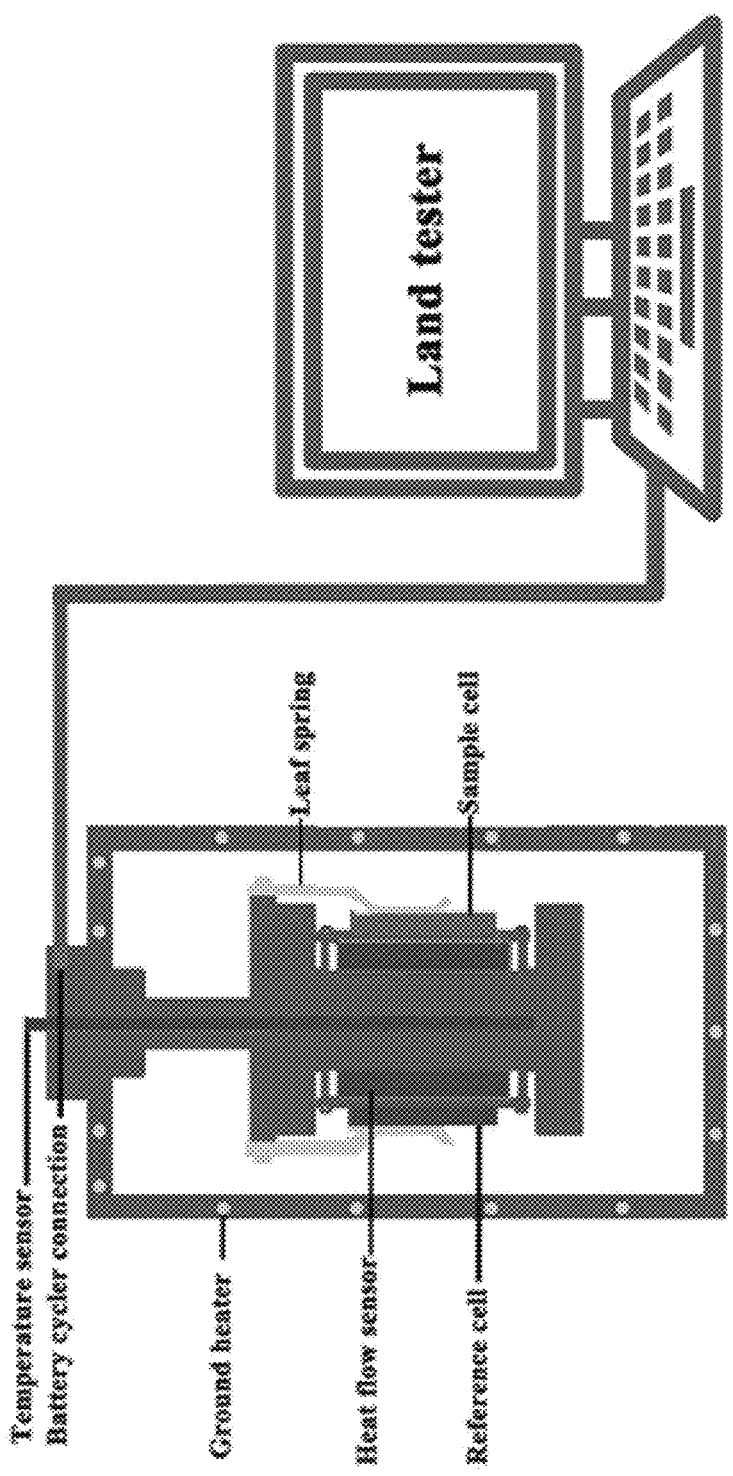
Figure 5C:
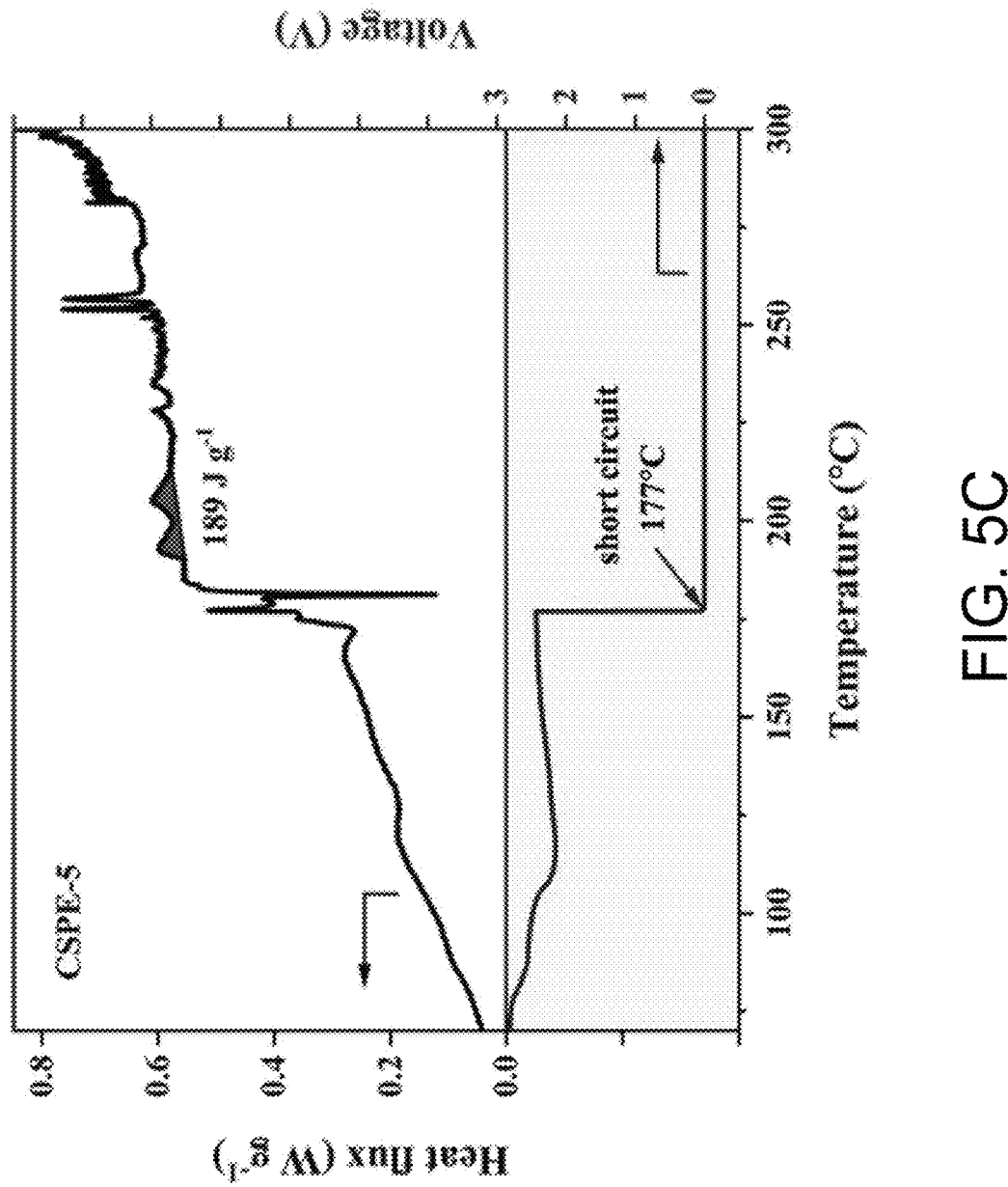

Furthermore, a multiple module calorimeter (MMC) was used to in-situ investigate the thermal stability and thermal runaway process of the NCM|CSPE-5|Li cell. As presented in FIG. 5B, the MMC instrument included a temperature sensor and two heat flow sensors that operated in a thermostatic chamber. The heat flow sensors were used to detect the heat flow of the NCM|CSPE-5|Li cell and a reference cell. The temperature in the thermostatic chamber was measured by the temperature sensor. The solid-state NCM|CSPE-5|Li cell was assembled and tested using MMC with a heating rate of 0.2° C./min at the temperature range of 40 to 300° C. During the heating process, the open-circuit voltage (OCV) of the NCM|CSPE-5|Li cell was recorded by a Land battery tester. FIG. 5C shows the heat flow profile and the corresponding open-circuit voltage curve of the NCM|CSPE-5|Li cell. It can be observed that the OCV curve exhibits a slight undulation with temperature increase. Interestingly, the OCV dropped dramatically to 0 V at 177° C., which is very close to the melting point of Li metal (180° C.). This result indicated that the solid NCM|CSPE-5|Li cell was short circuited owing to contact of the molten Li metal electrode with the cell case.

Figure 5D:
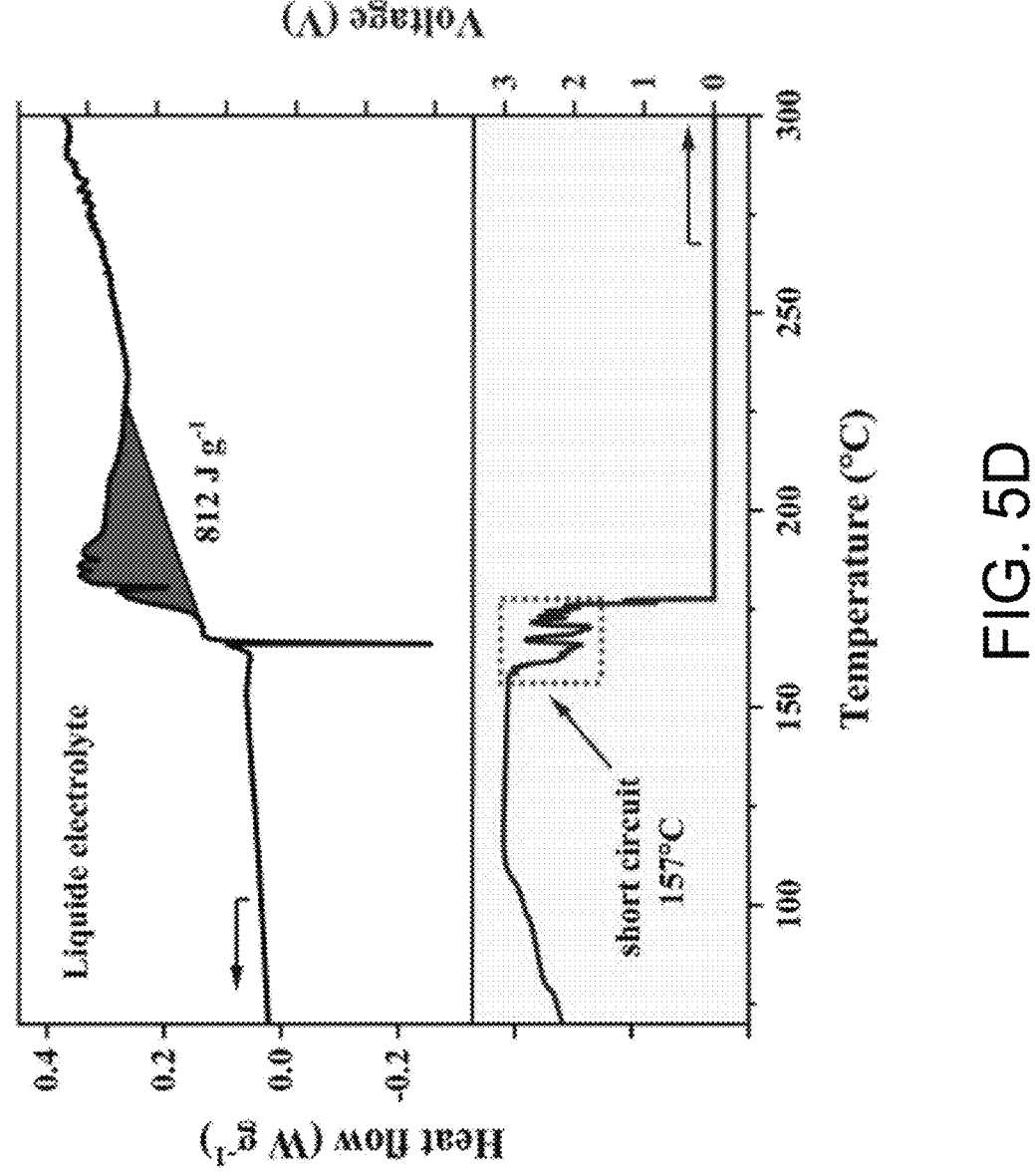

In a control experiment, a NCM|liquid electrolyte|Li cell using a PP separator and liquid electrolyte showed a significant fluctuation in voltage curve when the temperature reached 157° C. (FIG. 5D). This was attributed to the melting of the PP separator (160° C.), resulting in a potential internal shorting and thermal runaway. Moreover, the exothermic peaks marked in red color were attributed to the interaction of the cathode, electrolyte and melted Li metal electrode after the short circuit of cells. The generated heat during the thermal runaway process was determined by calculating the integrals of these peaks. The heat release of the solid NCM|CSPE-5|Li cell is calculated to be 189 J g$^{-1}$, which is only 23% of the value for the cell with liquid electrolyte (812 J g$^{-1}$). The lower heat dissipation demonstrated that the solid NCM|CSPE-5|Li cell should be safer than the liquid electrolyte cell even in the event of a short circuit. The superior thermal safety of NCM|CSPE-5|Li cell was attributed to the solid-state property and outstanding thermal stability of the CSPE-5 membrane. The solid-state NCM|CSPE-5|Li cell exhibited higher thermally stable temperature and generated less heat than the liquid electrolyte cell, indicating that the CSPE-5 material is a promising thermally safe electrolyte for the applied of Lithium metal batteries.

In view of the foregoing, it was concluded that by dispersing the LLZTO ceramic filler into a PVDF polymer electrolyte, the resulting PVDF-LLZTO-LiTFSI (PLL) composite solid polymer electrolytes (CSPEs) showed simultaneous improvements in room-temperature ionic conductivity (2.4×10$^{-4}$ S·cm$^{-1}$), electrochemical window (about 4.8 V), mechanical properties (381.7 MPa in modulus and 9.2 MPa in hardness), dendrite suppression, and thermal stability (about 330° C.). In addition, the room-temperature solid-state LFP|CSPE|Li full cell exhibited outstanding rate performance and excellent long-term cycling stability (0.06% capacity loss per cycle). Furthermore, the solid-state NCM|CSPE|Li full cell tested at a high cut-off voltage of 4.4 V. Comparable electrochemical performance can be obtained at ambient temperature. The solid-state NCM|CSPE|Li cell showed an enhanced thermally stable window (177° C.) with less heat generation (189 J g$^{-1}$) during the thermal runaway process compared with conventional liquid batteries (157° C. and 812 J g$^{-1}$). Consequently, the investigations described above evidenced that the PLL-CSPE membranes were capable of enhanced thermal safety when used in SLBs as compared to conventional lithium ion batteries.

As noted above, investigations also explored organic materials suitable for use as solid cathodes for all-solid-state Li-organic batteries. The investigations evaluated solid state cells comprising a perylene-3,4,9,10-tetracarboxylic dianhydride (PTCDA) cathode, which was combined with a Li metal (Li) anode and a hybrid polymer-LLZTO-LiTFSI CSPE (or more simply an HLL-CSPE) containing a LLZTO ceramic filler and LiTFSI salt in a hybrid polymer electrolyte made up of a 1:1 by weight mixture of poly(vinylidene fluoride-co-hexafluoropropylene)(PVDF-HFP) and poly (ethylene carbonate)(PEC) to yield solid-state organic coin cells sometimes referred to herein as PTCDA|HLL-CSPE|Li cells.

The PTCDA cathodes were fabricated by mixing 60 wt % PTCDA, 20 wt % conductive carbon black (Super-P), and 20 wt % HLL-CSPE (as a binder) in a N-methyl-2-pyrrolidone (NMP) solvent to form a homogeneous slurry, which was then cast and dried in a vacuum at 80° C. The mass loading of the PTCDA was about 2.0 mg cm$^{-2}$.

The HLL-CSPE membranes were prepared by a conventional solution-casting method in which the PVDF-HFP and PEC polymers (weight ratio 1:1) were dissolved in NMP solvent with a polymer concentration of 20 wt % to yield a homogeneous solution. Thereafter, controlled quantities of LiTFSI and LLZTO were added to the solution and stirred to yield a homogenized mixture that was cast and then dried in a vacuum oven at 80° C. for 24 hours to remove the NMP solvent. Finally, the dried HLL-CSPE membranes were punched into 16 mm diameter discs for subsequent use. The Li-ion conductivity of the HLL-CSPE membranes were optimized by adjusting the weight ratios of the hybrid (PVDF-HFP and PEC) polymer, the LiTFSI salt, and the LLZTO ceramic filler in the solid HLL-CSPE membranes. The weight ratios investigated were 2 parts of the hybrid polymer, to m parts of the LiTFSi salt, to n parts of the LLZTO ceramic filler, where m=1, 1.5, 2, or 2.5, and where n=0, 0.2, 0.4, or 0.6. In the following discussion and in the drawings, the notation HLmLn is used for convenience, though it should be understood that "H" represents 2 parts of the hybrid polymer. It should also be noted that the ceramic filler was introduced to enhance the film-formation ability of the HLL-CSPE membranes.

Solid-state PTCDA|HLL-CSPE|Li organic coin cells were assembled with one each of the PTCDA cathodes and HLL-CSPE membranes fabricated as described above, and lithium (Li) metal anodes without any liquid electrolyte additives. As a control, a traditional coin cell was prepared using a liquid electrolyte of 1.5 M LiTFSI in 1,2-Dimethoxyethane (DME).

As noted above, the Li-ion conductivity of the HLL-CSPE membranes was optimized by adjusting the weight ratios, HLmLn, of respectively the hybrid (PVDF-HFP and PEC) polymer (H), the LiTFSI salt (Lm), and the LLZTO ceramic filler (Ln). Among membranes with weight ratios of HLmL0.2 (m=1, 1.5, 2, 2.5), the HL1.5L0.2 sample exhibited the highest ionic conductivity in the temperature range of 20-70° C. The ionic conductivity of the HLmL0.2 samples increased from $0.84 \times 10^{-4}$ S·cm$^{-1}$ to $1.46 \times 10^{-4}$ S·cm$^{-1}$ as m was increased from 1 to 1.5. Further increasing m resulted in a decrease of ionic conductivity, which was attributed to the agglomeration of excess added charge carriers.

Figure 6A:
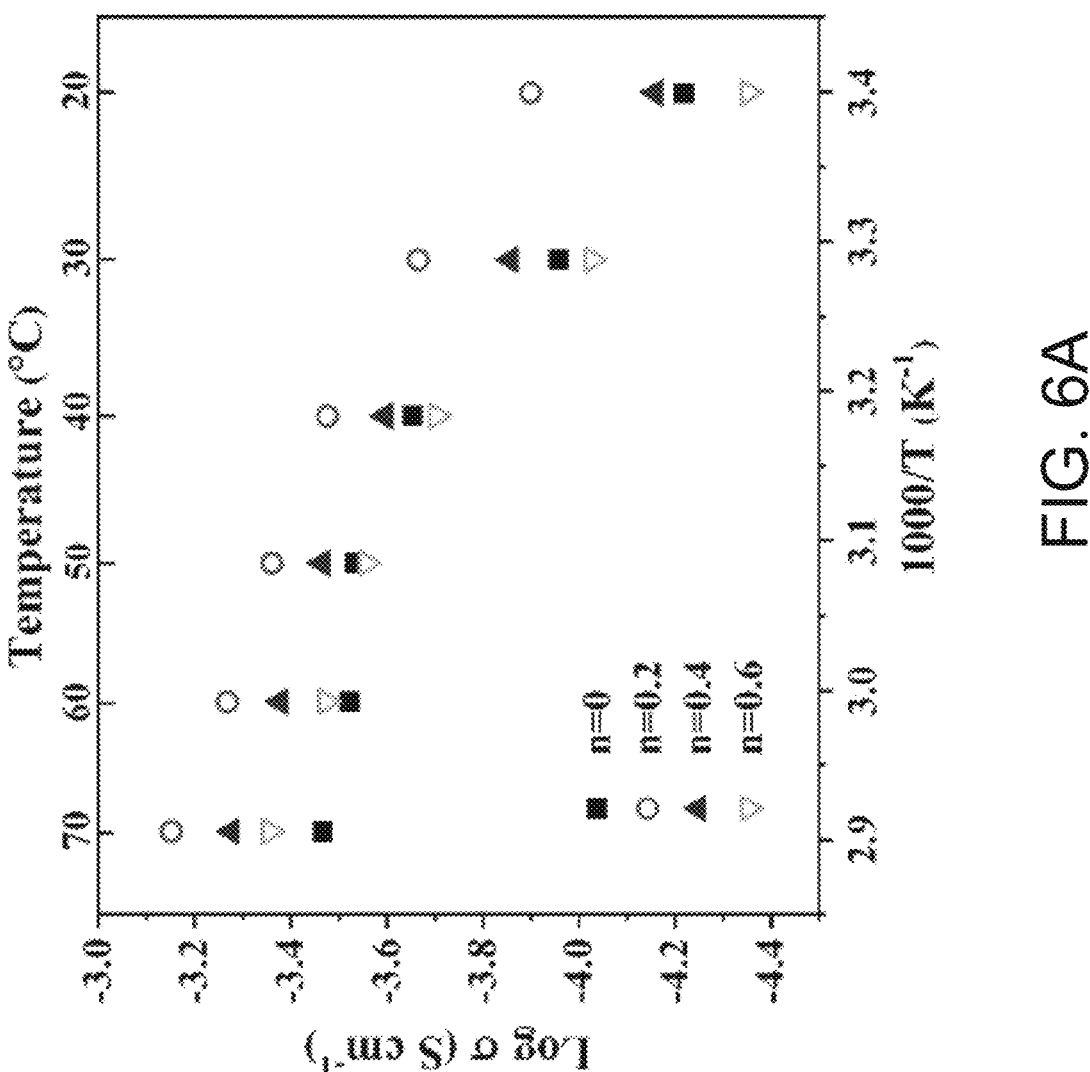
FIGS. 6A through 6K represent properties of a composite solid polymer electrolyte (CSPE) in accordance with another nonlimiting embodiment of this invention.
Figure 6B:
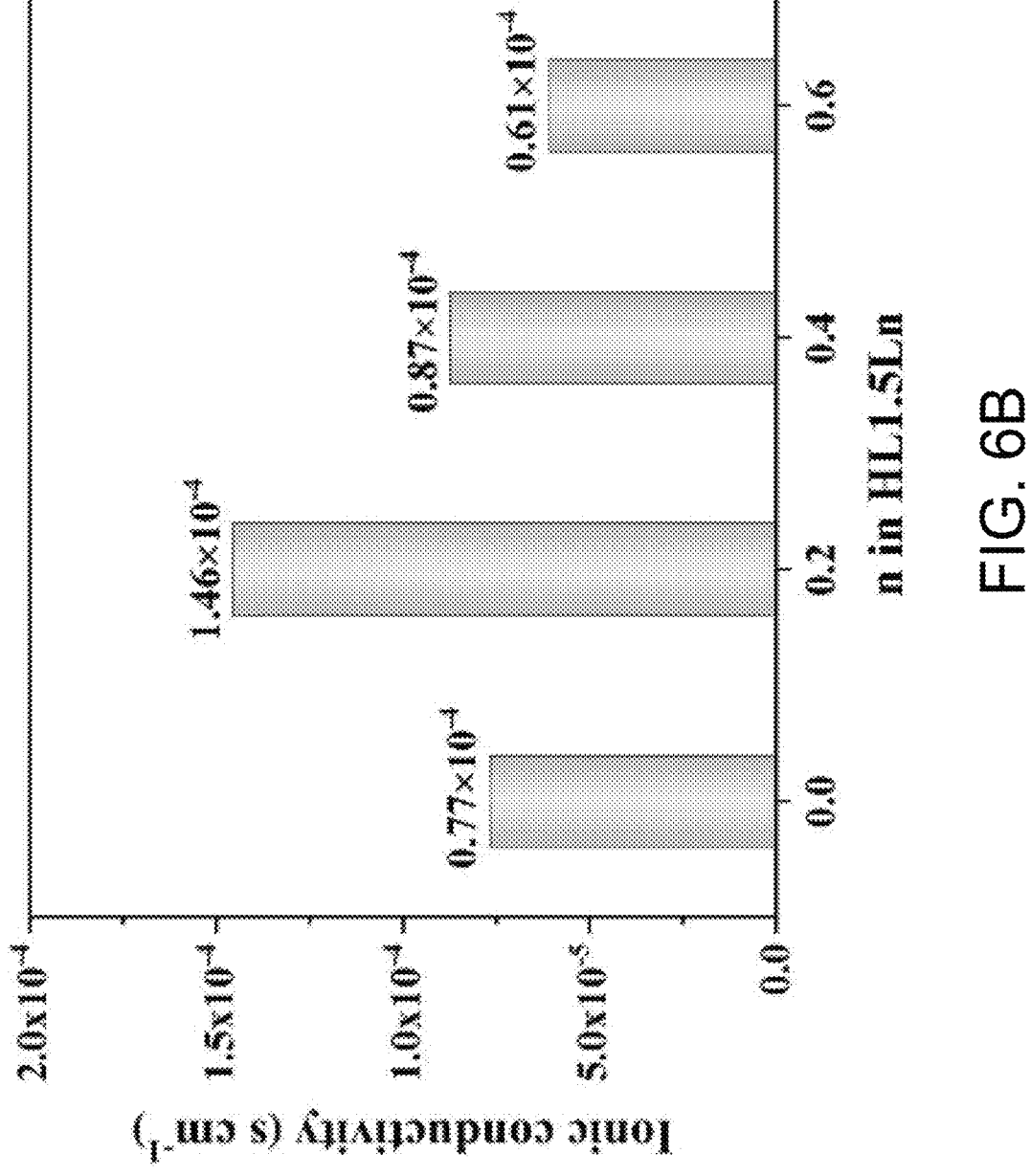
Figure 6C:
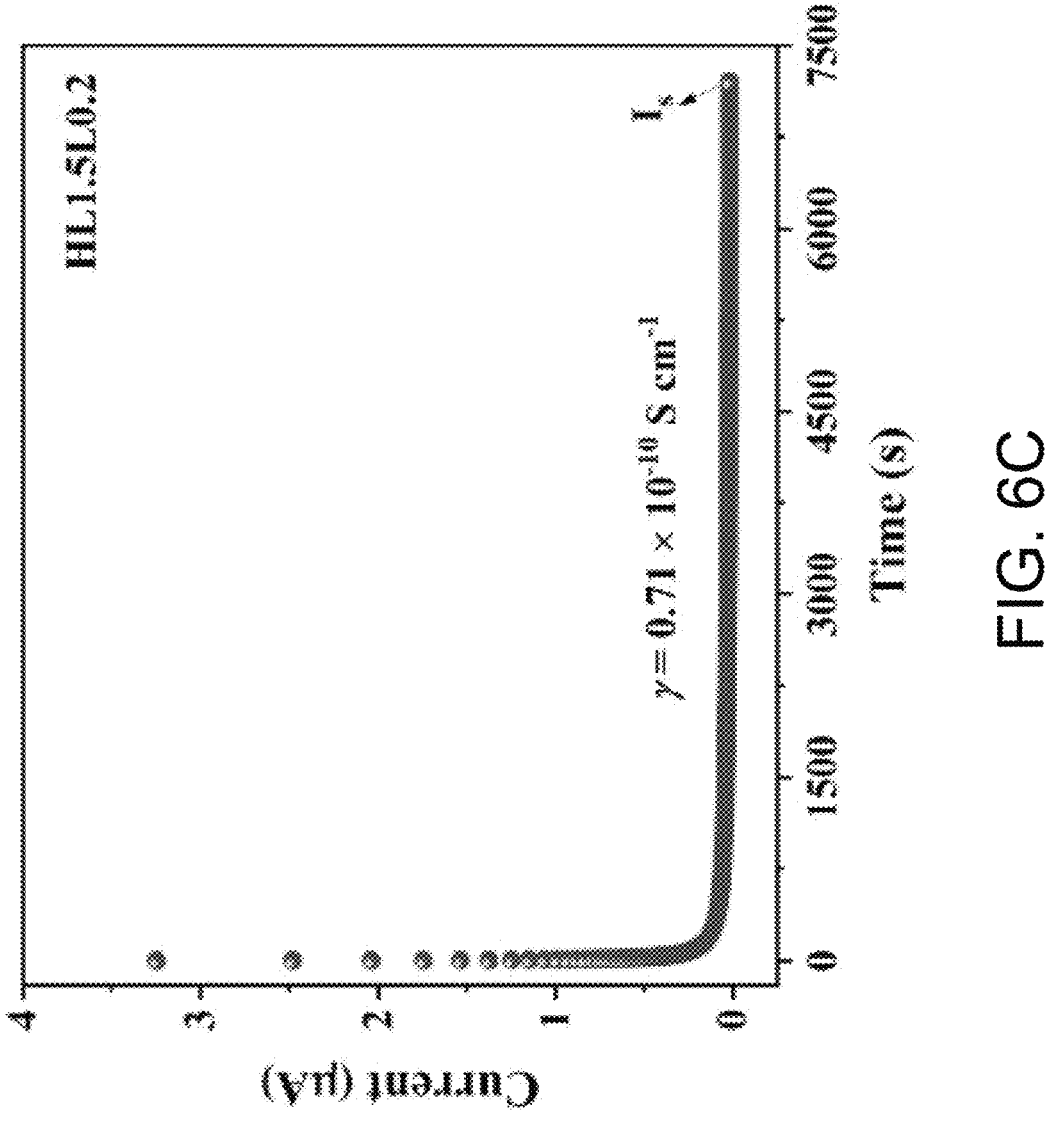

Arrhenius plots are shown in FIG. 6A evidencing ionic conductivity of the HL1.5Ln (n=0, 0.2, 0.4, 0.6) electrolytes with different contents of LLZTO ceramic filler. The inflection point at 50° C. for the HL1.5L0 (i.e., without LLZTO) was attributed to the partial crystallization of PEC below its melting temperature. In contrast, the inflection point disappeared in the plots of the HL1.5Ln samples containing LLZTO additives. Moreover, their profiles follow the Vogel-Tamman-Fulcher (VTF) behavior in the 20-70° C. temperature range, which demonstrated that the PEC component was amorphous after introducing the LLZTO ceramic filler. As shown in FIG. 6B, among membranes with weight ratios of HL1.5Ln (n=0, 0.2, 0.4, 0.6), the HL1.5L0.2 again exhibited the highest ionic conductivity of $1.46 \times 10^{-4}$ S·cm$^{-1}$ at 30° C., which was twice that of the HL1.5L0 sample ($0.77 \times 10^{-4}$ S·cm$^{-1}$). Introducing the LLZTO filler decreased the crystallinity of the hybrid polymer and thus significantly improved its chain segmental motions, which largely contributed to the enhanced ionic conductivity. Furthermore, a negligible electronic conductivity ($0.71 \times 10^{-4}$ S·cm$^{-1}$) was measured for the HL1.5L0.2 sample (FIG. 6C), which indicated that the ionic conductivity played a major role in the total conductivity. As a consequence, HL1.5L0.2 was selected for further study because of its higher ionic conductivity. As such, references to HLL-CSPE membranes in the following discussion of investigations will be understood to refer to testing performed on a HL1.5L0.2 HLL-CSPE membrane.

Figure 6E:
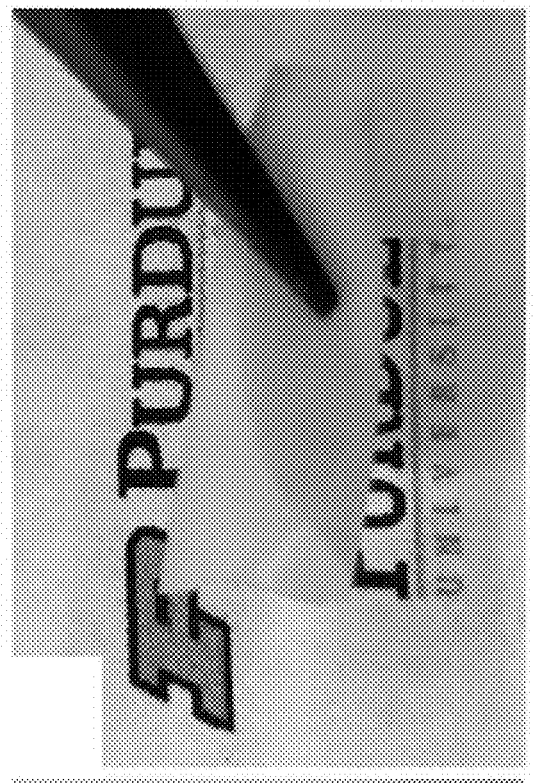
Figure 6D:
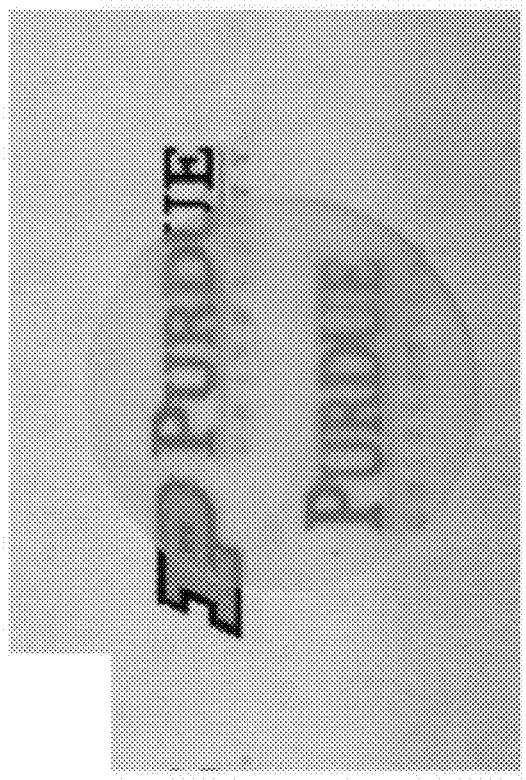
Figures 6F, 6G, 6H, 6I, 6J, 6K:
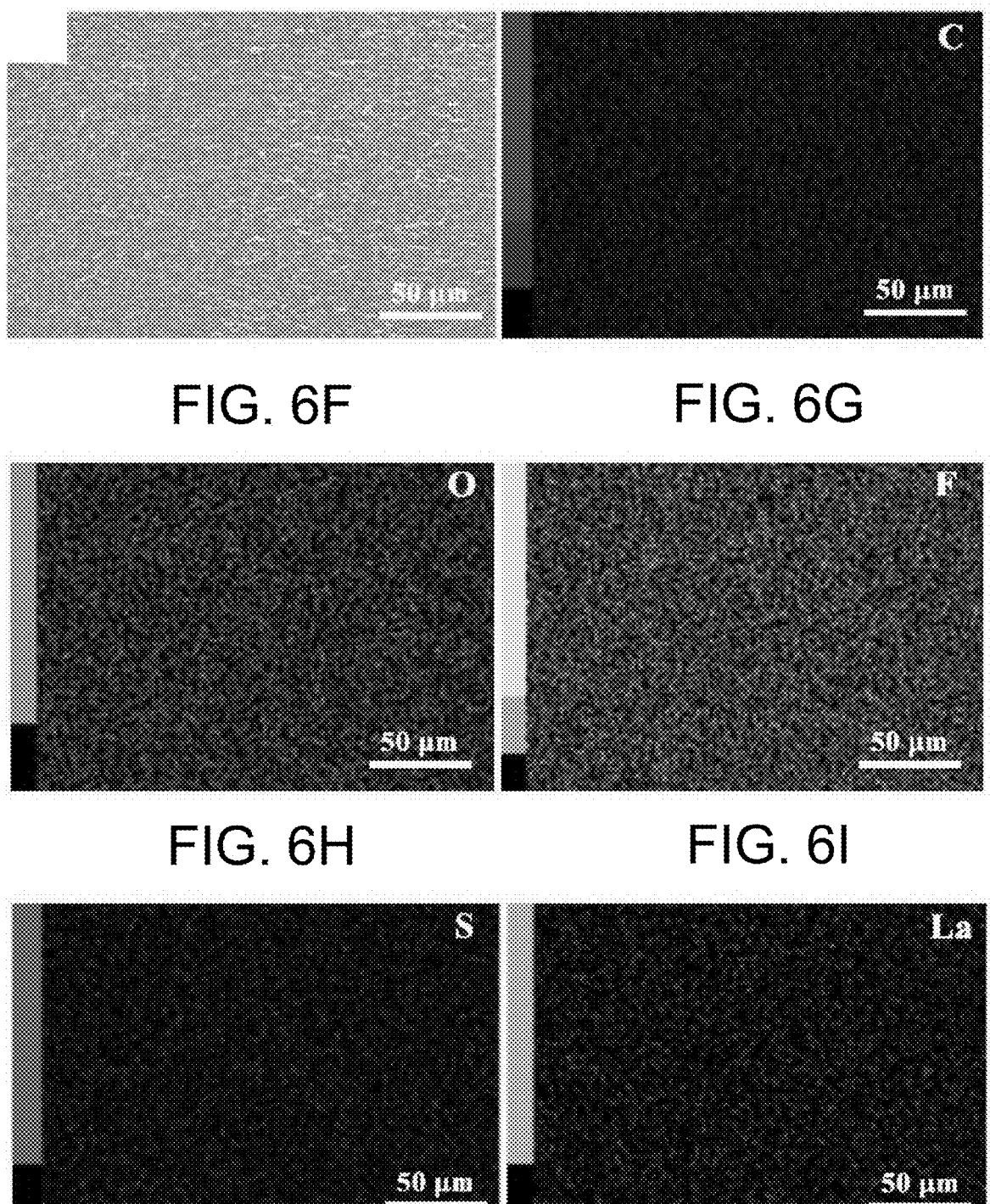

FIGS. 6D and 6E are images showing a HL1.5L0.2 HLL-CSPE membrane, and evidence the flexibility and transparency of the HLL-CSPE membrane. The SEM image of FIG. 6F indicates that the membrane had a smooth and dense surface morphology, which is conducive to an electrode/electrolyte interfacial contact. The homogeneous morphology visible in FIG. 6F and the corresponding EDX spectra maps of C, O, F, S, and La in FIGS. 1G-1K demonstrated that the hybrid polymer matrix, the LiTFSI salt, and the LLZTO ceramic filler were evenly distributed in the HLL-CSPE membrane. Mechanical properties of the HLL-CSPE membrane were evaluated by instrumented nanoindentation, which indicated a modulus and hardness of 137.1±14.5 MPa and 8.5±1.2 MPa, respectively. These properties were attributed to the introduction of the rigid LLZTO ceramic filler and its interaction with the polymer matrix.

Figure 7A:
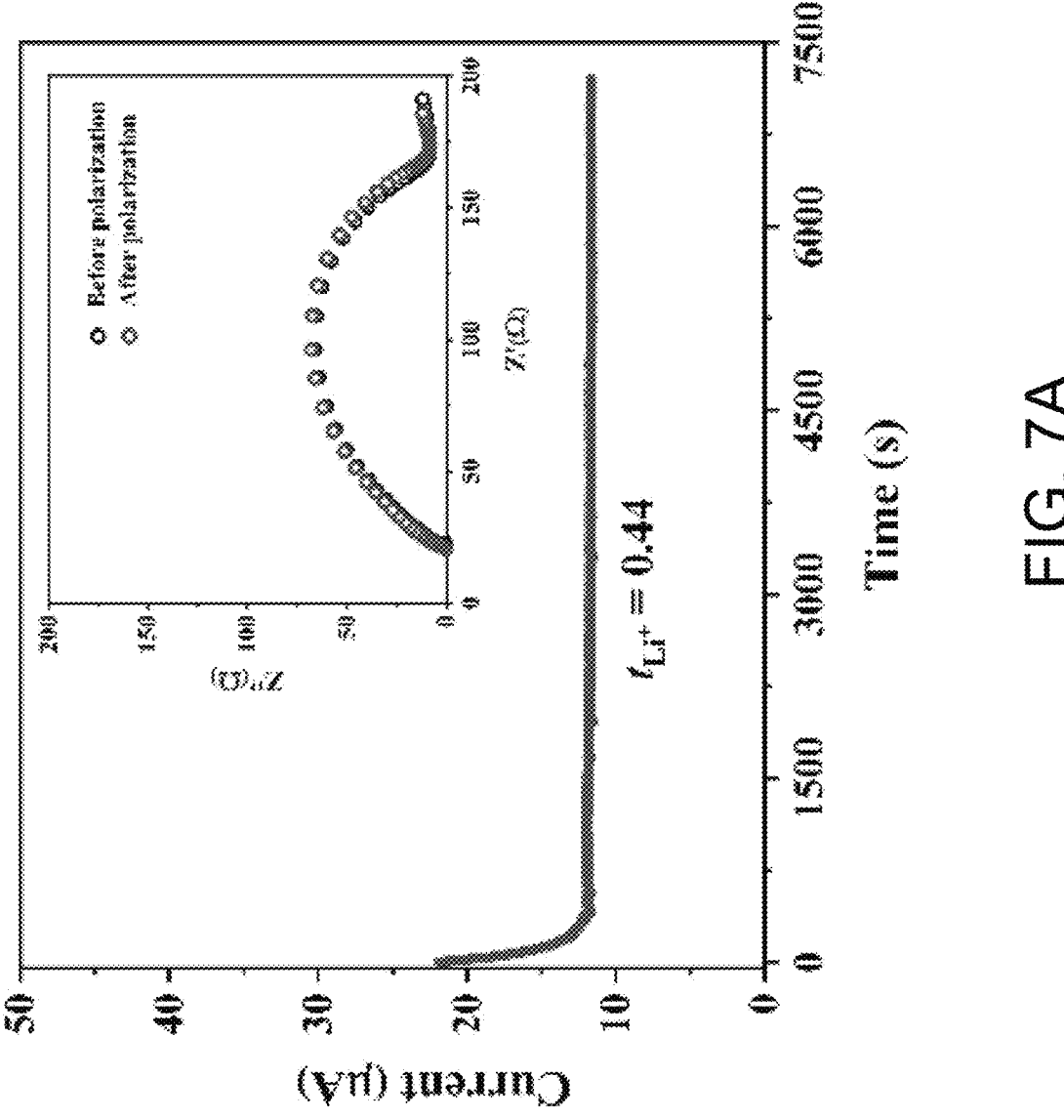
FIGS. 7A through 7C represent aspects of the mobility of Li ions in the HLL-CSPE membrane via the Li+ transference number (tLi+) in a symmetric Li|HLL-CSPE|Li cell in accordance with another nonlimiting embodiment of this invention.
Figure 7B:
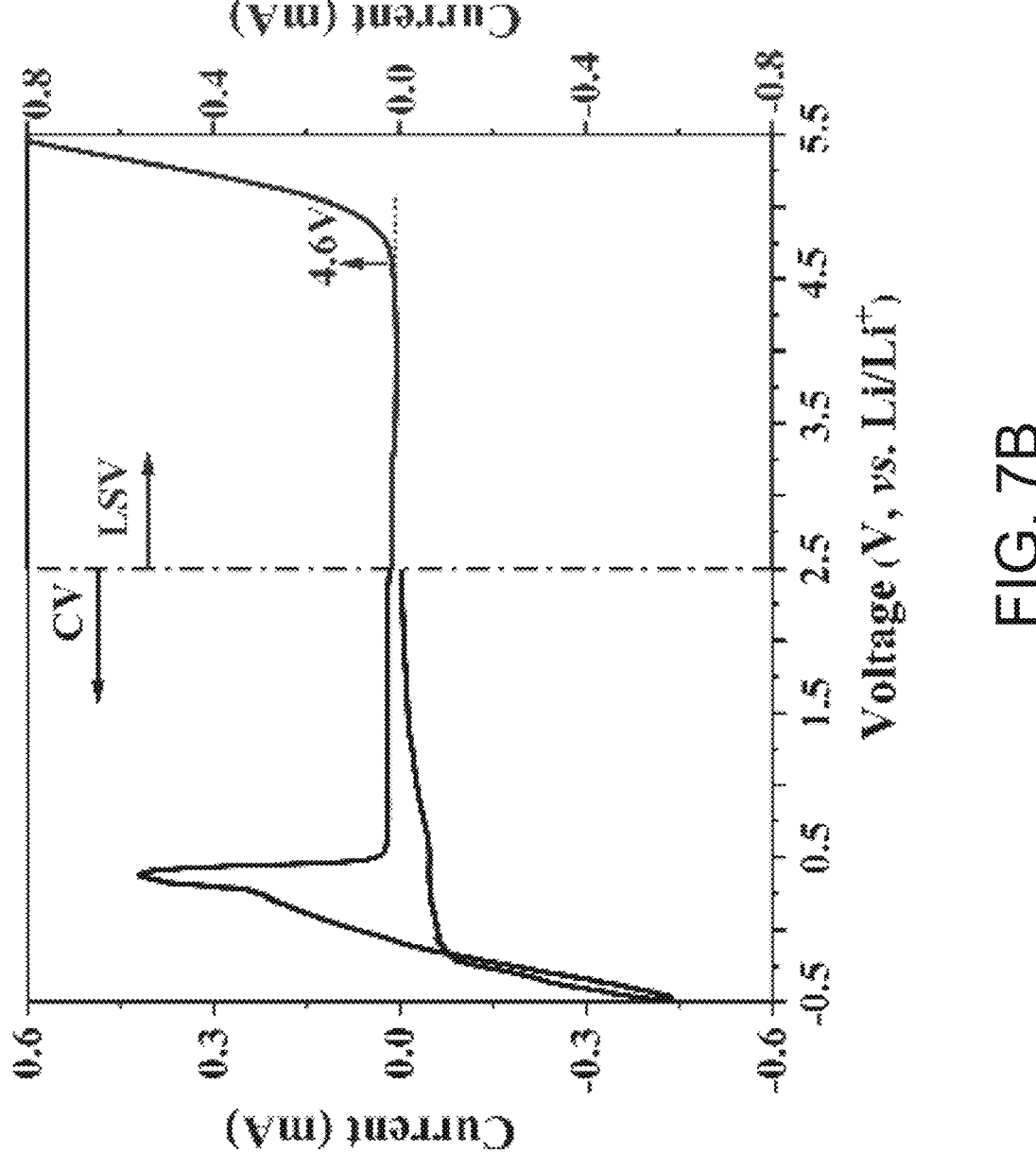
Figure 7C:
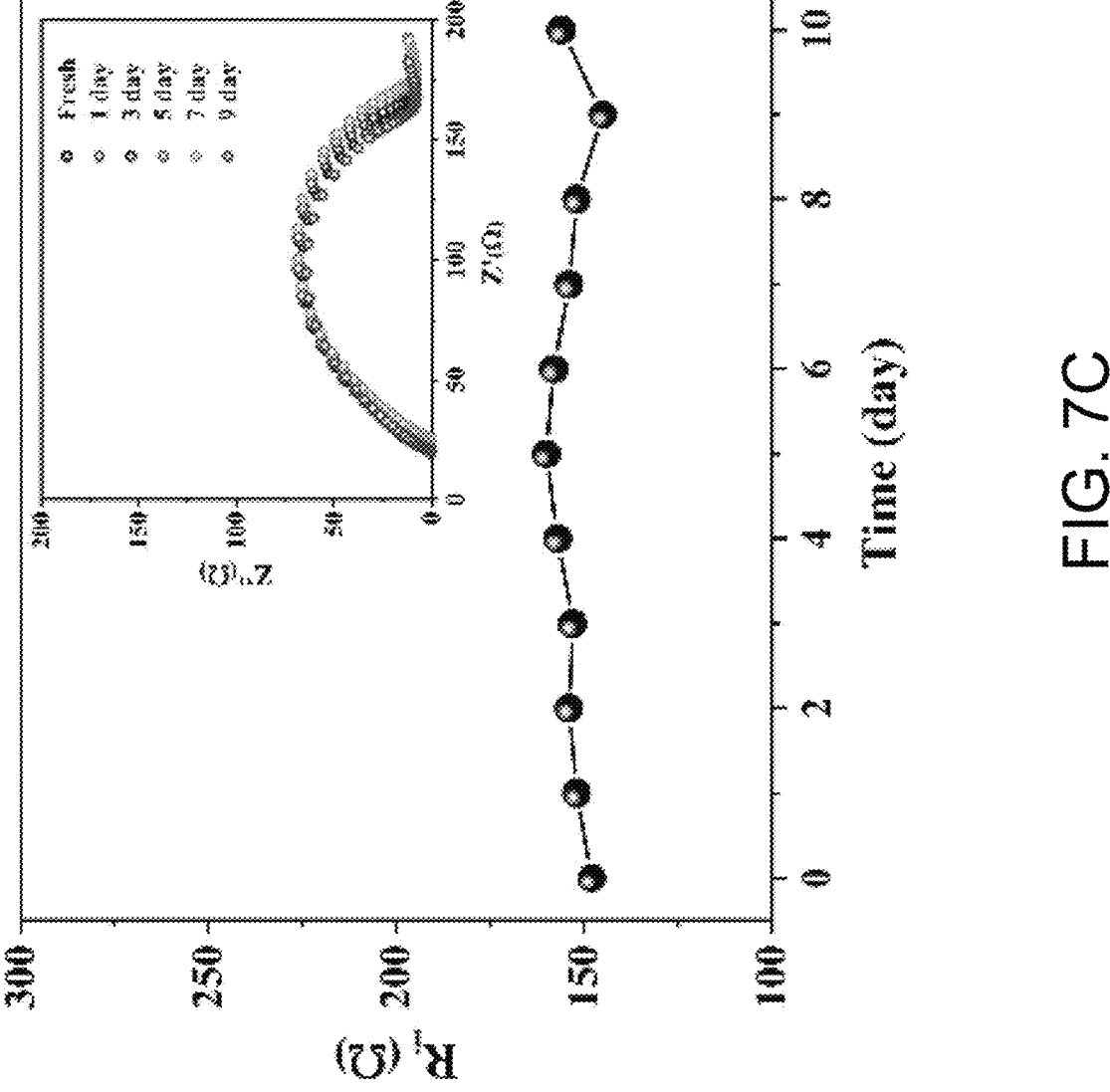

The mobility of Li ions in the HLL-CSPE membrane was evaluated by the Li+ transference number (tLi+) in a symmetric Li|HLL-CSPE|Li cell. FIG. 7A describes the DC polarization curve and the corresponding electrochemical impedance spectroscopy (EIS) spectra of the Li|HLL-CSPE|Li cell. The tLi+ was calculated to be 0.44, which was higher than the values of liquid electrolytes (mainly 0.2-0.4), indicating the effective migration of Li+ in the HLL-CSPE. The electrochemical stability of the HLL-CSPE membrane was evaluated by linear sweep voltammetry (LSV) and cyclic voltammetry (CV). As revealed in FIG. 7B, the reduction peak at −0.5 V and oxidation peak at 0.4 V in the CV curve correspond to the Li plating/stripping behavior. In the negative scan, the HLL-CSPE membrane shows reductive stability at voltage to 0 V, demonstrating its compatibility with Li electrode. Additionally, an anodic current was observed above 4.6 V in the LSV plot, which was much higher than the voltage window (1.5-3.5 V) of the PTCDA organic cathode. These results indicate the potential of the HLL-CSPE membrane for use in Li-organic batteries. FIG. 7C shows the interfacial resistance of the Li|HLL-CSPE|Li cell after resting for different days and its corresponding EIS diagrams (inset). The electrode-electrolyte interfacial impedance shows trifling change and remained at about 150 ohms, which suggested the formation of a stable Li+ conductive passivation layer on the surface of the Li electrode, thereby suppressing side reactions.

Figure 8A:
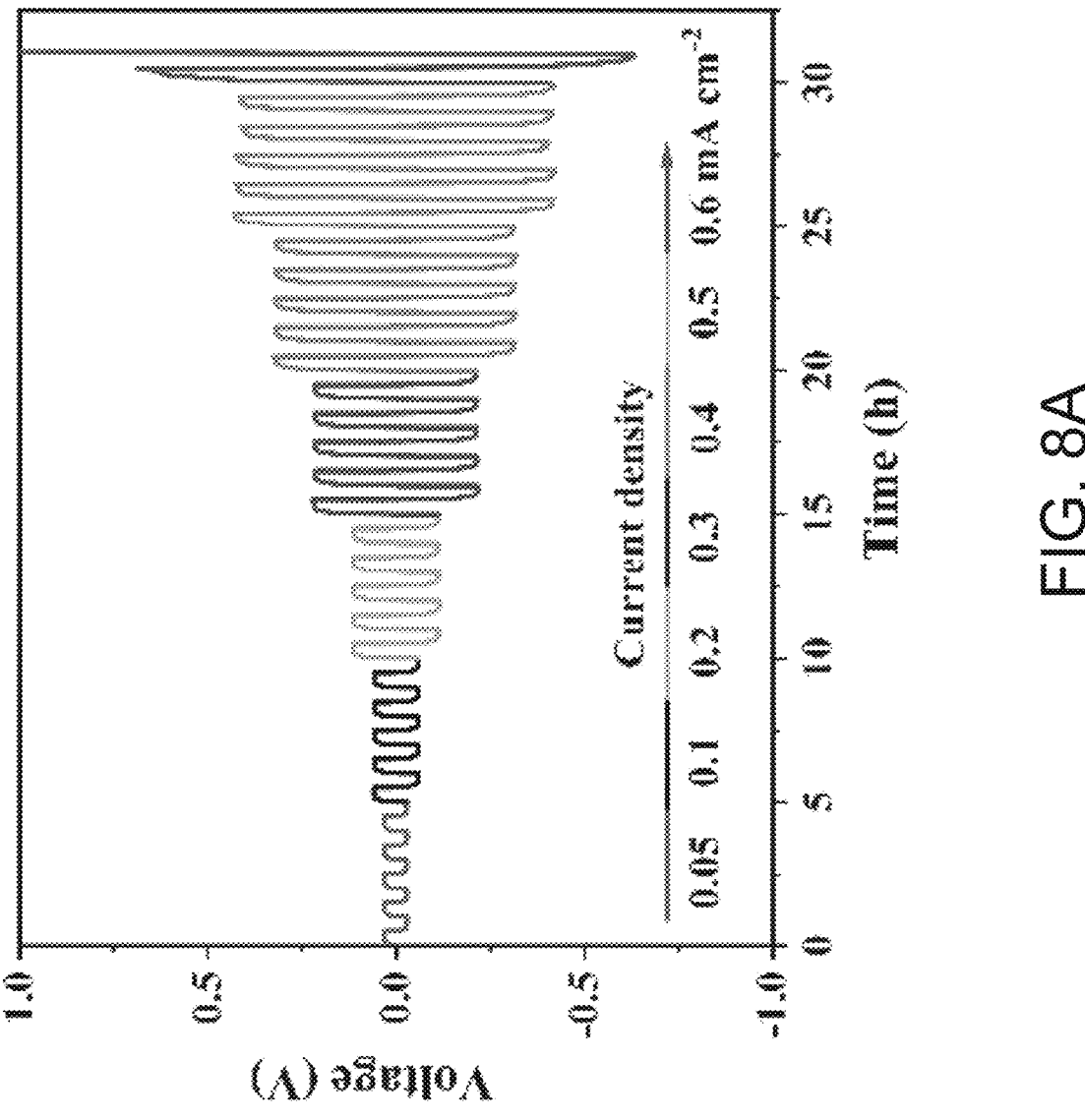
FIGS. 8A through 8E represent aspects of the compatibility of the HLL-CSPE membrane with a Li metal electrode via galvanostatic charge/discharge of the symmetric Li|HLL-CSPE|Li cell in accordance with another nonlimiting embodiment of this invention.
Figure 8B:
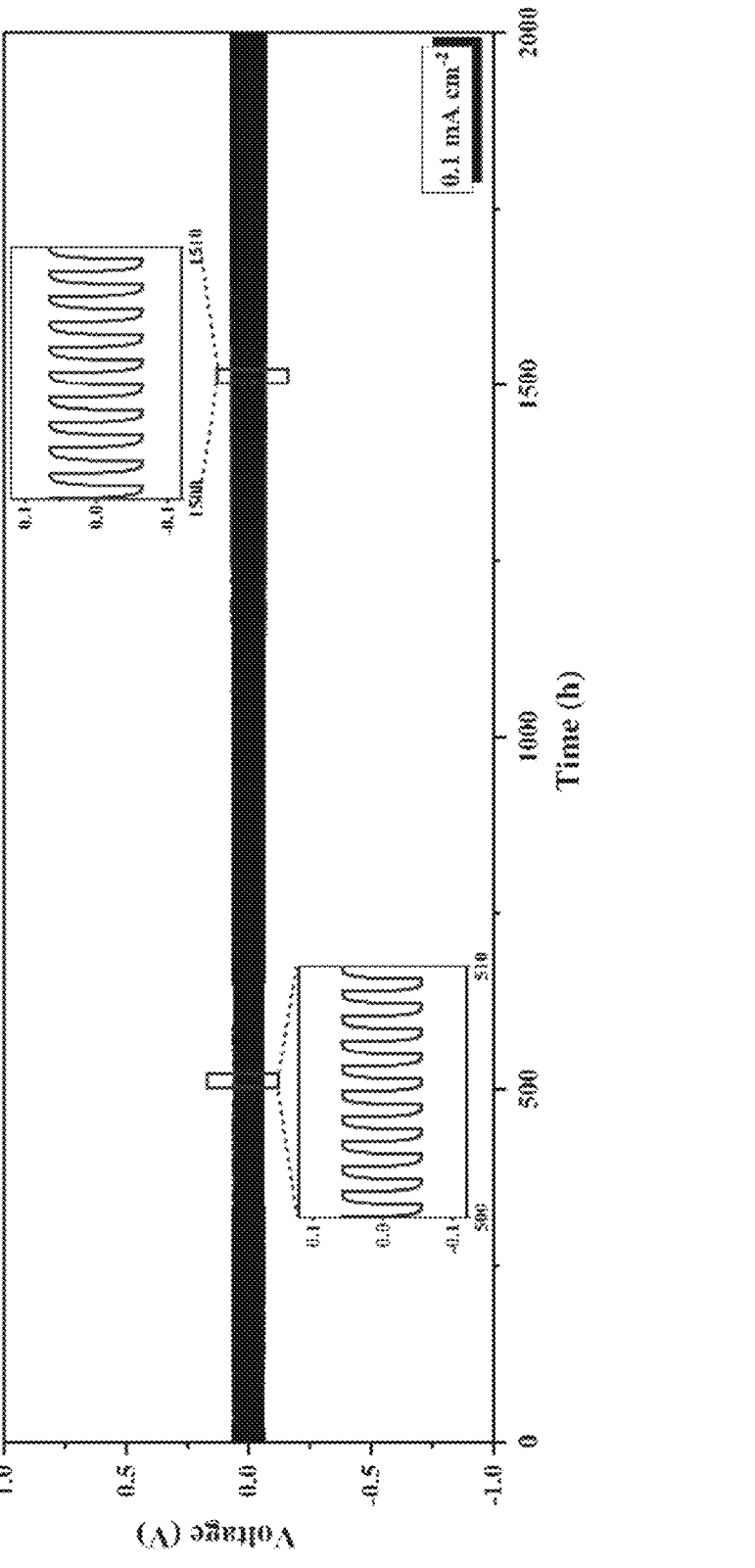
Figure 8C:
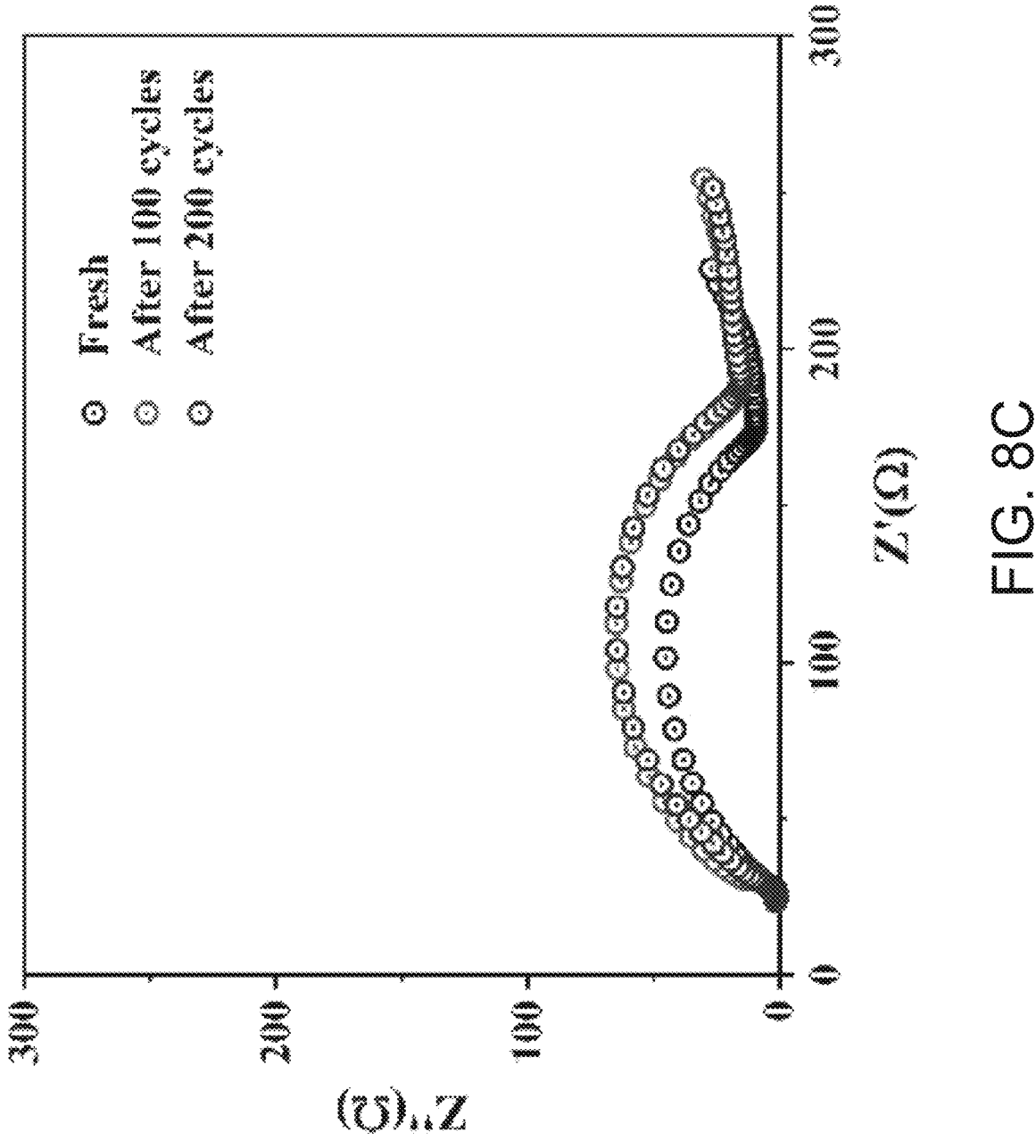

The compatibility of the HLL-CSPE membrane with a Li metal electrode was then studied by galvanostatic charge/discharge of the symmetric Li|HLL-CSPE|Li cell. FIG. 8A displays the voltage profile of the Li|HLL-CSPE|Li cell with increasing current density from 0.05 to 0.6 mA cm$^{-2}$. It was observed that the voltage platform increased with enhancing current density, which was attributed to the increasing polarization. However, when the current density reaches 0.6 mA cm$^{-2}$, the polarization voltage increases sharply, and the symmetric cell shut down due to the large polarization at high current density. The long-term cycling performance of the Li|HLL-CSPE|Li cell at a current density of 0.1 mA cm$^{-2}$ in FIG. 8B shows a small polarization voltage of 60 mV, which was stably maintained for 2000 h without short circuit, demonstrating excellent interfacial compatibility between the HLL-CSPE membrane and Li electrode. The impedance of the symmetric cell in the pristine ("fresh") condition and after different cycles was recorded (FIG. 8C), which slightly increased after 100 cycles and then remained unchanged within the following cycles. These features were in good agreement with the long-term cycling results, suggesting interfacial stability and Li dendrite suppression. The cycled symmetric cell was disassembled to further study its interfacial behavior. Consistent FT-IR spectra of a pristine HLL-CSPE membrane and the cycled HLL-CSPE membrane evidenced the stability of the HLL-CSPE membrane during continuous plating/stripping, and a dendrite-free surface morphology of the Li electrode after 2000 cycles suggested the inhibitory effect on Li dendrite growth.

Figure 8D:
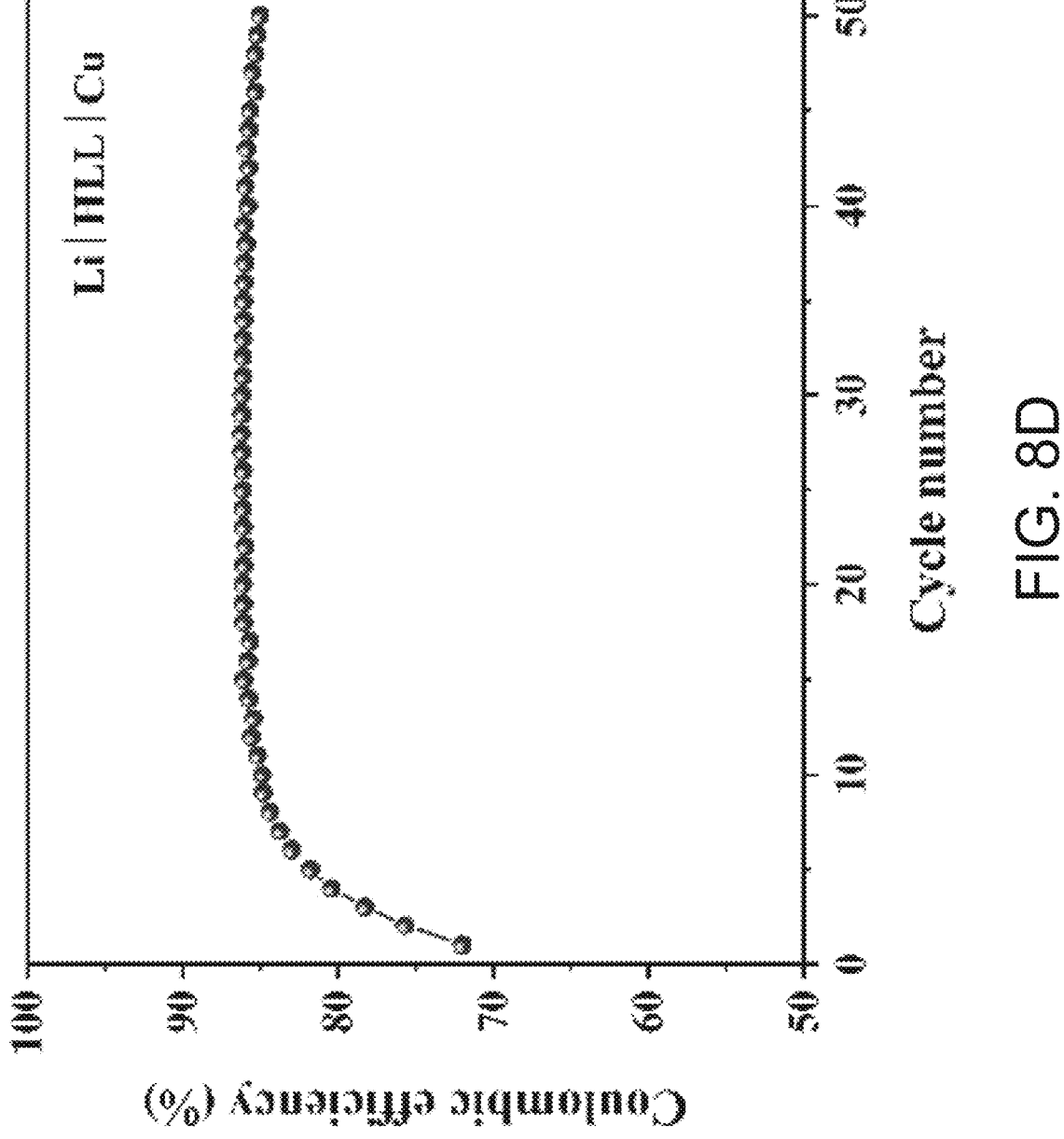
Figure 8E:
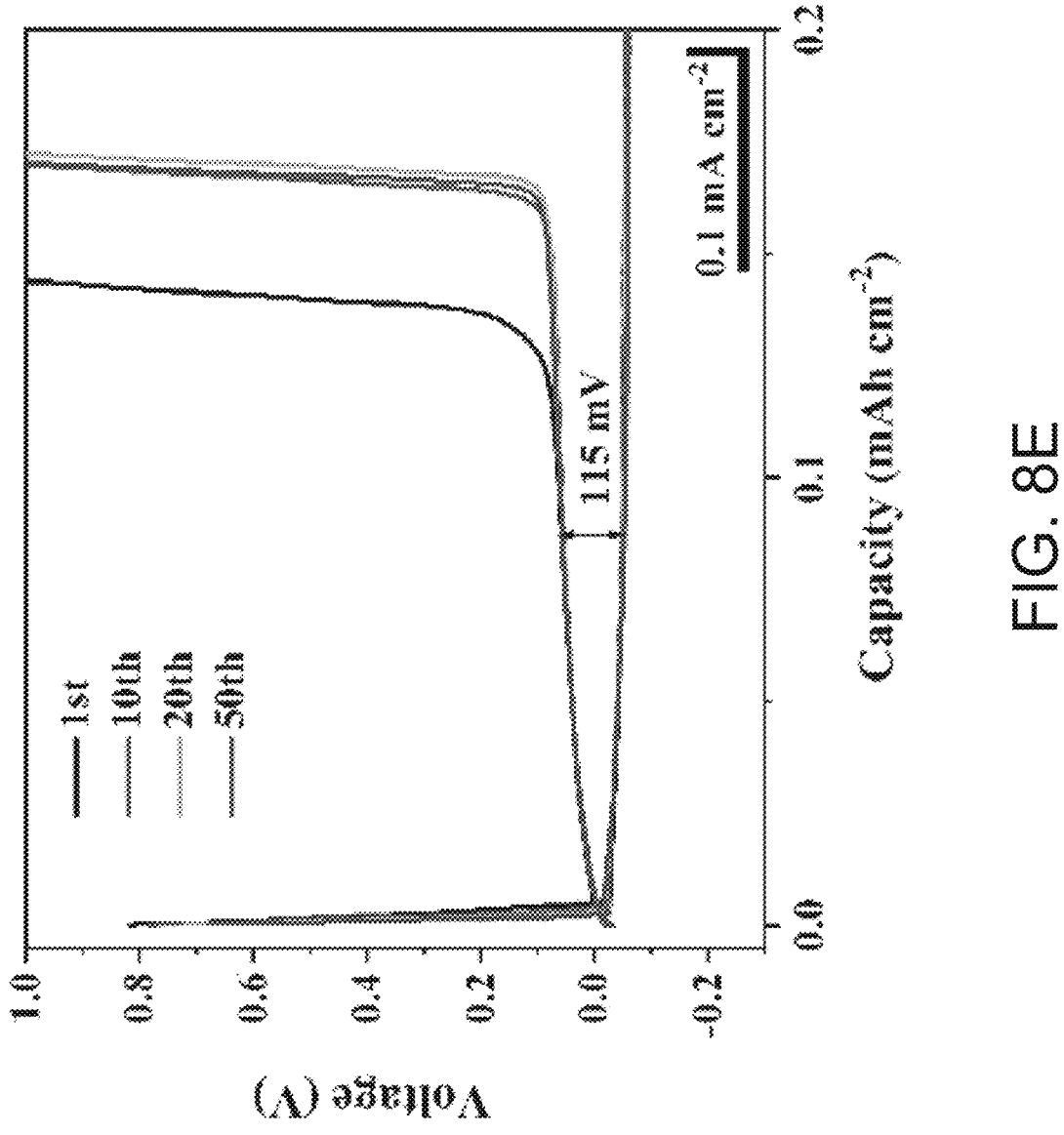

A solid-state Li|HLL-CSPE|Cu cell was assembled using a Cu foil as a working electrode, Li metal as a counter electrode, and a HLL-CSPE membrane as both an electrolyte and separator. The cell was pre-activated for five cycles at a current density of 0.05 mA cm$^{-2}$ between 0-1 V. To evaluate the electrochemical property of the Li—Cu cell, a fixed amount of 0.2 mAh cm$^{-2}$ Li was deposited on the Cu foil and then stripped to 1 V at 0.1 mA cm$^{-2}$. As shown in FIG. 8D, the cell ("Li|HLL|Cu") delivered an initial coulombic efficiency of about 72%, which was attributed to the irreversible Li consumption during the SEI formation. Thereafter, the coulombic efficiency reached about 85% within the first ten cycles and remained stable over fifty cycles. It should be noted that the coulombic efficiency was much higher than the previously reported values in solid-state Li—Cu cells, which was attributed to superior electrochemical properties of the HLL-CSPE membrane and an excellent electrode/electrolyte interfacial compatibility. FIG. 8E depicts the detailed voltage profiles of the Li|HLL-CSPE|Cu cell. The overlapped voltage curves after ten cycles indicate the outstanding cycling stability during the plating/stripping process, which was in good agreement with the results in FIG. 8D. Moreover, the voltage gap was limited to about 115 mV, which suggested a small polarization and a stable Li plating/stripping process.

Figure 9A:
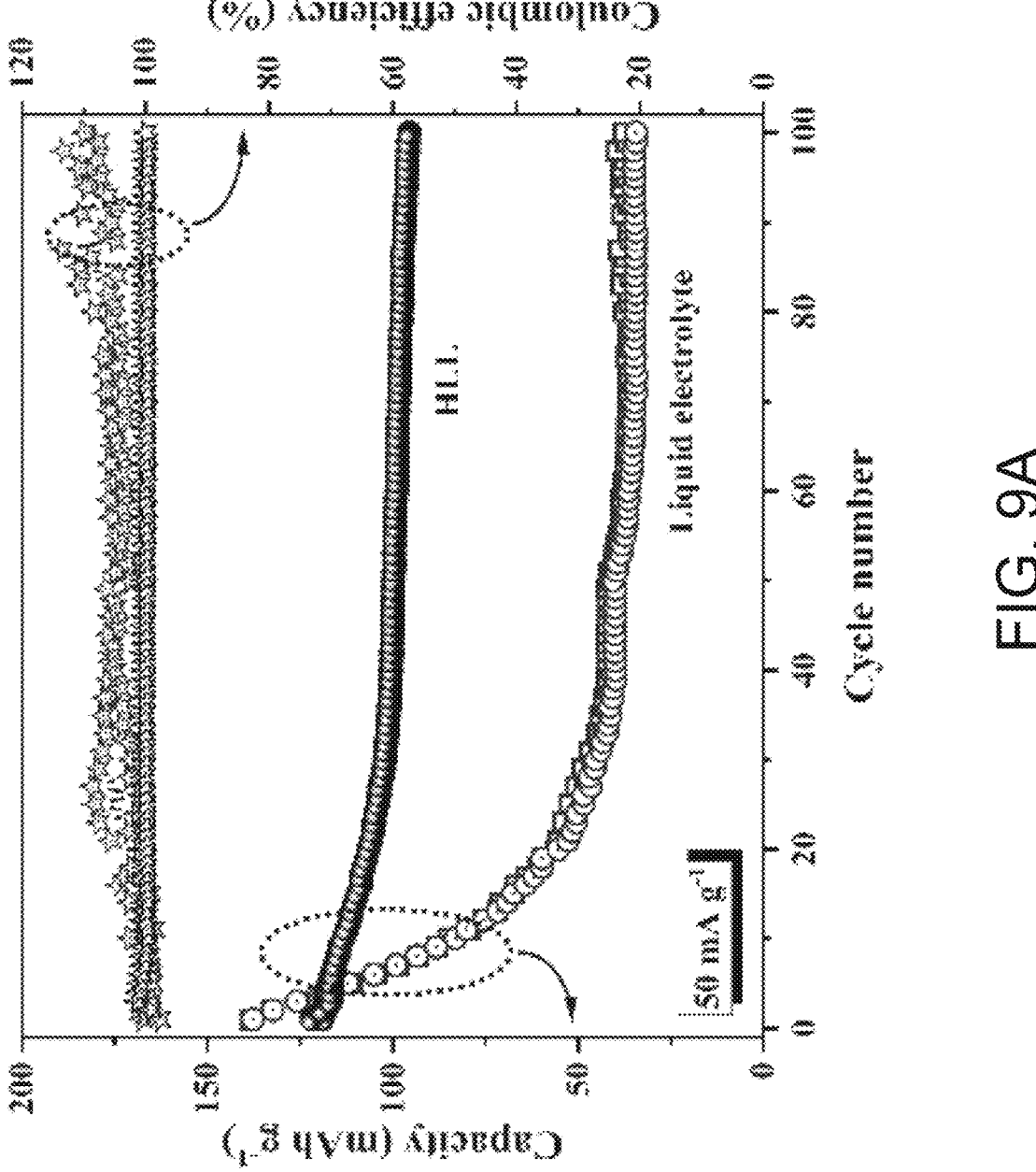
FIGS. 9A through 9E represent a comparison of an all-solid-state PTCDA|HLL-CSPE|Li cell with a PTCDA-Li cell having a traditional liquid electrolyte to demonstrate practical applications of the HLL-CSPE membrane in an Li-organic battery in accordance with another nonlimiting embodiment of this invention.
Figure 9B:
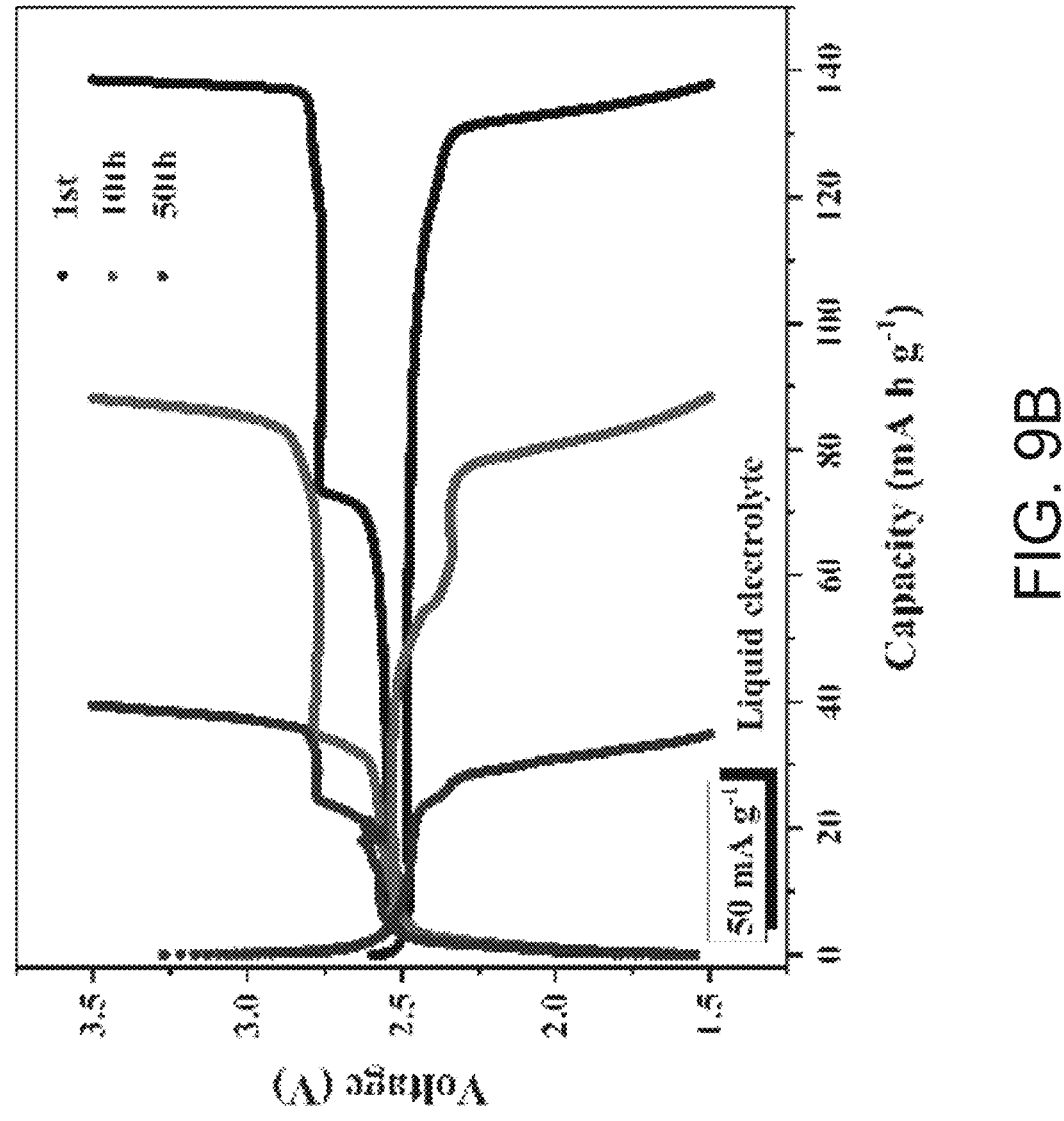
Figure 9C:
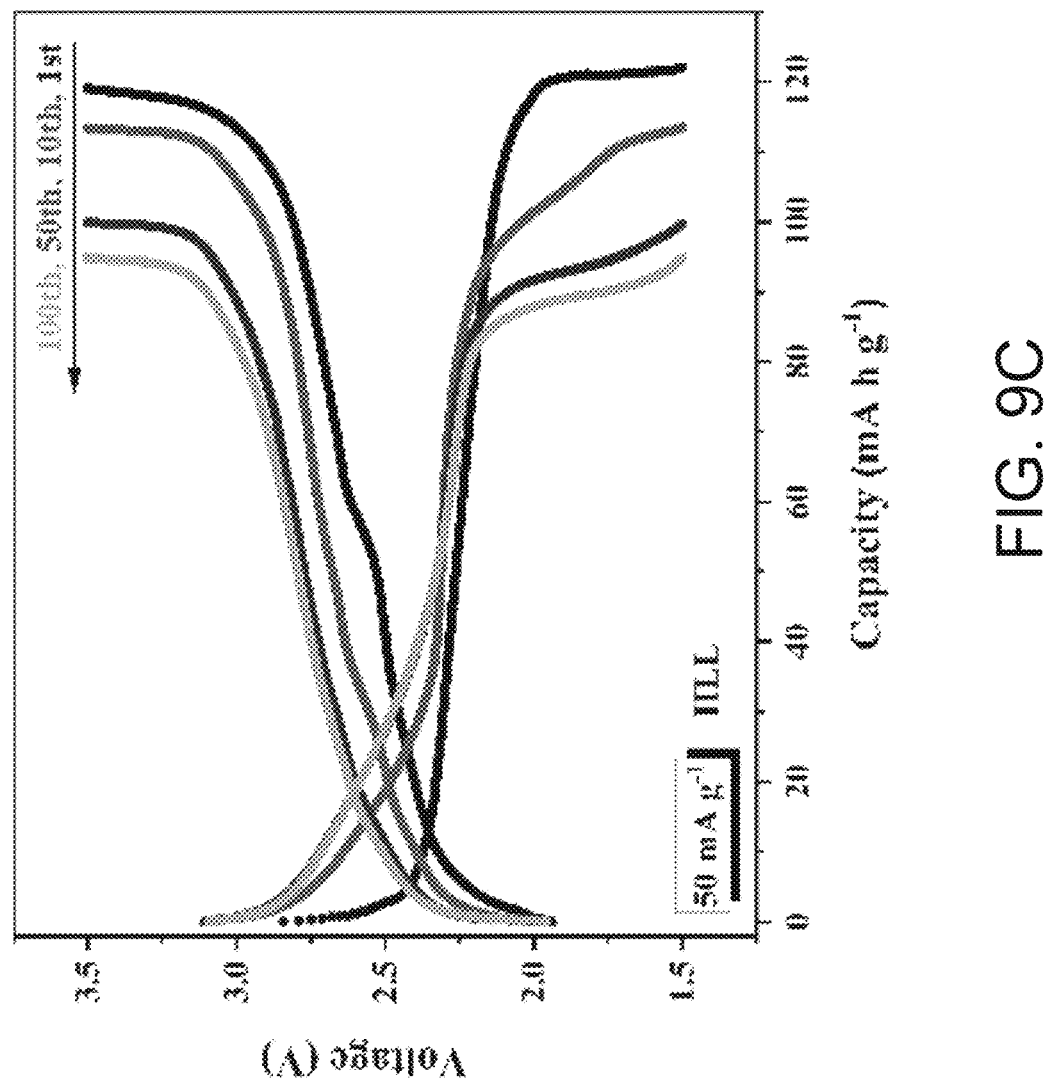
Figure 9D:
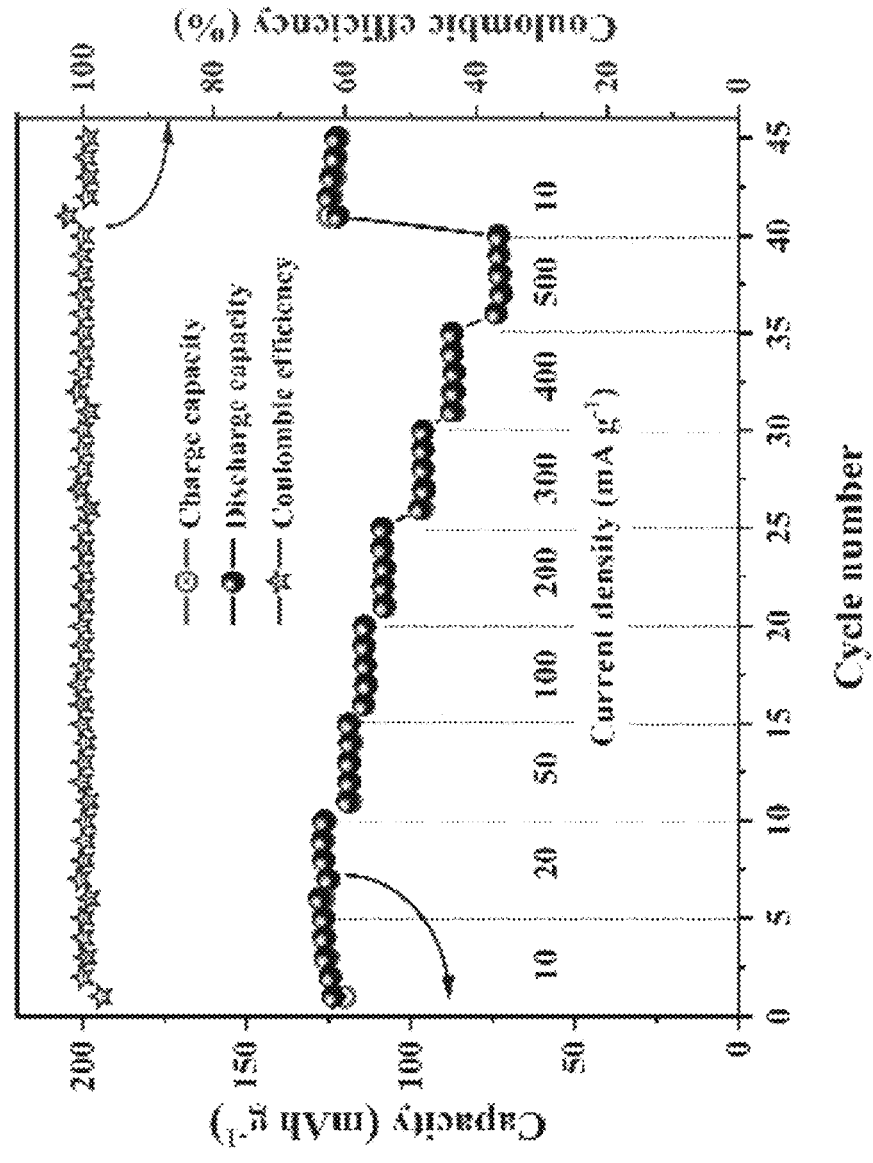
Figure 9E:
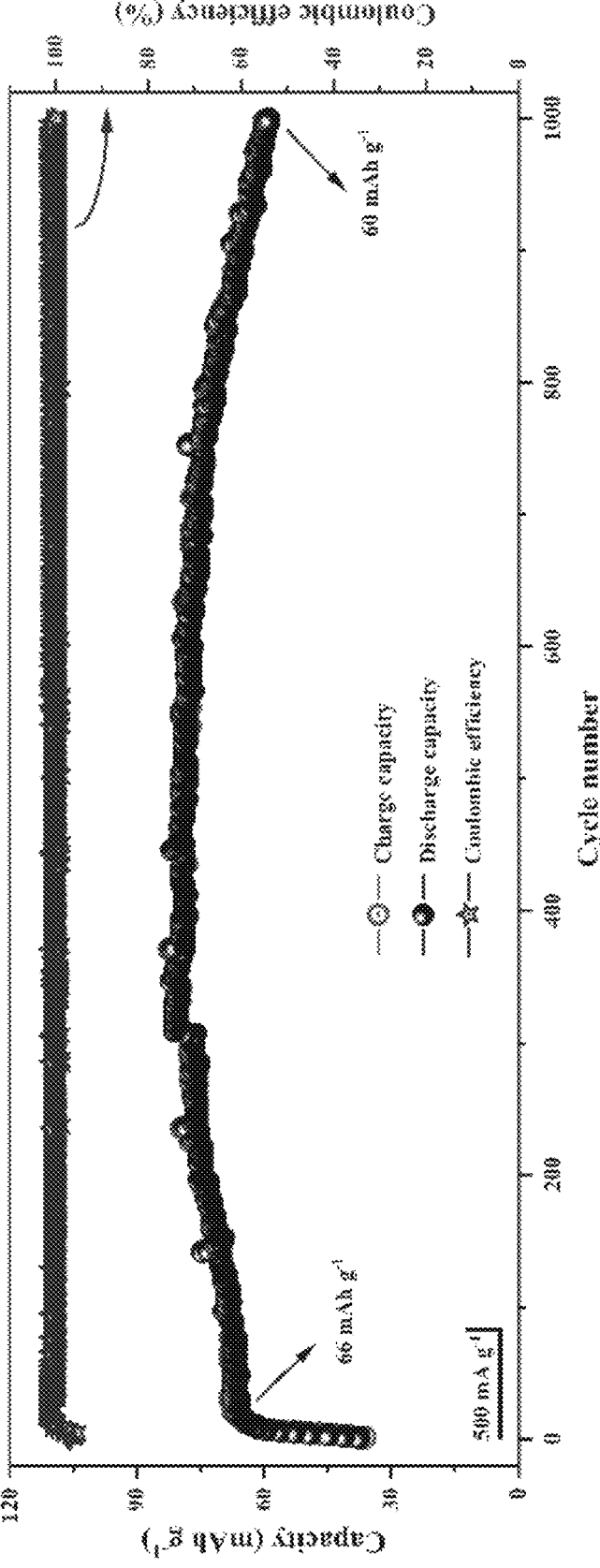

To demonstrate practical applications of the HLL-CSPE membrane in an Li-organic battery, an all-solid-state PTCDA|HLL-CSPE|Li cell was assembled. For comparison, a PTCDA-Li cell having a traditional liquid electrolyte was also assembled. FIG. 9A reveals the cycle stability of the PTCDA|HLL-CSPE|Li cell ("HLL") compared to the liquid electrolyte cell ("Liquid electrolyte") at a current density of 50 mA g$^{-1}$. The initial discharge capacity of the liquid electrolyte cell (FIG. 9B) was 138 mAh g$^{-1}$, suggesting that two Li+ were incorporated into the PTCDA and formed Li2PTCDA. However, its capacity declined rapidly, leaving only a 35 mAh g$^{-1}$ discharge capacity after 50 cycles, corresponding to a poor capacity retention of 25%. The inferior cycling stability was attributed to the dissolution and shuttling effect of the discharge products of PTCDA (Li$_x$PTDA). In sharp contrast, the PTCDA|HLLCSPE| Li (HLL-CSPE electrolyte) cell (FIG. 9C) delivered an initial discharge capacity of 122 mAh g$^{-1}$ and maintained 96 mAh g$^{-1}$ after 100 cycles. The result corresponds to a superior capacity retention of 79%, which was three times higher than that of the liquid electrolyte cell, demonstrating a significantly enhanced cycling stability. FIG. 9D gives the rate capability of the PTCDA|HLL-CSPE|Li cell at various current densities. The initial discharge and charge capacity at the current density of 10 mA g$^{-1}$ were 124 and 120 mAh g$^{-1}$, respectively. The initial coulombic efficiency was 97%, which reached and maintained about 100% in subsequent cycles. The reversible capacities of 127, 126, 118, 114, 108, 96, 87, and 73 mAh g$^{-1}$ were obtained at current densities of 10, 20, 50, 100, 200, 300, 400, and 500 mA g$^{-1}$, respectively. Moreover, the reversible capacity returned to 125 mAh g$^{-1}$ when the current density returned to 10 mA g$^{-1}$, indicating the excellent electrochemical stability and rate performance of the PTCDA|HLL-CSPE|Li cell. Furthermore, the long-term cycle performance of the PTCDA|HLL-CSPE|Li cell was evaluated at a high current density of 500 mA g$^{-1}$ (FIG. 9E). A reversible capacity of 66 mAh g$^{-1}$ was obtained after the activation process, which slightly decreased to 60 mAh g$^{-1}$ after 1000 cycles, showing an impressive ultralong life span. Conversely, the liquid electrolyte battery only discharged/charged for 26 cycles under the same current density. The superior cycling stability was attributed to replacing the liquid electrolyte with the HLL-CSPE membrane, which effectively suppressed the dissolution and shuttle effect and thus extended the life span of the PTCDA|Li cell.

To verify the inhibitory effect of the HLL-CSPE membrane on cathode dissolution and shuttle issues, the PTCDA|Li cells were disassembled after 50 cycles to conduct post-mortem investigations. The pristine ("fresh") cathode was uniform with smooth surface morphology, but cracked and became rough after cycling in the liquid electrolyte. A magnified SEM image and its corresponding EDX spectra mapping results demonstrated the active materials dissolved during the charge/discharge processes. It was also observed that the dissolved substances were deposited on the surface of the cycled Li anode, indicating the redistribution of PTCDA. In sharp contrast, the PTCDA cathode and Li anode of the cycled PTCDA|HLL-CSPE|Li cell maintained similar morphologies as the pristine PTCDA|HLLCSPE| Li cell after cycling in the solid-state cell, which suggested that the dissolution and shuttle effects occurring in the liquid electrolyte cell were effectively inhibited in the HLLCSPE system. Digital images also revealed the dissolution and shuttling of PTCDA in the liquid electrolyte cell, while it was not observed in the HLL-CSPE cell.

Figure 10A:
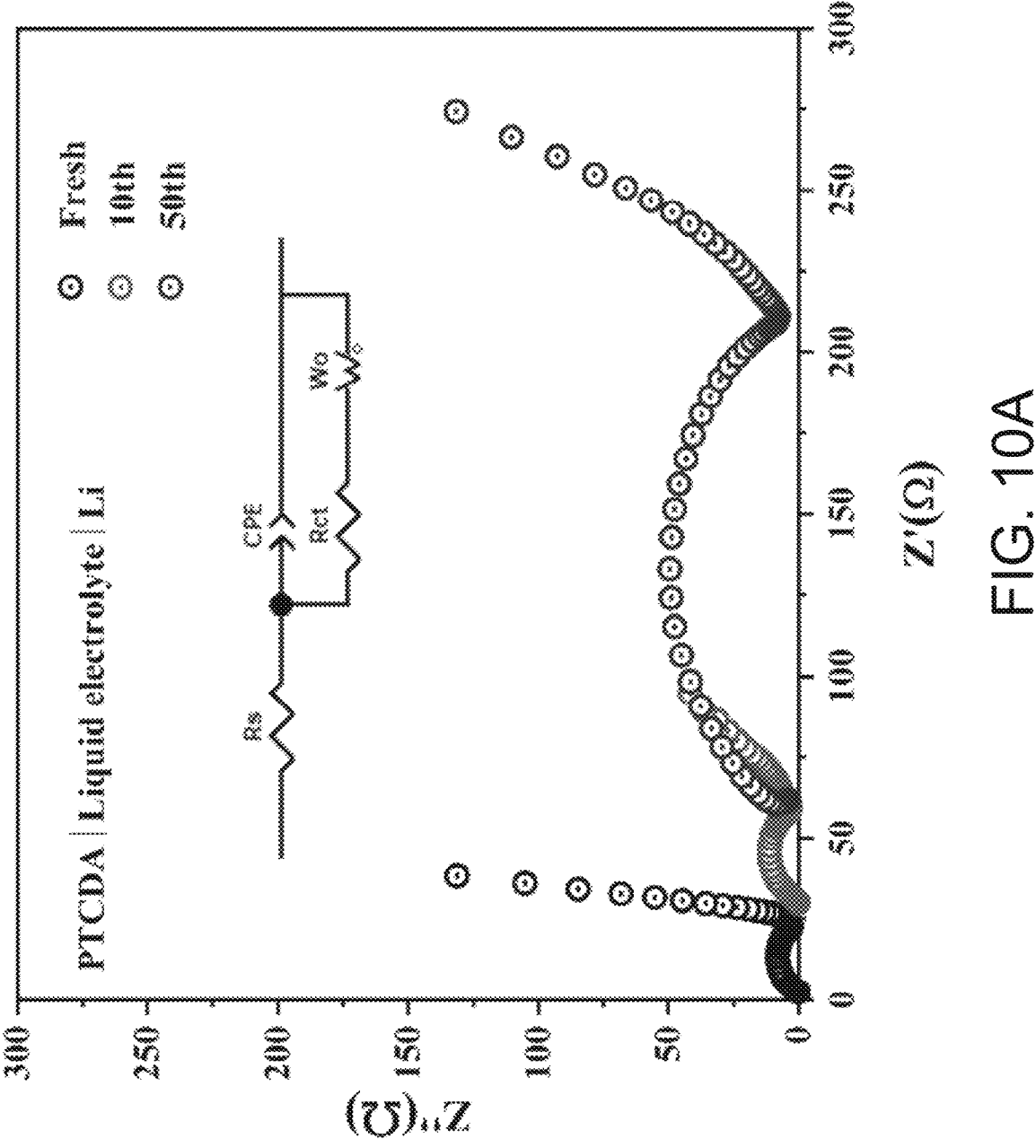
FIGS. 10A through 10C represent aspects of the kinetics and interfacial stability of PTCDA|Li cells using different electrolytes in accordance with another nonlimiting embodiment of this invention.
Figure 10B:
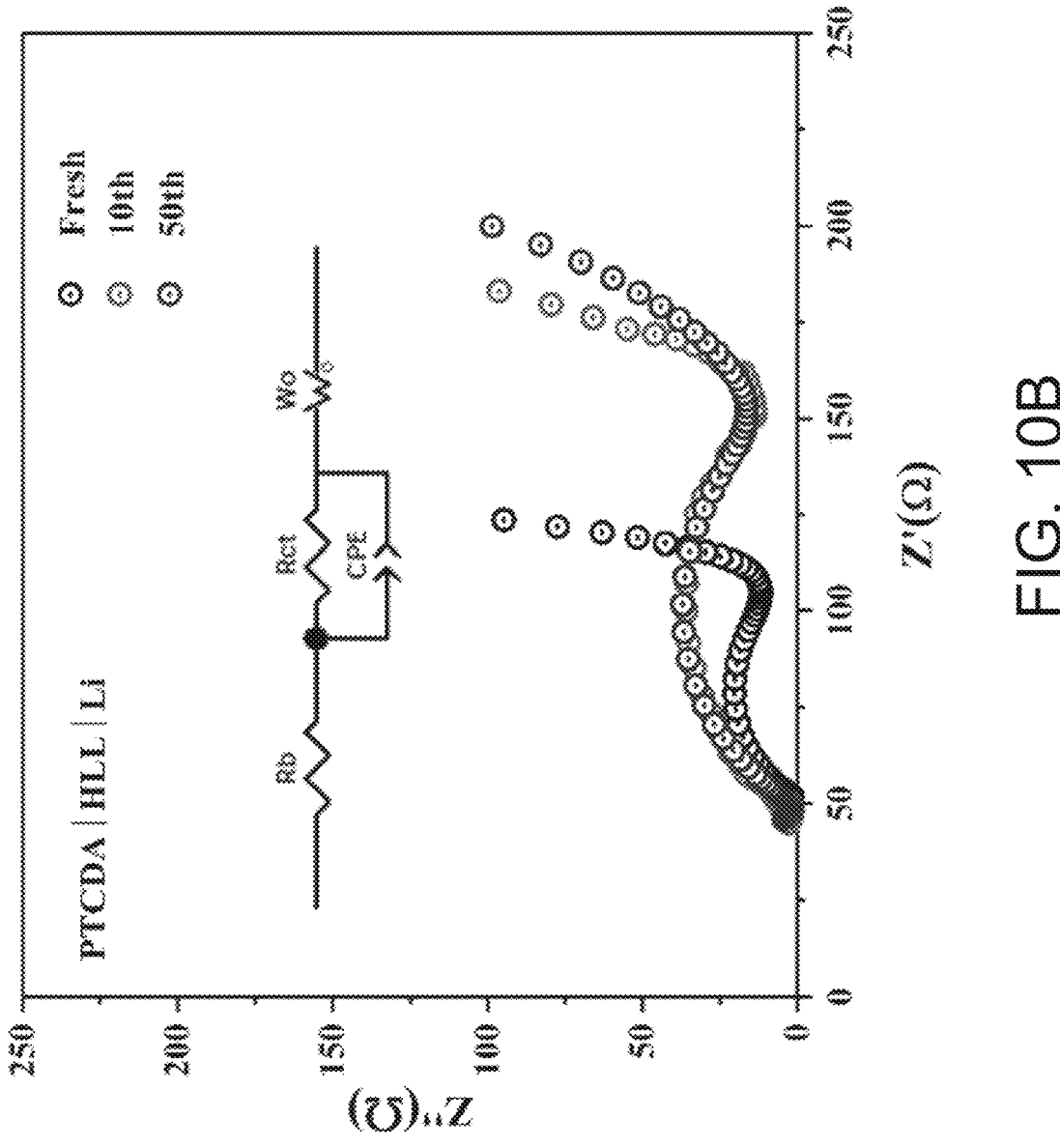
Figure 10C:
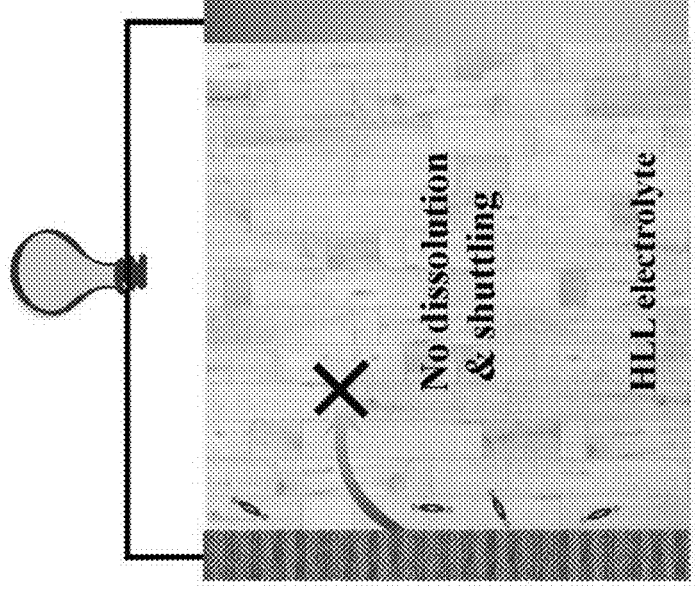
Figure 10C:
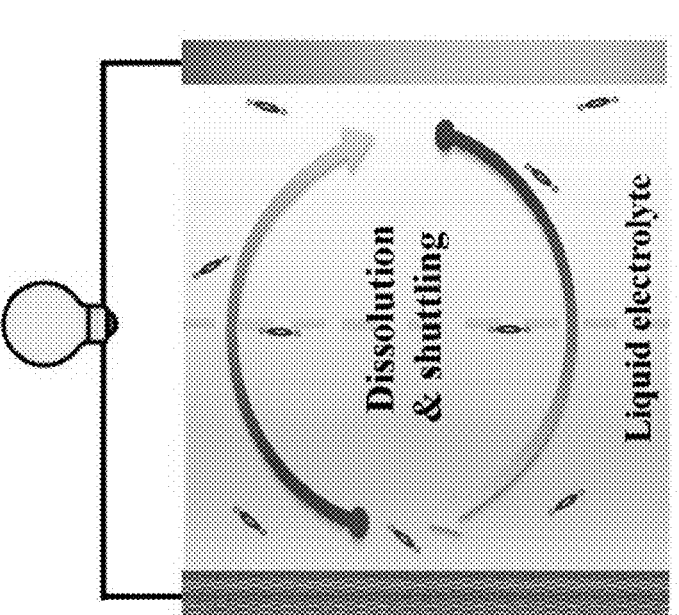

Furthermore, EIS was performed to investigate the kinetics and interfacial stability of PTCDA|Li cells using different electrolytes. As shown in FIG. 10A, the electrolyte solution resistance (R$_s$) value of a pristine liquid electrolyte battery was 2 ohms, which increased to 30 and 62 ohms after 10 and 50 cycles, respectively. The charge transfer resistance (R$_{ct}$) increased from 21 ohms ("fresh") to 32 ohms (after 10 cycles) and 153 ohms (after 50 cycles). The increase in R$_s$ and R$_{ct}$ was attributed to the dissolution, shuttling and redistribution of PTCDA. By comparison, the PTCDA|HLL-CSPE|Li cell (FIG. 10B) exhibited a constant bulk resistance (R$_b$) after 50 cycles. R$_{ct}$ increased from 73 ohms ("fresh") to 114 ohms after 10 cycles, which was related to the SEI formation. It remained unchanged during subsequent cycles, demonstrating that the HLL-CSPE membrane effectively suppressed the dissolution and shuttle effects. Therefore, the dissolution and shuttle effects in the two Li-organic batteries can be illustrated as depicted in FIG. 10C. In the PTCDA|liquid electrolyte|Li battery ("Liquid electrolyte"), highly soluble discharge products escaped from the cathode, dissolved in the electrolyte, and shuttled between the cathode and anode. This process resulted in continuous and irreversible loss of PTCDA, poor coulombic efficiency, high impedance, and weak cycle stability. However, such issues were addressed by the solid-state HLL-CSPE membrane electrolyte ("HLL electrolyte") in the solid-state PTCDA|HLL-CSPE|Li cell, thus significantly improving its coulombic efficiency and cycle life.

Figure 11A:
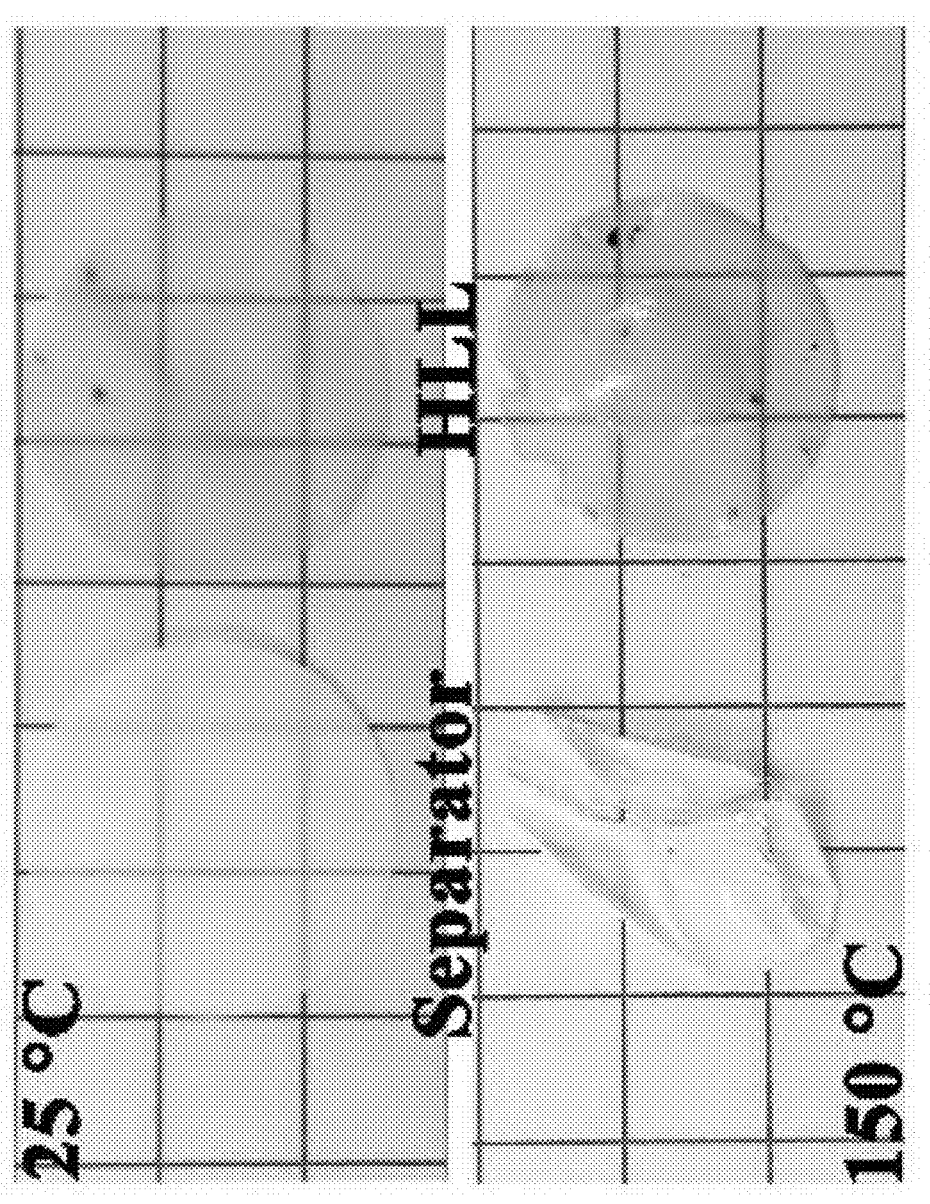
FIGS. 11A through 11E represent detailed thermal analysis and battery abusing testing of the solid-state PTCDA|HLL-CSPE|Li cell and the PTCDA-Li cell with the traditional liquid electrolyte.
Figure 11B:
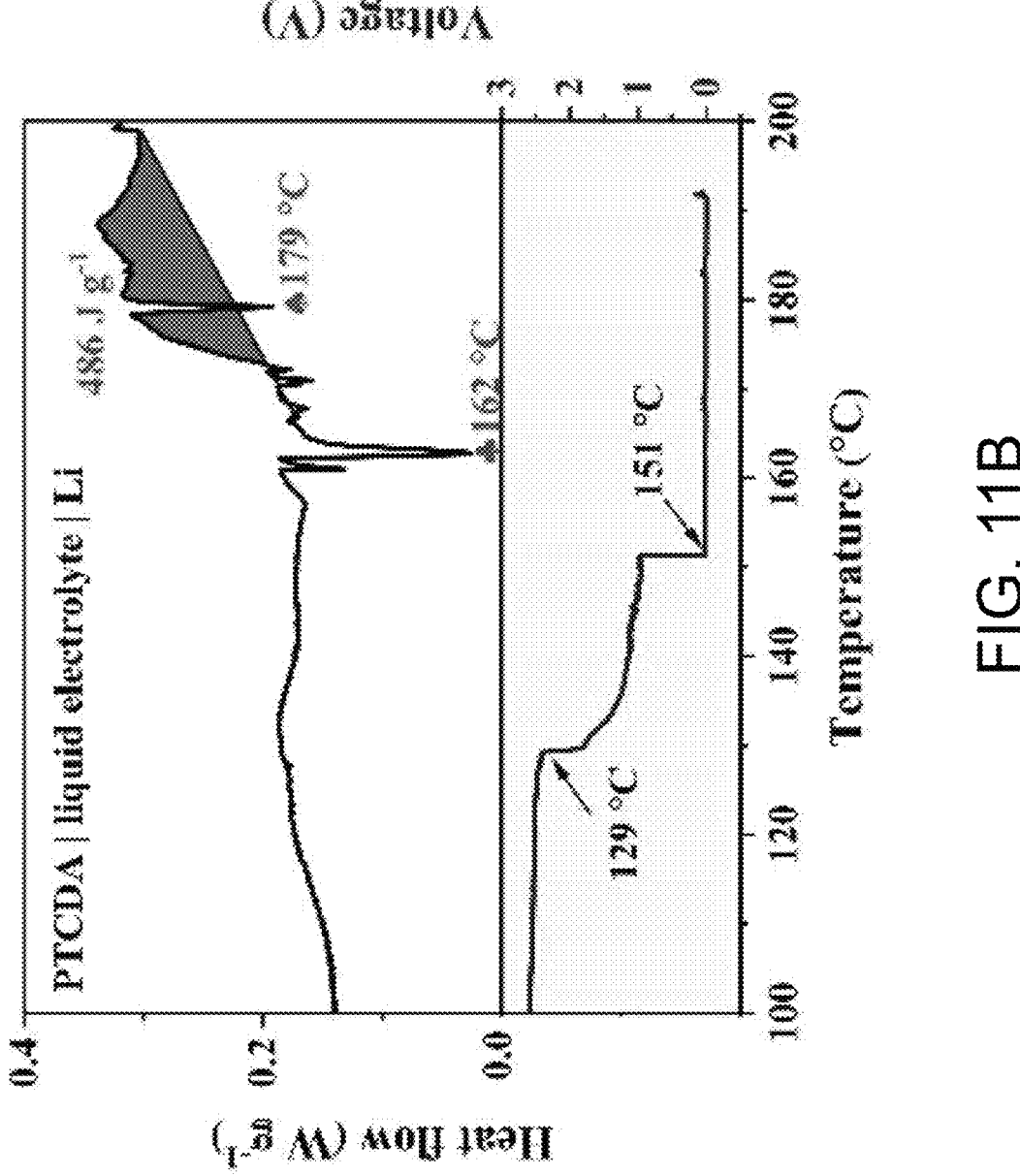
Figure 11C:
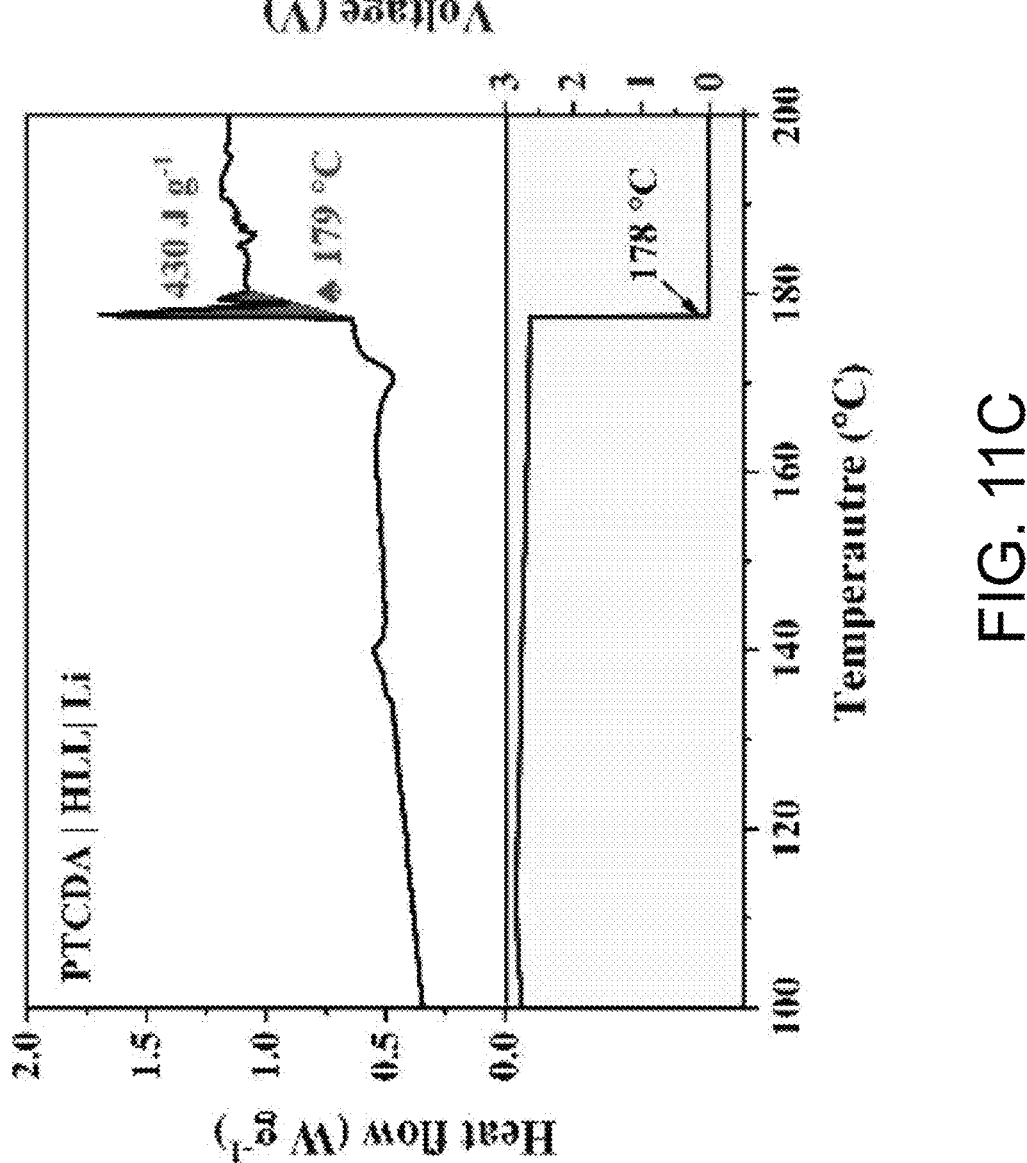

In order to verify the improved safety of the solid-state PTCDA|HLL-CSPE|Li cell compared to the PTCDA-Li cell with the traditional liquid electrolyte, the cells were subjected to detailed thermal analysis and battery abusing testing. The HLL-CSPE membrane maintained its integrity after heat treatment at 150° C. for 10 minutes (FIG. 11A), while the commercial separator melted and dramatically shrank after the treatment. This suggested that the HLLC0-CSPE membrane can prevent the internal short-circuit in a lithium battery at elevated temperatures, thereby significantly enhancing the thermal safety of a lithium battery. Furthermore, a multiple module calorimeter (MMC) was employed to in-situ investigate and compare the thermal safety of the PTCDA|Li cells with liquid electrolyte and the HLL-CSPE membrane electrolyte. The heat flow of each cell was recorded by MMC at a heating rate of 0.2° C./min, and its open-circuit voltage (OCV) profile was monitored using a land battery tester. As shown in the enlarged profile of FIG. 11B, the OCV of the PTCDA|liquid electrolyte|Li cell initially decreased at 129° C. and dropped to 0 V at 151° C., which was attributed to the melting of PE and PP components in the separator, respectively.

Regarding the thermal behavior, endothermic peaks at 162 and 179° C. were attributed to the leakage of the liquid electrolyte and the melting of the Li anode, respectively. In contrast, the solid-state cell exhibited dramatically mitigated overall heat generation during the testing. The liquid electrolyte cell was calculated to generate 486 J g$^{-1}$, which was largely attributed to the severe Li/electrolyte reaction, electrolyte self-decomposition after the short circuit. In contrast, the solid-state cell with the HLL-CSPE membrane (FIG.

Figure 11D:
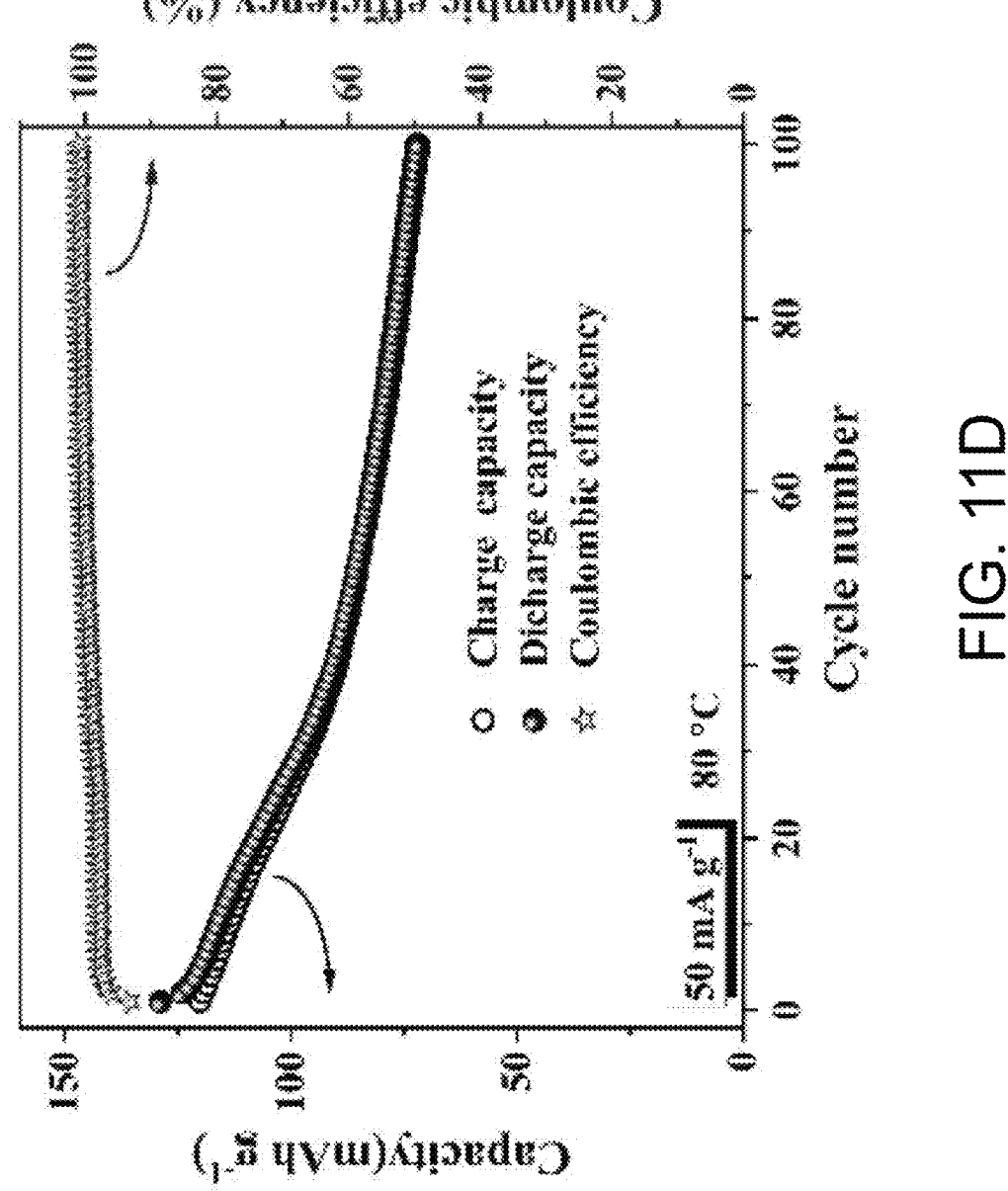
Figure 11E:
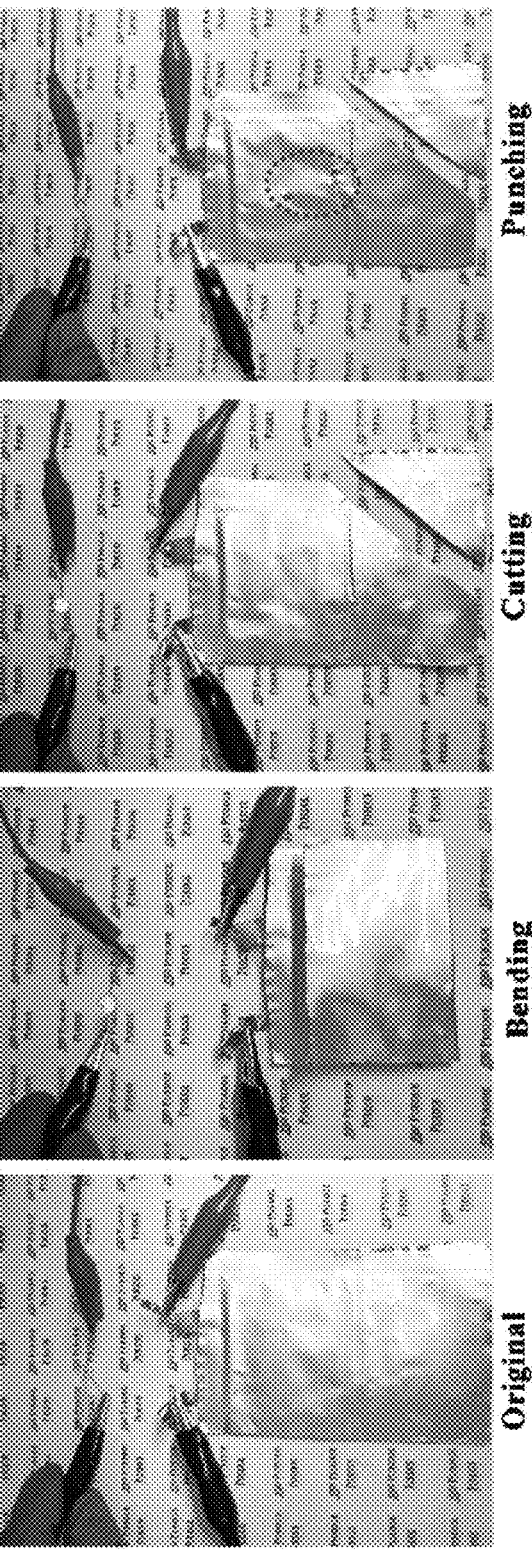

11C) exhibited a stable voltage profile of up to 178° C., indicating an enlarged temperature window for the solid-state HLL-CSPE cell. Moreover, the heat release in the solid-state cell was calculated to be 430 J g⁻¹, which was 12% lower than that of the liquid electrolyte cell. It should be noted that due to the endothermic reaction of liquid electrolyte leakage, the actual heat release of the liquid electrolyte cell during the thermal runaway should be higher than the test value. These results demonstrate that compared with liquid electrolyte cell. The HLL-CSPE solid-state cell delivered a higher thermal stable window and less heat release. As shown in FIG. 11D, the HLL-CSPE cell was safely charged and discharged for 100 cycles without thermal runaway even at 80° C., indicating its excellent thermal safety. In addition, a continuous capacity degradation can be observed during cycling, which was due to side reactions between the electrolyte and electrodes at high temperature. Furthermore, it was demonstrated that the PTCDA|HLL-CSPE|Li solid-state pouch cell is able to light a blue LED even under harsh conditions such as bending, cutting, and punching (FIG. 11E), demonstrating its outstanding flexibility and safety in practical applications.

In view of the foregoing, an organic PTCDA cathode was demonstrated that is suitable for use in an organic lithium battery, as well as a solid composite polymer membrane electrolyte containing a LLZTO ceramic filler and LiTFSI salt in a hybrid polymer electrolyte made up of PVDF-HFP and PEC, yielding a solid-state organic PTCDA|HLL-CSPE|Li cell. The HLL-CSPE membrane electrolyte exhibited high ionic conductivity (1.46×10⁻⁴ S·cm⁻¹), a wide voltage window (about 4.6 V), outstanding thermal stability (202° C.), and excellent mechanical properties (137.1 MPa in modulus and 8.5 MPa in hardness). By combining the HLL-CSPE membrane, organic PTCDA cathode, and Li metal anode, a high-performance all-solid-state Li-organic (PTCDA|HLL-CSPE|Li) cell was obtained. The HLL-CSPE membrane exhibited electrochemical stability, electrode/electrolyte interfacial compatibility, and suppression to the dissolution/shuttle of PTCDA and the growth of Li dendrite. As a result, the solid-state PTCDA|HLL-CSPE|Li cell was able to deliver a stable cycling performance over 1000 cycles, even at a high current density of 500 mA g⁻¹. Moreover, the solid-state PTCDA|HLL-CSPE|Li cell exhibited an elevated thermal stable window (178° C.) and less heat release (430 J g⁻¹) compared with an analogous cell containing a liquid electrolyte (151° C. and 486 J g⁻¹). Furthermore, the solid-state PTCDA|HLL-CSPE|Li cell was not only safely cycled at elevated temperature, but was also able to power an LED under abuse conditions, demonstrating outstanding safety.

While the invention has been described in terms of particular embodiments and investigations, it is apparent that other forms could be adopted by one skilled in the art. For example, the physical configuration of the batteries and their components could differ from that described herein and shown, and materials and processes/methods other than those noted could be used. In addition, the invention encompasses additional embodiments in which one or more features or aspects of different disclosed embodiments may be combined. Therefore, the scope of the invention is to be limited only by the following claims.

The invention claimed is:

1. A composite solid polymer electrolyte suitable for use in a solid-state lithium battery, the composite solid polymer electrolyte comprising:

a polymer matrix consisting of poly(vinylidene fluoride) (PVDF);

a lithium bis(trifluoromethane)sulfonimide (LiTFSI) salt dispersed in the polymer matrix; and a lithium-lanthanum-zirconium-tantalum-oxygen (LLZTO) ceramic filler dispersed in the polymer matrix, wherein the PVDF and LiTFSI are present in a molar ratio of 4:1 and the LLZTO ceramic filler is 2.5% to 5% by weight of the total amount of PVDF and LiTFSI.

2. The composite solid polymer electrolyte of claim 1, wherein the LLZTO ceramic filler is $Li_{6.4}La_3Zr_{1.4}Ta_{0.6}O_{12}$.

3. The composite solid polymer electrolyte of claim 1, wherein the composite solid polymer electrolyte consists of the polymer matrix, the LiTFSI salt, and the LLZTO ceramic filler.

4. The composite solid polymer electrolyte of claim 1, wherein the LLZTO ceramic filler is 5% by weight of the total amount of PVDF and LiTFSI.

5. A solid-state lithium battery comprising the composite solid polymer electrolyte of claim 1.

6. The solid-state lithium battery of claim 5, wherein the solid-state lithium battery comprises an organic cathode comprising perylene-3,4,9,10-tetracarboxylic dianhydride (PTCDA).

7. The solid-state lithium battery of claim 6, wherein the organic cathode contains the PTCDA in an amount of about 60 weight percent.

8. The solid-state lithium battery of claim 6, wherein the organic cathode further contains a hybrid polymer PVDF-HFP matrix, the LiTFSI salt, and the LLZTO ceramic filler.

9. The solid-state lithium battery of claim 8, wherein the hybrid polymer PVDF-HFP matrix comprises poly(vinylidene fluoride-co-hexafluoropropylene) and poly(ethylene carbonate) (PEC).

10. The solid-state lithium battery of claim 5, wherein the solid-state lithium battery comprises a lithium metal anode.

11. An organic cathode suitable for use in a solid-state lithium battery, the organic cathode comprising perylene-3,4,9,10-tetracarboxylic dianhydride (PTCDA), conductive carbon black, and a composite solid polymer electrolyte, wherein the composite solid polymer electrolyte comprises a hybrid polymer matrix consisting of a 1:1 by weight mixture of poly(vinylidene fluoride-co-hexafluoropropylene) (PVDF-HFP) and poly(ethylene carbonate) (PEC), a lithium bis(trifluoromethane)sulfonimide (LiTFSI) salt dispersed in the hybrid polymer matrix, and a ceramic filler dispersed in the hybrid polymer matrix, wherein the ceramic filler is $Li_{6.4}La_3Zr_{1.4}Ta_{0.6}O_{12}$ and is 2.5% to 5% by weight of the total amount of PVDF-HFP and LiTFSI.

12. The organic cathode of claim 11, wherein the organic cathode contains the PTCDA in an amount of about 60 weight percent.

13. The organic cathode of claim 11, wherein the composite solid polymer electrolyte consists of the hybrid polymer matrix, the LiTFSI salt dispersed in the hybrid polymer matrix, and the ceramic filler dispersed in the hybrid polymer matrix.

14. The organic cathode of claim 11, wherein the organic cathode is composed of about 60% by weight of the PTCDA, about 20% by weight of the conductive carbon black, and about 20% by weight of the composite solid polymer electrolyte.

15. A solid-state lithium battery comprising the organic cathode of claim 12.

16. The solid-state lithium battery of claim 15, wherein the solid-state lithium battery comprises a composite solid polymer electrolyte membrane.

17. The solid-state lithium battery of claim 16, wherein the composite solid polymer electrolyte membrane comprises a polymer matrix consisting of poly(vinylidene fluoride) (PVDF), an LiTFSI salt dispersed in the polymer matrix, and a lithium-lanthanum-zirconium-tantalum-oxygen (LLZTO) ceramic filler dispersed in the polymer matrix.

18. The solid-state lithium battery of claim 17, wherein the LLZTO ceramic filler is $Li_{6.4}La_3Zr_{1.4}Ta_{0.6}O_{12}$.

19. The solid-state lithium battery of claim 15, wherein the solid-state lithium battery comprises a lithium metal anode.

* * * * *